US012663737B2

(12) United States Patent
Tanaka

(10) Patent No.: US 12,663,737 B2
(45) Date of Patent: Jun. 23, 2026

(54) IMAGE FORMING APPARATUS AND IMAGE FORMING METHOD

(71) Applicant: CANON KABUSHIKI KAISHA, Tokyo (JP)

(72) Inventor: Nobuhiko Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/059,496

(22) Filed: Feb. 21, 2025

(65) Prior Publication Data

US 2025/0271786 A1 Aug. 28, 2025

(30) Foreign Application Priority Data

Feb. 28, 2024 (JP) ................................ 2024-028928

(51) Int. Cl.

| | |
|---|---|
| ***G03G 15/043*** | (2006.01) |
| ***G03G 15/00*** | (2006.01) |
| ***G03G 15/04*** | (2006.01) |

(52) U.S. Cl.

CPC ..... *G03G 15/043* (2013.01); *G03G 15/04036* (2013.01); *G03G 15/5008* (2013.01)

(58) Field of Classification Search

CPC .......... G03G 15/043; G03G 15/04036; G03G 15/5008

See application file for complete search history.

(56) References Cited

U.S. PATENT DOCUMENTS

2022/0019153 A1* 1/2022 Sato .................... G03G 15/043
2022/0404731 A1* 12/2022 Nomura .............. G03G 15/043

FOREIGN PATENT DOCUMENTS

JP 2022191734 A 12/2022

* cited by examiner

*Primary Examiner* — Sandra Brase
(74) *Attorney, Agent, or Firm* — ROSSI, KIMMS & McDOWELL LLP

(57) ABSTRACT

An image forming apparatus comprises a photosensitive drum, an exposure head and a control unit. The control unit can execute a first mode and a second mode in which the drum is rotated at a second rotational speed that is a/b times of the first rotational speed of the first mode. In exposure of the second mode, the control unit controls a cycle of a light emission timing at a cycle of b/a times of a cycle of the first mode, controls the light-emitting units to cause, among n rows, the light-emitting units of (n×((d−c)/d)) rows to not emit light, and sets a drive current so that an amount of light matches (a×d)/(b×c) times of the first mode.

17 Claims, 26 Drawing Sheets

IMAGE FORMING APPARATUS AND IMAGE FORMING METHOD

BACKGROUND OF THE INVENTION

Field of the Invention

The present invention relates to an image forming apparatus and an image forming method.

Description of the Related Art

In the case of forming an image using an electro-photographic image forming apparatus, first, light corresponding to the image data is emitted at the surface of a photosensitive drum to form an electrostatic latent image on the surface of the photosensitive drum. Thereafter, toner is attached to the electrostatic latent image on the surface of the photosensitive drum using a developing unit to form a toner image which is then transferred to a sheet. The toner image transferred to a sheet is heated by a fixing unit to fix the toner image to the sheet and form an image.

For handling different types of sheets such as paper and the like, such an image forming apparatus includes a normal mode for conveying sheets at a normal speed and a low-speed mode for conveying sheets at a lower speed than in the normal mode. The rotational speed of the photosensitive drum is linked to the conveyance speed of the sheet. Thus, when in low-speed mode, the rotational speed of the photosensitive drum also slows down to lower speed than in the normal mode. If the rotational speed of the photosensitive drum is different and light is emitted at the surface of the photosensitive drum in a similar manner, in low-speed mode, the amount of emitted light increases, causing too much toner to adhere to the sheet.

Regarding this, in Japanese Patent Laid-Open No. 2022-191734, an image forming apparatus is described that, in the case of forming an image in a mode in which the photosensitive drum rotational speed is low, generates a line synchronization signal at intervals shorter than the line synchronization signal generated in a normal mode and control the number of times an exposure head emits light in sync with the line synchronization signal to adjust the exposure amount and adjust the amount of toner adhered to the photosensitive drum.

SUMMARY OF THE INVENTION

However, with the technology described above, depending on the rotational speed of the photosensitive drum, the exposure amount may be unable to be sufficiently controlled and the amount of toner on the photosensitive drum may also be unable to be appropriately adjusted.

Regarding this, the present invention provides technology in an image forming apparatus that can appropriately adjust the toner on a photosensitive drum even when forming images using modes with different photosensitive drum rotational speeds.

According to one aspect of the present disclosure, there is provided an image forming apparatus comprising: a photosensitive drum that rotates about a rotation axis direction; an exposure head including a plurality of light-emitting units that emit light on a basis of an image data signal for exposure of the photosensitive drum and are arranged in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, controls a cycle of a light emission timing of the light-emitting units at a cycle of b/a times of a cycle of the first mode, sets c/d (c and d are integers) so that n×(c/d) is an integer and controls the light-emitting units to cause, from among the number of rows n, the light-emitting units of a number of rows (n×(c/d)) to emit light and to cause the light-emitting units of a number of rows (n×((d−c)/d)) to not emit light, and sets a drive current of the light-emitting units so that an amount of light of the plurality of light-emitting units matches (a×d)/(b×c) times of an amount of light in the first mode.

According to another aspect of the present disclosure, there is provided an image forming apparatus comprising: a photosensitive drum that rotates about a rotation axis direction; an exposure head including a plurality of light-emitting units that emit light on a basis of an image data signal for exposure of the photosensitive drum and are arranged in the rotation axis direction and in a plurality of rows in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies b/(a×e)≥Tmin and controls a cycle of light emission timing of the light-emitting units at a cycle of b/(a×e) times of a cycle in the first mode, controls the plurality of light-emitting units so that, of e times an image data signal of one line is being transmitted, the plurality of light-emitting units are caused to emit light f times and the plurality of light-emitting units are caused to not emit light (e−f) times, and sets a drive current of the light-emitting units so that an amount of light of the plurality of light-emitting units matches (a×e)/(b×f) times of an amount of light in the first mode.

According to another aspect of the present disclosure, there is provided an image forming apparatus comprising: a photosensitive drum that rotates about a rotation axis direction; an exposure head including a plurality of light-emitting units that emit light on a basis of an image data signal for exposure of the photosensitive drum and are arranged in the rotation axis direction and in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies $b/(a\times e)\geq Tmin$ and controls a cycle of light emission timing of the light-emitting units at a cycle of $b/(a\times e)$ times of a cycle in the first mode, controls the plurality of light-emitting units so that, of e times an image data signal of one line is being transmitted, the plurality of light-emitting units are caused to emit light f times and the plurality of light-emitting units are caused to not emit light $(e-f)$ times, sets a multiplying factor g equal to or less than 1 so that $n\times g$ is an integer and controls the light-emitting units to cause, from among the number of rows n, the light-emitting units of a number of rows $(n\times g)$ to emit light and to cause the light-emitting units of a number of rows $(n\times(1-g))$ to not emit light, and sets a drive current of the light-emitting units so that an amount of light of the plurality of light-emitting units matches $(a\times e)/(b\times f\times g)$ times of an amount of light in the first mode.

According to another aspect of the present disclosure, there is provided an image forming method using an image forming apparatus provided with: a photosensitive drum that rotates about a rotation axis direction; an exposure head including a plurality of light-emitting units that emit light on a basis of an image data signal for exposure of the photosensitive drum and are arranged in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, controls a cycle of a light emission timing of the light-emitting units at a cycle of b/a times of a cycle of the first mode, sets c/d (c and d are integers) so that $n\times(c/d)$ is an integer and controls the light-emitting units to cause, from among the number of rows n, the light-emitting units of a number of rows $(n\times(c/d))$ to emit light and to cause the light-emitting units of a number of rows $(n\times((d-c)/d))$ to not emit light, and sets a drive current of the light-emitting units so that an amount of light of the plurality of light-emitting units matches $(a\times d)/(b\times c)$ of an amount of light in the first mode.

According to another aspect of the present disclosure, there is provided an image forming method using an image forming apparatus provided with: a photosensitive drum that rotates about a rotation axis direction; an exposure head including a plurality of light-emitting units that emit light on a basis of an image data signal for exposure of the photosensitive drum and are arranged in the rotation axis direction and in a plurality of rows in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies $b/(a\times e)\geq Tmin$ and controls a cycle of light emission timing of the light-emitting units at a cycle of $b/(a\times e)$ times of a cycle in the first mode, controls the plurality of light-emitting units so that, of e times an image data signal of one line is being transmitted, the plurality of light-emitting units are caused to emit light f times and the plurality of light-emitting units are caused to not emit light $(e-f)$ times, and sets a drive current of the light-emitting units so that an amount of light of the plurality of light-emitting units matches $(a\times e)/(b\times f)$ times of an amount of light in the first mode.

According to another aspect of the present disclosure, there is provided an image forming method using an image forming apparatus provided with: a photosensitive drum that rotates about a rotation axis direction; an exposure head including a plurality of light-emitting units that emit light on a basis of an image data signal for exposure of the photosensitive drum and are arranged in the rotation axis direction and in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies $b/(a\times e)\geq Tmin$ and controls a cycle of light emission timing of the light-emitting units at a cycle of $b/(a\times e)$ times of a cycle in the first mode, controls the plurality of light-emitting units so that, e times of an image data signal of one line is being transmitted, the plurality of light-emitting units are caused to emit light f times and the plurality of light-emitting units are caused to not emit light $(e-f)$ times, sets a multiplying factor g equal to or less than 1 so that $n\times g$ is an integer and controls the light-emitting units to cause, from among the number of rows n, the light-emitting units of a number of rows $(n\times g)$ to emit light and to cause the light-emitting units of a number of rows $(n\times(1-g))$ to not emit light, and sets a drive current of the light-emitting units so that an amount of light of the plurality of light-emitting units matches $(a\times e)/(b\times f\times g)$ times of an amount of light in the first mode.

Further features of the present invention will become apparent from the following description of exemplary embodiments with reference to the attached drawings.

DESCRIPTION OF THE EMBODIMENTS

Figure 1:
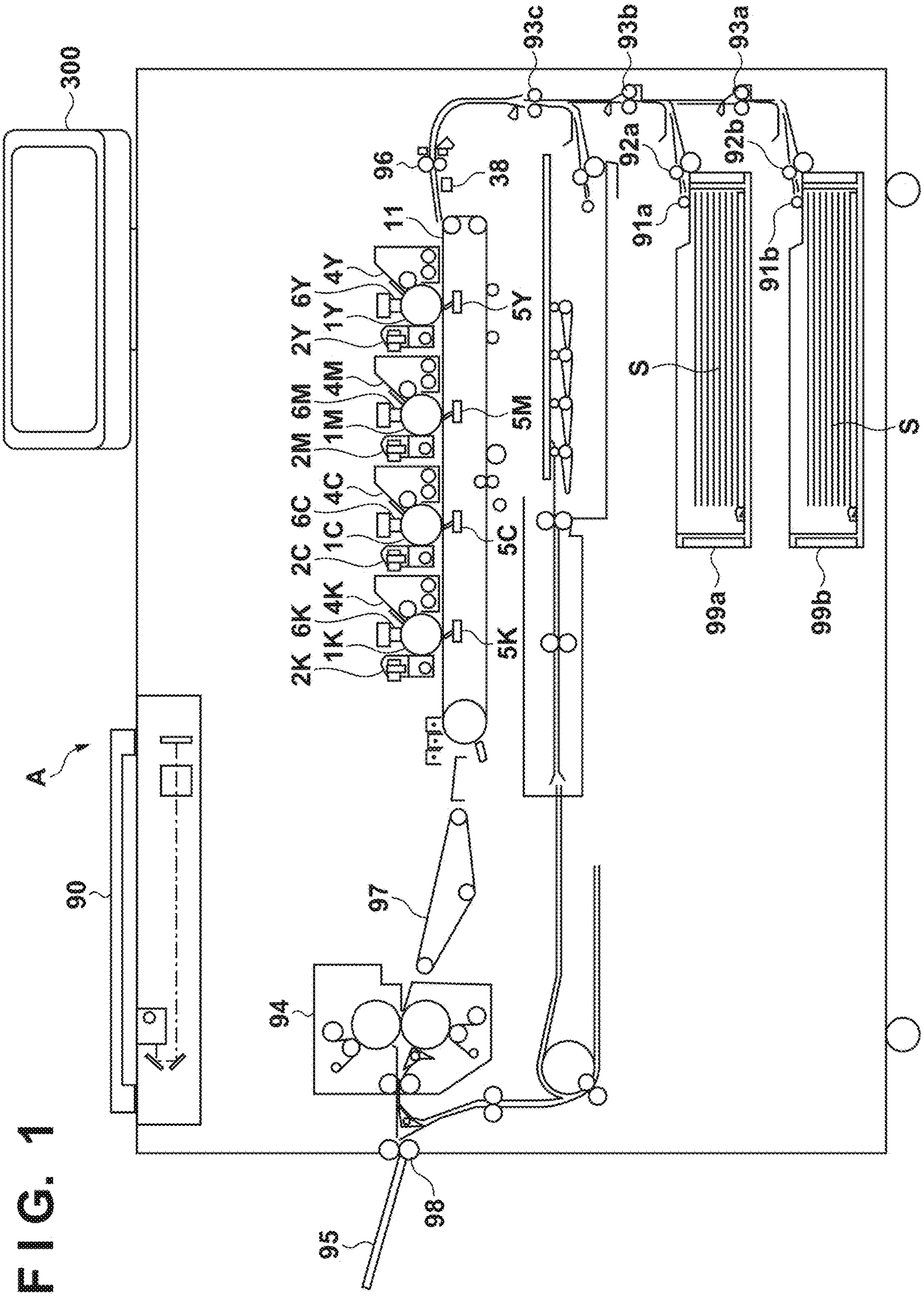
FIG. 1 is a cross-sectional schematic view of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

The overall configuration of an image forming apparatus A according to the present embodiment will be described together with the operations for when image formation is performed with reference to the drawings. Note that the dimensions, materials, shapes, relative positions, and the like described hereinafter are not intended to limit the scope of the invention, unless specific instruction is given.

The image forming apparatus A is a full color image forming apparatus that transfers toner of four colors, yellow Y, magenta, M, cyan C, and black K, to a sheet to form an image. Note that hereinafter, members that use toner of the colors described above will be given a suffix of Y, M, C, and K, and the configuration and operations of each member are essentially the same except that the color of the toner used is different. Thus, the suffix will be omitted if there is no need for differentiation.

FIG. 1 is a cross-sectional schematic view of the image forming apparatus A. As illustrated in FIG. 1, the image forming apparatus A includes image forming units that form images. The image forming unit includes a photosensitive drum 1 (1Y, 1M, 1C, 1K), a charging apparatus 2 (2Y, 2M, 2C, 2K), and an exposure head 6 (6Y, 6M, 6C, 6K). Also, the image forming unit includes a developing apparatus 4 (4Y, 4M, 4C, 4K) as a developing unit, a transferring apparatus 5 (5Y, 5M, 5C, 5K) as a transfer unit, and a conveyor belt 11.

Also, the image forming apparatus A includes a touch panel operation unit 300 (detection unit) for various types of settings relating to image formation to be set via user operation. The user can designate, by operating the operation unit 300, the number of images to form, the size of the sheet used in image formation, and the like. Also, the user can input, by operating the operation unit 300, the grammage (for example, thick paper, plain paper, sheet brand, or the like) of a sheet S stored in sheet cassettes 99*a* and 99*b*. Note that the grammage of the sheet S may be measured by a sensor 38 (detection unit) installed in a conveyance path, for example, instead of being input via the operation unit 300.

A transparent optical sensor can be used as the sensor 38 for measuring grammage, for example. The transparent optical sensor may be used in combination with a light-emitting element such as an LED and a light-receiving element such as a photodiode. The amount of light received by the light-receiving element is reduced by the sheet S blocking the light emitted from the light-emitting element toward the light-receiving element. The light-receiving element converts the received amount of light into a voltage value and sets a predetermined threshold for the voltage value to function as a switch.

Typically, for the sheet S where an image is formed, higher grammage means greater thickness. In the case of thin paper with low grammage, the light emitted from the LED is transmitted through the sheet S. In the case of thick paper with high grammage, the light emitted from the LED does not significantly transmit through. Regarding this, by focusing on the relationship between the sensor 38 and the grammage of the sheet S and measuring the amount of light received by the light-receiving element at the leading end or the trailing end of the sheet S passing through the sensor 38 with a constant amount of light emitting by the light-emitting element, the grammage of the sheet S can be predicted. For the measurement position, since the leading end and the trailing end of the sheet S tend to be the target of image formation less so than the central regions, using these portions can increase the measurement accuracy.

Figure 8:
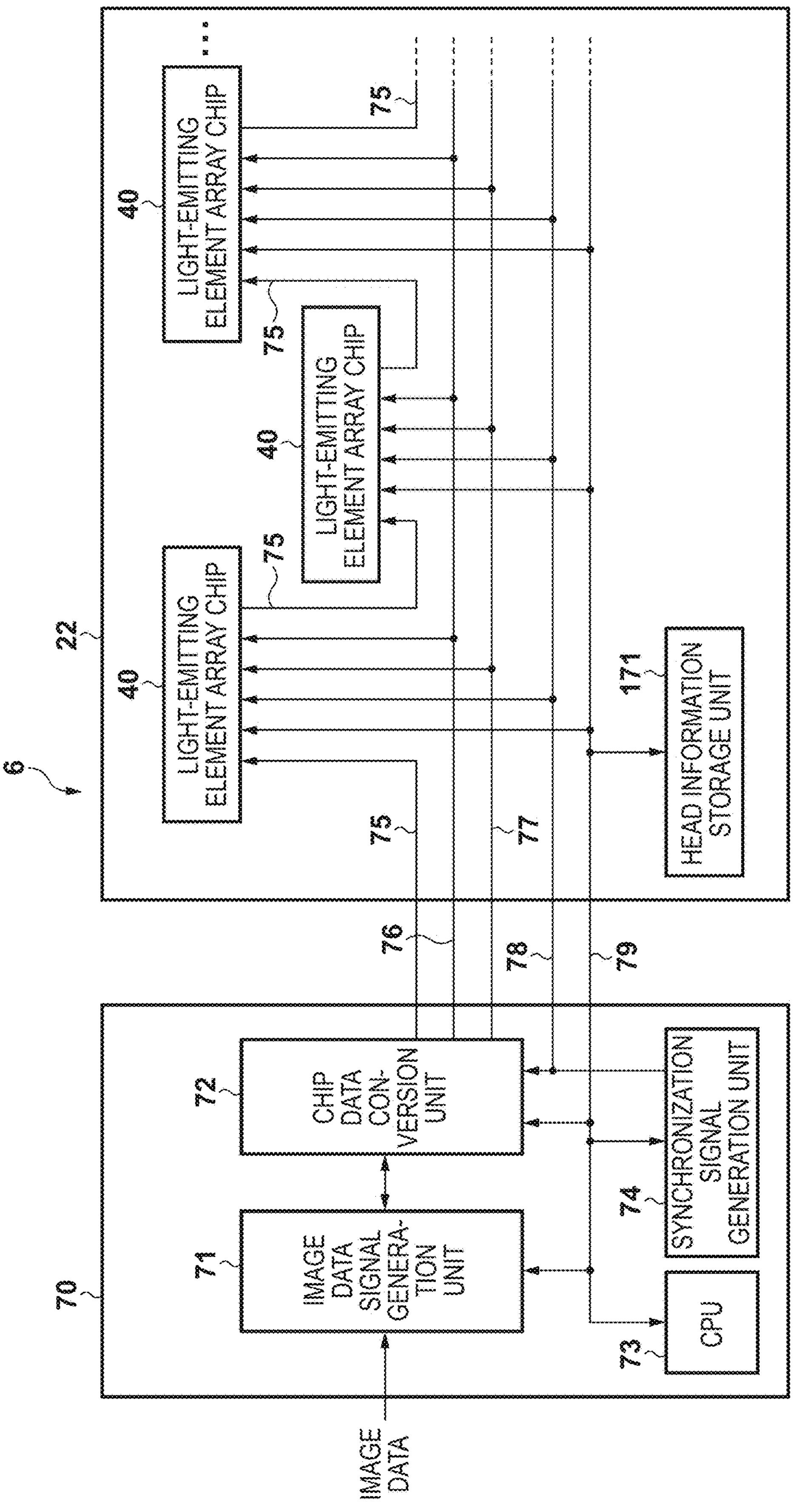
FIG. 8 is a block diagram illustrating the system configuration of an image controller unit and the exposure head.

Also, the operation unit 300 and the sensor 38 are electrically connected to a CPU 73 illustrated in FIG. 8. The CPU 73 controls the rotational speed of the various types of rollers that convey the sheet S according to the grammage of the sheet S detected from the operation unit 300 or the sensor 38 and sets the conveyance speed of the sheet S for when image formation is performed. Here, conveyance speed is defined as the speed of the sheet S when the sheet S passes through a fixing apparatus 94 (fixing unit).

For example, in the case of performing image formation in a low-speed mode on thick paper with grammage of the sheet S being equal to or greater than a predetermined value, the CPU 73 sets the conveyance speed of the sheet S to a lower speed for image formation than in the case of performing image formation in a normal mode on plain paper with grammage of the sheet S being less than the predetermined value. The rotational speed of the photosensitive drum 1 is linked to the conveyance speed of the sheet S. Thus, in the case of low-speed mode (second mode), the CPU 73 sets the rotational speed of the photosensitive drum 1 to a lower speed than in the case of the normal mode (first mode).

In this manner, a toner image carried by the sheet S with higher grammage is heated by the fixing apparatus 94 for a longer amount of time so that the toner image and the sheet S are heated more, allowing the toner image to be stably fixed to the sheet S with a higher heat capacity. Note that the timing of the CPU 73 to switch between the low-speed mode and the normal mode is not limited to the timing described above. For example, the CPU 73 may be configured to set the mode to the low-speed mode when performing image formation of a higher than normal image quality and increase the resolution in the sub-scan direction, which is the rotation direction of the photosensitive drum 1, more than in the normal mode.

Next, image formation operations by the image forming apparatus A will be described. When performing image formation, first, the sheet S stored in the sheet cassette 99*a* or the sheet cassette 99*b* is conveyed to a registration roller 96 via pickup rollers 91*a* and 91*b*, feeding rollers 92*a* and 92*b*, and conveyance roller 93*a* to 93*c*. Thereafter, the sheet S is conveyed to the conveyor belt 11 at a predetermined timing by the registration roller 96.

At the image forming unit, first, the surface of the photosensitive drum 1Y is charged by the charging apparatus 2Y. Next, the exposure head 6Y emits light at the surface of the photosensitive drum 1Y according to the image data read by an image reading unit 90 or image data transmitted from an external device (not illustrated) and forms an electrostatic latent image on the surface of the photosensitive drum 1Y. Thereafter, yellow toner is adhered to the electrostatic latent image formed on the surface of the photosensitive drum 1Y by the developing apparatus 4Y, and a yellow toner image is formed on the surface of the photosensitive drum 1Y. A transfer bias is applied to the toner image formed on the surface of the photosensitive drum 1Y by the transferring apparatus 5Y to transfer the toner image to the sheet S conveyed by the conveyor belt 11.

Via a similar process, an electrostatic latent image is formed on the photosensitive drums 1M, 1C, and 1K by light being emitted from the exposure heads 6M, 6C, and 6K, and magenta, cyan, and black toner images are formed by the developing apparatuses 4M, 4C, and 4K. By applying a transfer bias to the transferring apparatuses 5M, 5C, and 5K, the toner images are superimposed on the yellow toner image on the sheet S. In this manner, a full color toner image in accordance with the image data is formed on the surface of the sheet S.

Thereafter, the sheet S carrying the toner image is conveyed to a fixing apparatus 94 by a conveyor belt 97 and subjected to a heating and pressing process at a fixing apparatus 94. In this manner, the toner image on the sheet S is fixed to the sheet S. Thereafter, the sheet S where the toner image is fixed is discharged to a discharge tray 95 by a discharge roller 98.

Exposure Head

Next, the configuration of the exposure head 6 will be described.

Figure 2A:
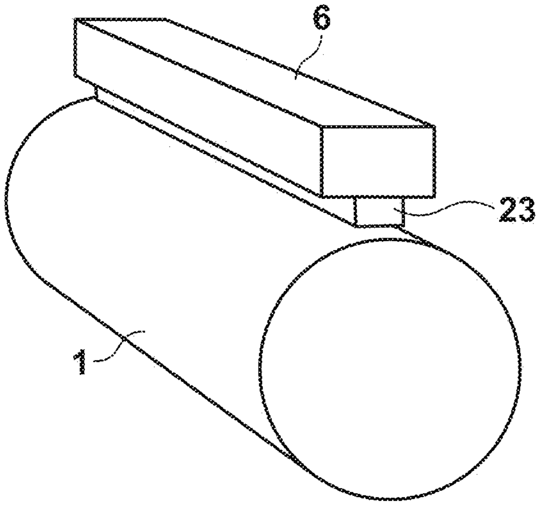
FIG. 2A is a perspective view of a photosensitive drum and an exposure head.
Figure 2B:
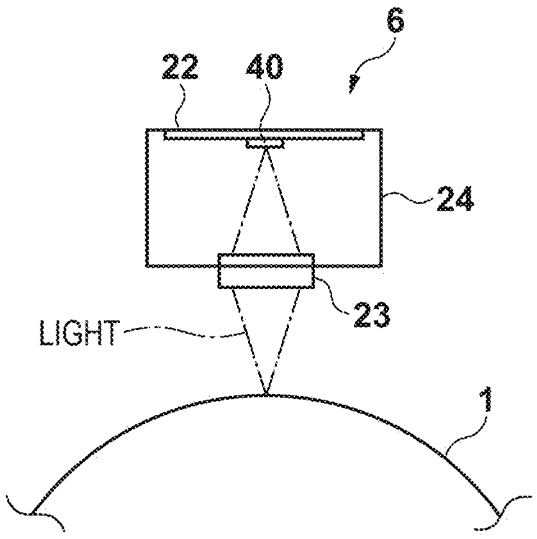
FIG. 2B is a cross-sectional view of the photosensitive drum and the exposure head.
Figure 3A:
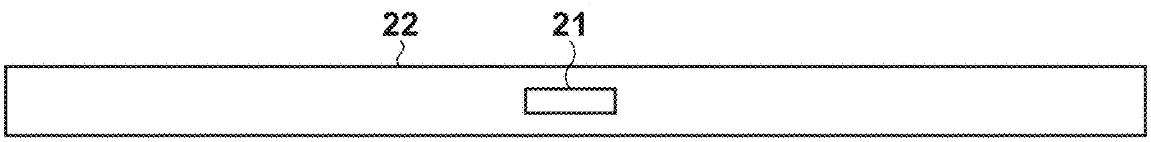
FIG. 3A is a diagram illustrating a mounting surface on one side of a printed substrate provided in the exposure head.
Figure 3B:
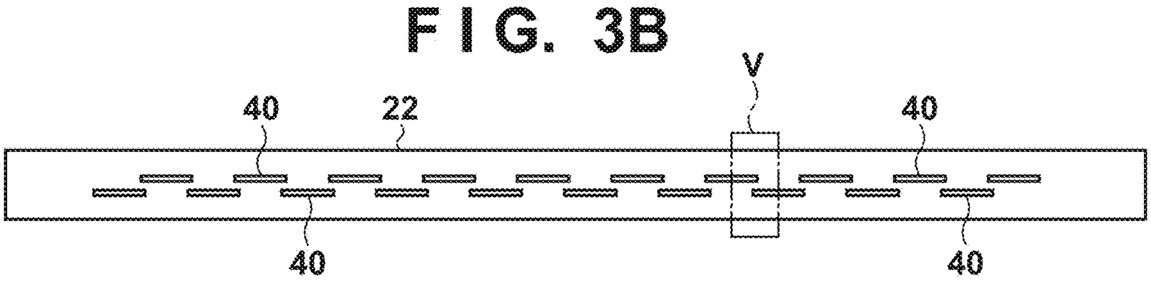
FIG. 3B is a diagram illustrating a mounting surface on the other side of a printed substrate provided in the exposure head.
Figure 3C:
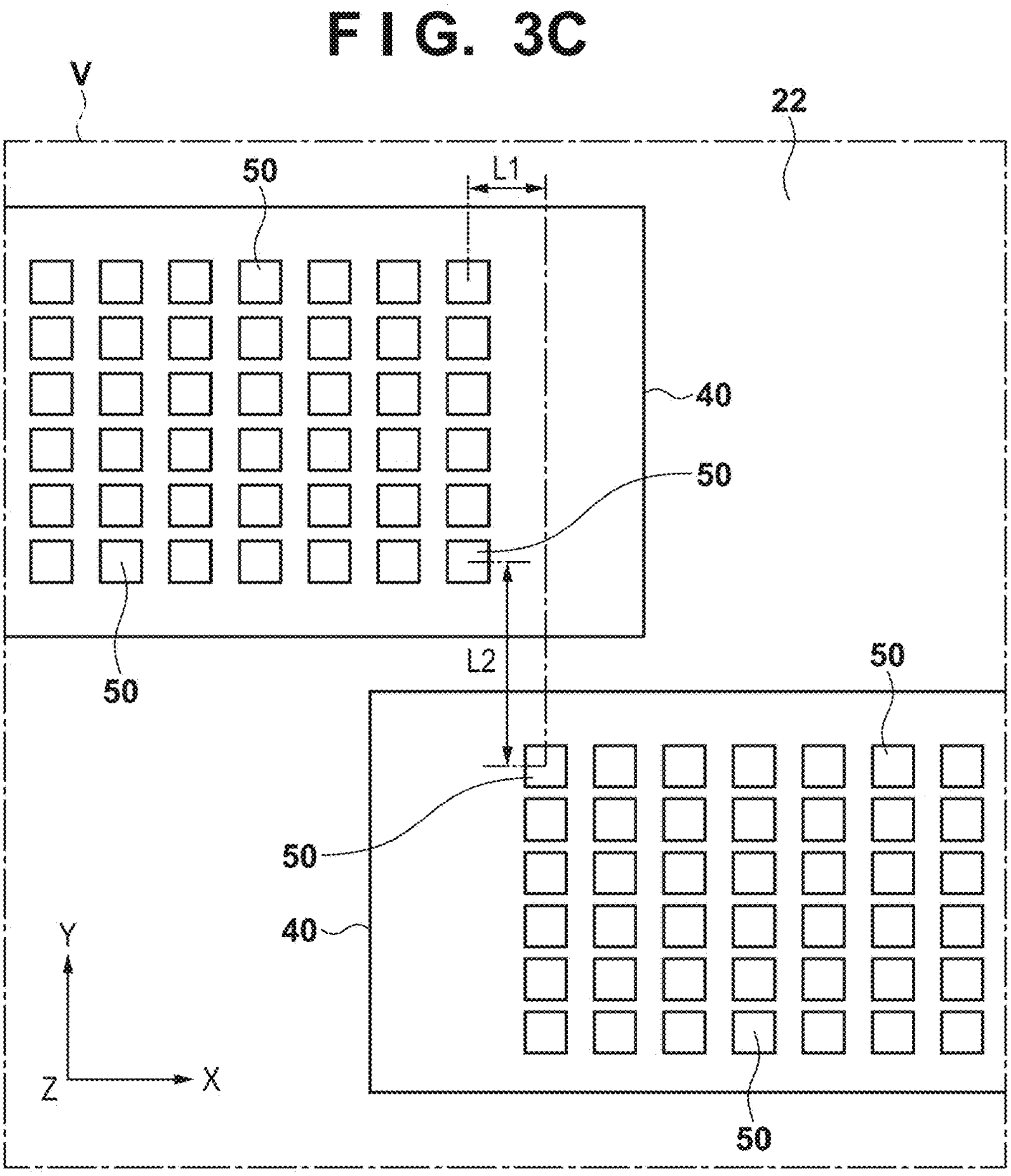
FIG. 3C is an enlarged view of a region V illustrated in FIG. 3B.

FIG. 2A is a perspective view of the photosensitive drum 1 and the exposure head 6. FIG. 2B is a cross-sectional view of the photosensitive drum 1 and the exposure head 6. FIGS. 3A and 3B are diagram illustrating a mounting surface of a printed substrate 22 provided in the exposure head 6 on one side and the other side. FIG. 3C is an enlarged view of a region V illustrated in FIG. 3B.

As illustrated in FIG. 2, the exposure head 6 is fixed by a fixing member (not illustrated) at a position facing the surface of the photosensitive drum 1. The exposure head 6 includes a light-emitting element array chip 40 that emits light and the printed substrate 22 for mounting the light-emitting element array chip 40. Also provided are a rod lens array 23 for focusing (gathering) the light emitted from the light-emitting element array chip 40 onto the photosensitive drum 1 and a housing 24 for fixing together the rod lens array 23 and the printed substrate 22.

Also, a connector 21 is installed in the surface of the printed substrate 22 opposite the mounting surface of the light-emitting element array chip 40. The connector 21 is provided for transmitting control signals of the light-emitting element array chip 40 transmitted from an image controller unit 70 (FIG. 8) and for connecting to a power source line. The light-emitting element array chip 40 is driven via the connector 21.

As illustrated in FIG. 3, 20 light-emitting element array chips 40 are arranged in a stagged two-column array on the printed substrate 22. Inside each of the light-emitting element array chips 40, 748 light-emitting units 50 are arranged at a predetermined resolution pitch in the long side direction (arrow X direction). Inside each of the light-emitting element array chips 40, the light-emitting units 50 are arranged at a predetermined pitch in the short side direction (arrow Y direction). In other words, in each light-emitting element array chip 40, the light-emitting units 50 have a two-dimensional array in the arrow X direction and the arrow Y direction orthogonal (intersecting) the X direction of the arrow.

In the present embodiment, the resolution pitch of the light-emitting element array chip 40 is 1200 dpi (approximately 21.16 μm). The distance from one end portion to the other end portion of the light-emitting units 50 included in each light-emitting element array chip 40 in the long side direction is approximately 15.8 mm. In other words, the exposure head 6 is provided with 14960 light-emitting units 50 in total in the arrow X direction. This makes possible exposure processing supporting an image width in the long side direction of approximately 316 mm (equal to approximately 15.8 mm×20 chips).

In the long side direction of the light-emitting element array chips 40, a gap L1 between the light-emitting units 50 of adjacent light-emitting element array chips 40 is approximately 21.16 μm. In other words, the pitch in the long side direction of the light-emitting units 50 at a boundary portion of each light-emitting element array chip 40 corresponds to a 1200 dpi resolution pitch. In the short side direction (arrow Y direction) of the light-emitting element array chips 40, a gap L2 between the light-emitting units 50 of light-emitting element array chips 40 in two adjacent rows is approximately 105 μm (equivalent to 5 pixels at 1200 dpi). Note that a numerical value for the resolution pitch of the light-emitting element array chips 40 and the light-emitting units 50 other than 1200 dpi can be used in the present embodiment.

In the present embodiment, the arrow X direction, which is the long side direction of the light-emitting element array chip 40, is the rotation axis direction of the photosensitive drum 1, and the arrow Y direction, which is the short side direction of the light-emitting element array chip 40, is the rotation direction of the photosensitive drum 1. Also, an arrow Z direction is the layering direction of the layers of the light-emitting units 50, which have a multilayer structure described below, and is also the emission direction of the light from the light-emitting units 50. Note that the long side direction of the light-emitting element array chip 40 may be inclined by approximately ±1° with respect to the rotation axis direction of the photosensitive drum 1. Also, the short side direction of the light-emitting element array chip 40 may be inclined by approximately ±1° with respect to the rotation direction of the photosensitive drum 1.

Light-Emitting Element Array Chip

Next, the configuration of the light-emitting element array chip 40 will be described.

Figure 4:
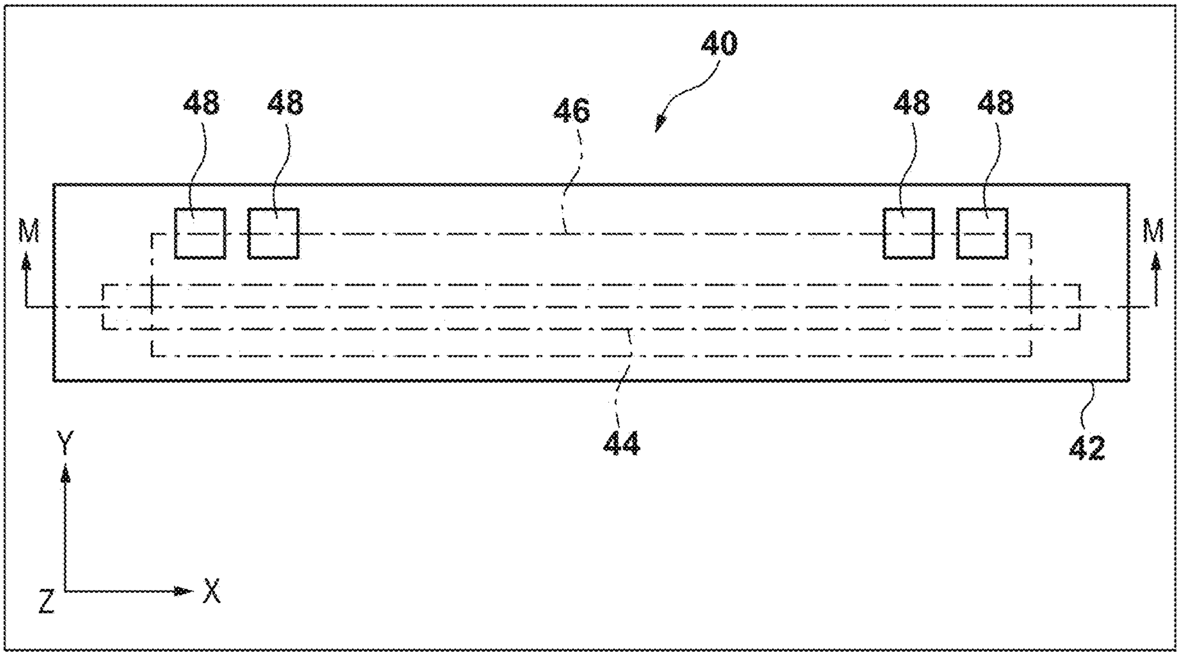
FIG. 4 is a schematic view of a light-emitting element array chip.
Figure 5:
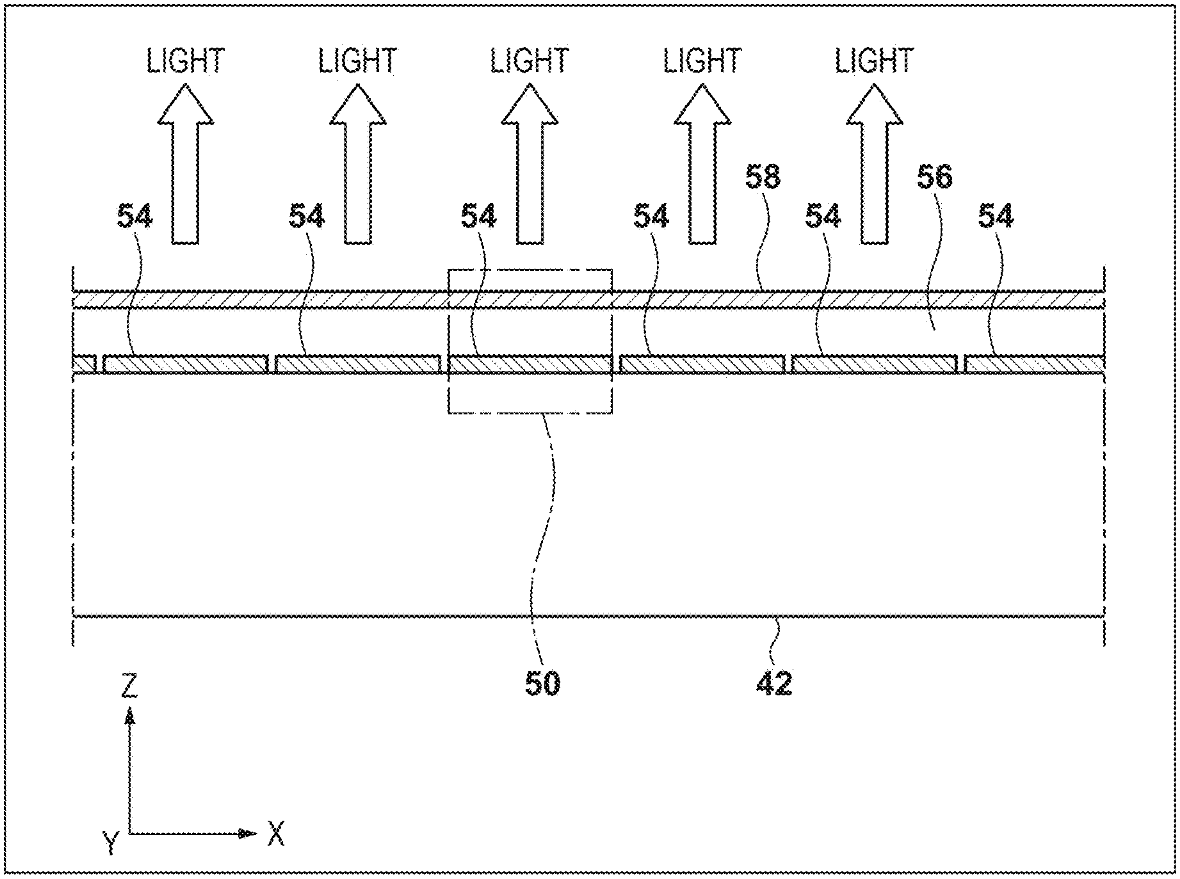
FIG. 5 is a cross-sectional view of the light-emitting element array chip.
Figure 6:
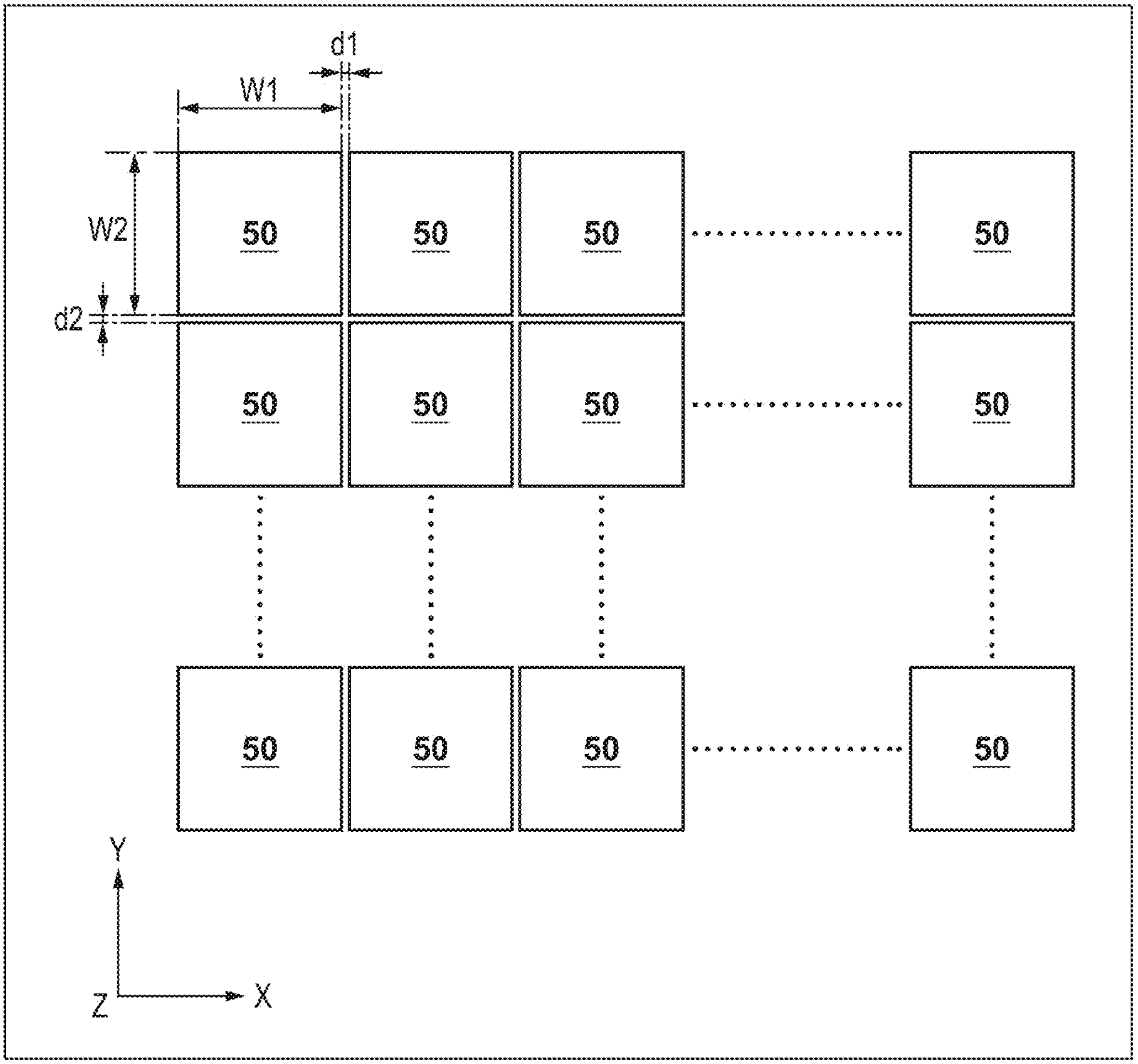
FIG. 6 is a schematic view for describing the arrangement of light-emitting units.

FIG. 4 is a schematic view of the light-emitting element array chip 40. FIG. 5 is a cross-sectional view taken along M-M illustrated FIG. 4. FIG. 6 is a schematic view for describing the arrangement of the light-emitting units 50.

As illustrated in FIG. 4, the light-emitting element array chip 40 includes a light-emitting substrate 42 with a built-in circuit unit 46 for controlling the light-emitting units 50, a light-emitting region 44 where the light-emitting units 50 are regularly disposed on the light-emitting substrate 42, and pads 48 for wire bonding. The input and output of signals between the outside of the light-emitting element array chip 40 and the circuit unit 46 and the power supply to the circuit unit 46 are performed via the pads 48 for wire bonding. Note that the circuit unit 46 can use a circuit including an analog drive circuit and/or a digital control circuit.

As illustrated in FIG. 5, the light-emitting unit 50 is configured from the light-emitting substrate 42, a plurality of lower electrodes 54 arranged in two-dimensions in the arrow X direction and the arrow Y direction with a constant gap inbetween (gaps d1 and d2 illustrated in FIG. 6) on the light-emitting substrate 42, a light-emitting layer 56, and an upper electrode 58.

The lower electrodes 54 (first electrode layer including a plurality of electrodes) are a plurality of electrodes formed in a layer on the light-emitting substrate 42 separated from one another provide to correspond to each pixel. In other words, each lower electrode 54 is provided to form a pixel.

The upper electrode 58 (second electrode layer) is disposed on the light-emitting layer 56 at a position opposite the side of the light-emitting layer 56 to where the lower electrodes 54 are disposed. The upper electrode 58 is an electrode that allows light of the light-emitting wavelength of the light-emitting layer 56 to pass through it (light-transmitting).

The circuit unit 46 controls the potential of the lower electrode 54 selected on the basis of a control signal generated in accordance with the image data and causes a potential difference between the selected lower electrode 54 and the upper electrode 58. When a potential difference is caused between the upper electrode 58 (positive electrode) and the lower electrode 54 (negative electrode), electrons flow from the negative electrode to the light-emitting layer 56 and positive holes flow from the positive electrode to the light-emitting layer 56. When the electrons and the positive holes recouple at the light-emitting layer 56, the light-emitting layer 56 emits light.

The light emitted by the light-emitting layer 56 that travels toward the upper electrode 58 passes through the upper electrode 58. The light travelling from the light-emitting layer 56 to the lower electrodes 54 is reflected by the lower electrodes 54 toward the upper electrode 58, and this reflected light passes through the upper electrode 58. In this manner, the light-emitting units 50 emit light. Note that though there is a time difference in the emission timing between the light emitted directly from the light-emitting layer 56 toward the upper electrode 58 and the light reflected by the lower electrodes 54 and emitted from the upper electrode 58, since the thickness of the layer of the light-emitting units 50 is very thin, the emission timing can be considered to be essentially the same.

Note that in the present embodiment, the light-emitting substrate 42 is a silicon substrate. The upper electrode 58 may be transparent to the light-emitting wavelength of the light-emitting layer 56. For example, by using a transparent electrode made of indium tin oxide (ITO) or the like, the open ratio is made essentially 100%, allowing the light emitted by the light-emitting layer 56 to be emitted through the upper electrode 58 unchanged. Also, in the present embodiment, the upper electrode 58 is a positive electrode that is provided to be shared by all of the lower electrodes 54. However, the upper electrode 58 may be separately provided for each lower electrode 54 or one upper electrode 58 may be provided for each plurality of lower electrodes 54.

The light-emitting layer 56 uses an organic EL film, inorganic EL layer, or the like. In a case where an organic EL film is used as the light-emitting layer 56, the light-emitting layer 56 may be a multilayer structure including, as necessary, function layers such as an electron transport layer, a hole transport layer, an electron injection layer, a hole injection layer, an electron blocking layer, a hole blocking layer. The light-emitting layer 56 may be continuously formed in the arrow X direction or may be divided into a size roughly equal to that of the lower electrodes 54. The lower electrodes 54 may be divided into a plurality of groups, and, for each group, one light-emitting layer 56 may be layered above the lower electrodes 54 belonging to the group.

Note that when a light-emitting material with low resistance to moisture, such as an organic EL layer or an inorganic EL layer, is used as the light-emitting layer 56, sealing may be performed to prevent the intrusion of moisture into the light-emitting region 44. The sealing method may include forming a sealing film as a single thin film or a multilayer film made of a silicon oxide, a silicon nitride, an aluminum oxide, or the like, for example. For the method for forming the sealing film, a method such as atomic layer deposition (ALD) with excellent covering performance on structures such as steps may be used, for example. Note that the material, configuration, forming method, and the like of the sealing film are not limited to the examples described above, and any appropriate and suitable replacement may be selected.

Also, the lower electrodes 54 may be a metal material with high reflectance with respect to the light-emitting wavelength of the light-emitting layer 56. For example, Ag, Al, an alloy of Ag and Al, or the like may be used. Also, the lower electrodes 54 may be formed using an Si process in conjunction with forming the circuit unit 46 to directly connect the lower electrodes 54 to the drive unit of the circuit unit 46. By forming the lower electrodes 54 via an Si process in this manner, the process rule is made highly accurate at approximately 0.2 μm. Thus, the lower electrodes 54 can be disposed accurately at a high density. Since the lower electrodes 54 can be disposed at a high density, most of the light-emitting region 44 can be made to emit light, and the utilization efficiency of the light-emitting region 44 can be improved. Note that the organic material of the light-emitting layer 56 fills up the space between the lower electrodes 54, and the lower electrodes 54 are separated by the organic material.

The current flowing through the light-emitting unit 50 and the amount of light emitted have a substantially proportional relationship. Thus, by controlling the current flowing through the light-emitting unit 50, the amount of light of the light-emitting unit 50 can be controlled. The light-emitting unit 50 has a threshold voltage, and when the voltage between both ends of the light-emitting unit 50 is equal to or greater than the threshold voltage, a current beings to flow to the light-emitting unit 50. Thereafter, the current flows substantially linearly. Since there is variation in the threshold voltage of the light-emitting units 50, there is a slight difference in the voltage at which the current begins to flow through the light-emitting units 50. At a stage before the product is shipped from the factory, the light-emitting units 50 of the light-emitting element array chip 40 are made to emit light individually in order, and the current flowing through the light-emitting units 50 is adjusted so that the light gathered via the rod lens arrays 23 are a predetermined amount of light. Note that at a stage before the product is shipped from the factory, for the exposure head 6, not only is the amount of light adjusted as described above, but focus adjustment is also performed to adjust the gaps between the light-emitting element array chip 40 and the rod lens array 23.

Also, as illustrated in FIG. 6, the light-emitting units 50 are two-dimensionally arranged in the arrow X direction and the arrow Y direction at predetermined intervals in the light-emitting region 44. In other words, in the light-emitting region 44 of one light-emitting element array chip 40, the plurality of light-emitting units 50 are arranged in the arrow X direction, with the plurality of light-emitting units 50 arranged in the arrow X direction forming a light-emitting row. A plurality of the light-emitting rows are arranged side by side in the arrow Y direction, and in the present embodiment, a number of rows n of the light-emitting rows is six. Note that a configuration in which a numerical value other than six is used for the number of light-emitting rows can be used in the present embodiment.

Also, in the present embodiment, a width W1 in the arrow X direction of the light-emitting unit 50 is 20.90 μm, and a gap d1 between light-emitting units 50 adjacent in the arrow X direction is 0.26 μm. In other words, the light-emitting units 50 are arranged in the arrow X direction at a pitch of 21.16 μm (1200 dpi). Also, as with the width W1, a width W2 in the arrow Y direction of the light-emitting unit 50 is also 20.90 μm, and as with the gap d1, a gap d2 is 0.26 μm. The light-emitting units 50 are also arranged in the arrow Y direction at a pitch of 21.16 μm (1200 dpi). In other words, the light-emitting units 50 according to the present embodiment have a square shape with each side being 20.90 μm and the area being 436.81 $\mu m^2$. This is approximately 97.6% of the area of one pixel which is 447.7456 $\mu m^2$. Organic light-emitting material gives a smaller amount of light compared to LED. Regarding this, as described above, by giving the light-emitting units 50 a square shape and decreasing the distance between adjacent light-emitting units 50, a light-emitting area can be ensured for obtaining an amount of light sufficient for changing the potential of the photosensitive drum 1.

Note that the area of the light-emitting unit 50 that is ensured may be 90% or greater relative to the total area of one pixel. Thus, for the image forming apparatus A with an output resolution of 1200 dpi, the width of a side of the light-emitting unit 50 may be approximately 20.07 μm or greater. Also, for the image forming apparatus A with an output resolution of 2400 dpi, the width of a side of the light-emitting unit 50 may be approximately 10.04 μm or greater. The shape of the light-emitting unit 50 is not limited to being a square, and the shape other than a quadrangle such as a polygon, a circle, an ellipse, and the like may be used, as long as the image quality of the output image obtained by emitting light of an exposure region size corresponding to the output resolution of the image forming apparatus A is of a level that satisfies the design specifications of the image forming apparatus A. Also, the gap d2 between adjacent light-emitting units 50 in the arrow Y direction and the number of rows in the arrow Y direction of the light-emitting units 50 are determined on the basis of the scanning speed of the exposure head 6, the amount of light required for exposure processing, the resolution, and the like.

Figure 7A:
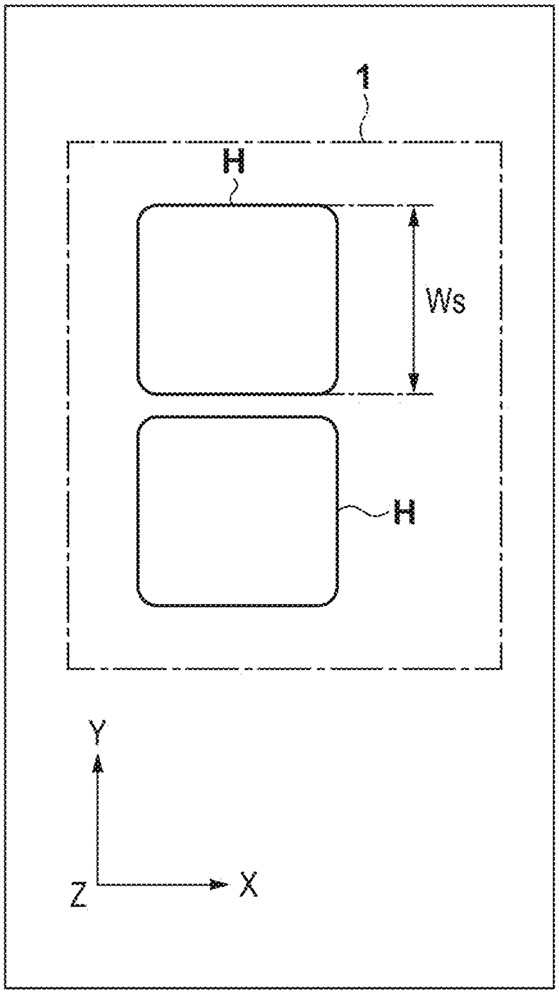
FIG. 7A is a schematic view for describing an emission position on the photosensitive drum for the light simultaneously emitted from two light-emitting units adjacent in a sub-scan direction.
Figure 7B:
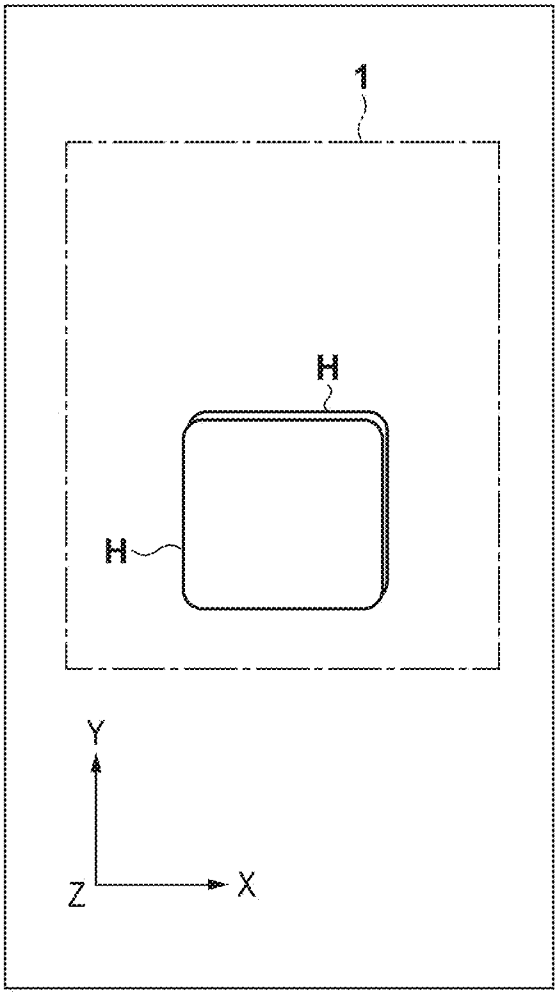
FIG. 7B is a schematic view for describing an emission position on the photosensitive drum for the light emitted at different times from two light-emitting units adjacent in the sub-scan direction.

FIGS. 7A and 7B are schematic views for describing an emission position on the photosensitive drum 1 for the light emitted from two light-emitting units 50 at overlapping positions in the arrow Y direction. As illustrated in FIG. 7A, in a case where two light-emitting units 50 at overlapping positions in the Y direction are simultaneously lit up, the emission positions on the photosensitive drum 1 of light H emitted from the two light-emitting units 50 are not aligned in the rotation direction (arrow Y direction, sub-scan direction) of the photosensitive drum 1 in a similar manner to the positional relationship of the two light-emitting units 50. However, as illustrated in FIG. 7B, in a case where the light up timing of the two light-emitting units 50 is changed according to the rotational speed of the photosensitive drum 1, the emission positions on the photosensitive drum 1 of the light H emitted from the two light-emitting units 50 can be made substantially the same. Light being emitted at substantially the same position on the photosensitive drum 1 from a plurality of light-emitting units 50 arranged in the arrow Y direction in this manner is referred to as multiple exposure. When the number of light-emitting units 50 arranged in the arrow Y direction that are used in multiple exposure increases, the amount of received light at a portion on the photosensitive drum 1 when multiple exposure is performed increases.

In order to align the emission positions on the photosensitive drum 1 of the light emitted from the two light-emitting units 50 at overlapping positions in the arrow Y direction, the light up timing of the light-emitting unit 50 on the downstream side of the rotation direction of the photosensitive drum 1 needs to be delayed by an amount of time corresponding to a delay amount T with respect to the light up timing of the light-emitting unit 50 on the upstream side. Here, the delay amount T (μs) is calculated using the following Formula 1 where Vdr (mm/s) is the rotational speed of the photosensitive drum 1 and the width W2 (μm) and the gap d2 are used.

$$T = ((W2 + d2) \div 1000 \div Vdr \quad \text{(Formula 1)}$$

Also, in the present embodiment, a light emission signal is generated such that the maximum value Tw(s) of the light emission time of each light-emitting unit 50 is equivalent to the time of one line in the sub-scan direction, and the maximum value Tw(s) is represented by the following Formula 2 from the resolution of 1200 dpi and the rotational speed Vdr (mm/s) of the photosensitive drum 1.

$$Tw = (25.4 \div 1200) \div Vdr \quad \text{(Formula 2)}$$

System Configuration of Exposure Head

Next, the system configuration of the image controller unit 70 and the exposure heads 6 provided in the body side of the image forming apparatus A will be described. Hereinafter, the processing for a single color from among the four colors, yellow, magenta, cyan, and black, will be described. However, when performing image formation operations, similar processing is executed in parallel for the four colors.

FIG. 8 is a block diagram illustrating the system configuration of the image controller unit 70 and the exposure head 6. As illustrated in FIG. 8, the image controller unit 70 includes an image data signal generation unit 71 (image data signal generation unit), a chip data conversion unit 72 (image data signal transmitting unit), the CPU 73 (control unit), and a synchronization signal generation unit 74 (control signal generation unit).

CPU is an abbreviation for a central processing unit, and the CPU 73 is a processor. Note that the image controller unit 70, instead of or in addition to the CPU 73, may include a micro processing unit (MPU), a graphics processing unit (GPU), a quantum processing unit (QPU), or similar processor as a control unit. The CPU 73 executes the various types of processing described below by loading programs stored in a storage such as a hard disk drive (HDD), solid state drive (SSD), or the like.

The image controller unit 70, via the units described above, executes image data processing and image formation timing processing and transmits control signals for controlling the exposure head 6 with respect to the printed substrate 22 of the exposure head 6. Specifically, the control signal may be an image data signal, a chip select signal, a clock signal, a line synchronization signal, and a CPU 73 communication signal, and these signals are transmitted from the image controller unit 70 to the exposure head 6 via the various signal lines described below.

Image data of a document read by the image reading unit 90 or image data transferred from an external device via a network is input to the image data signal generation unit 71. The image data signal generation unit 71 executes dither processing at a resolution instructed by the CPU 73 on the input image data and generates an image data signal for outputting an image. In the present embodiment, the image data signal generation unit 71 executes dithering processing at a resolution of 1200 dpi. The image data signal indicates eight levels of grayscale with the density value ranging from 0 to 7 with a 3-bit width. A density value of 0 indicates the minimum density, and a density value of 7 indicates the maximum density. Note that the CPU 73 transmits various types of instructions to the image data signal generation unit 71 by transmitting communication signals via a communication signal line 79.

The synchronization signal generation unit 74 periodically generate a line synchronization signal indicating a partition for one line in the main scan direction of the image data signal. In other words, the synchronization signal generation unit 74 periodically generates a line synchronization signal as a control signal that controls the timing of the start of light emission by the light-emitting unit 50 selected according to the image data signal when forming an electrostatic latent image for one line in the main scan direction. In the case of forming an image in the normal mode, the CPU 73 sends an instruction for the line synchronization signal to the synchronization signal generation unit 74, with the cycle in which the surface of the photosensitive drum 1 moves, in the rotation direction, a pixel size corresponding to the resolution of the sub-scan direction with respect to the preset rotational speed of the photosensitive drum 1 corresponding to one line cycle. Specifically, when executing in the normal mode, the CPU 73 instructs the synchronization signal generation unit 74 to generate a line synchronization signal each time the photosensitive drum 1 rotates a 1200 dpi resolution pitch (approximately 21.16 μm) rotation. For example, in a case where the photosensitive drum 1 rotates at 200 mm/s in the normal mode, the synchronization signal generation unit 74 generates a line synchronization signal with a cycle of 105.8 μs.

The chip data conversion unit 72, as described below, includes a line buffer 15 and receives and stores image data signals from the image data signal generation unit 71. Also, in sync with the line synchronization signal generated at the synchronization signal generation unit 74 and input via a line synchronization signal line 78, an image data signal of one line is divided at each light-emitting element array chip 40 according to the CPU 73 instruction and transmitted via an image data signal line 77. Also, the chip data conversion unit 72 transmits a clock signal and a chip select signal representing an effective range of the image data signal to the light-emitting element array chip 40 via a chip select signal line 75 and a clock signal line 76.

A head information storage unit 171 provided in the exposure head 6 is connected to the CPU 73 via the communication signal line 79. The head information storage unit 171 stores, as head information, the light emission amount of each light-emitting element array chip 40 and installed position information. Also, the chip select signal line 75, the clock signal line 76, the image data signal line 77, the line synchronization signal line 78, and the communication signal line 79 are connected to all of the light-emitting element array chips 40. The light-emitting element array chip 40 causes the light-emitting units 50 to emit light on the basis of the setting value of each signal input via the signal lines described above from the image controller unit 70. Also, each light-emitting element array chip 40 is cascade-connected to the other light-emitting element array chips 40 via the chip select signal lines 75. Each light-emitting element array chip 40 generates a chip select signal to be used at the other light-emitting element array chips 40 and transmits the chip select signal via the chip select signal line 75.

Chip Data Conversion Unit

Next, the configuration of the chip data conversion unit 72 will be described.

Figure 9:
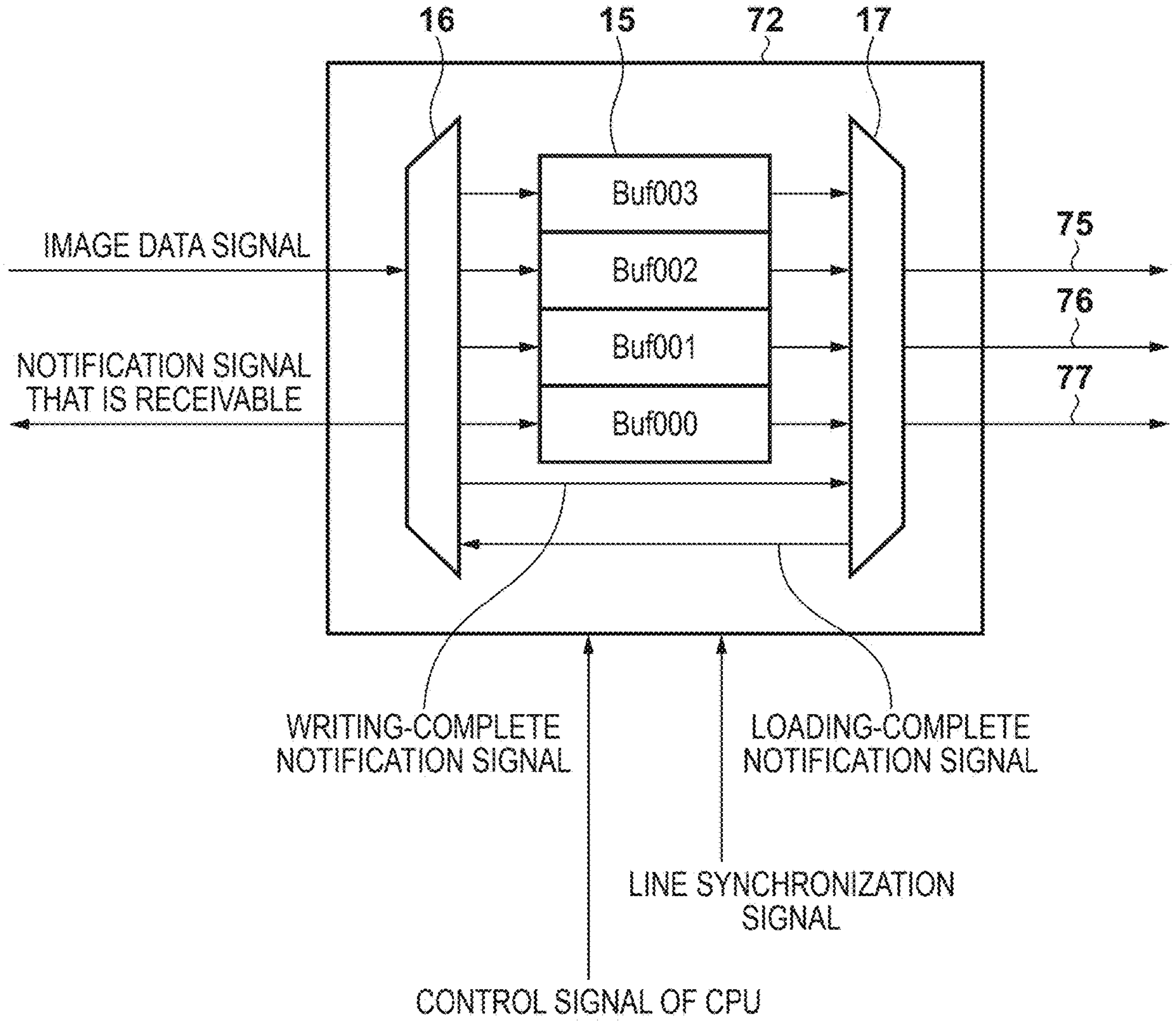
FIG. 9 is a block diagram illustrating the configuration of a chip data conversion unit.

FIG. 9 is a block diagram illustrating the configuration of the chip data conversion unit 72. As illustrated in FIG. 9, the chip data conversion unit 72 includes the line buffer 15, a buffer writing control unit 16, and a buffer loading control unit 17. The CPU 73 transmits a control signal to the chip data conversion unit 72 to control the line buffer 15, the buffer writing control unit 16, and the buffer loading control unit 17.

The buffer writing control unit 16 transmits a notification signal that is receivable by the image data signal generation unit 71. In this manner, an image data signal is output from the image data signal generation unit 71. The buffer writing control unit 16 stores an image data signal output from the image data signal generation unit 71 in the line buffer 15 for each line. The line buffer 15 includes four data storage areas (Buf000-Buf003) and stores the image data signals of one line in the order of Buf000→Buf001→Buf002→Buf003→Buf000→Buf001. The buffer writing control unit 16 transmits a writing-complete notification signal to the buffer loading control unit 17 each time one line of image data signal is stored in the line buffer 15. Also, in a case where the data storage area of the line buffer 15 is full, the buffer writing control unit 16 cancelling transmission of the receivable notification signal to the image data signal generation unit 71 and stops output of the image data signal. Note that the number of data storage areas of the line buffer 15 is not limited to four, and any number may be used as long as the function of the chip data conversion unit 72 can be realized.

When the writing-complete notification signal is received, the buffer loading control unit 17, in sync with the line synchronization signal, divides the image data signal for one line stored in the line buffer 15 to allocate them to each light-emitting element array chip 40 and transmits the divided image data signal together with the clock signal and the chip select signal to the light-emitting element array chips 40. When the image data signal for one line is finished being transmitted to the light-emitting element array chips 40, the buffer loading control unit 17 transmits the loading-complete notification signal to the buffer writing control unit 16 to notify that one of the data storage areas of the line buffer 15 is empty. The buffer loading control unit 17 can transmit, instead of the image data signal stored in the line buffer 15, image data signals for not lighting up all of the light-emitting units 50 of the exposure head 6 to the light-emitting element array chips 40 according to an instruction from the CPU 73. The image data signals for not lighting up all of the light-emitting units 50 of the exposure head 6 are all image data signals of either "0" or "1".

System Configuration of Light-Emitting Element Array Chip

Next, the system configuration of the light-emitting element array chip 40 will be described.

Figure 10:
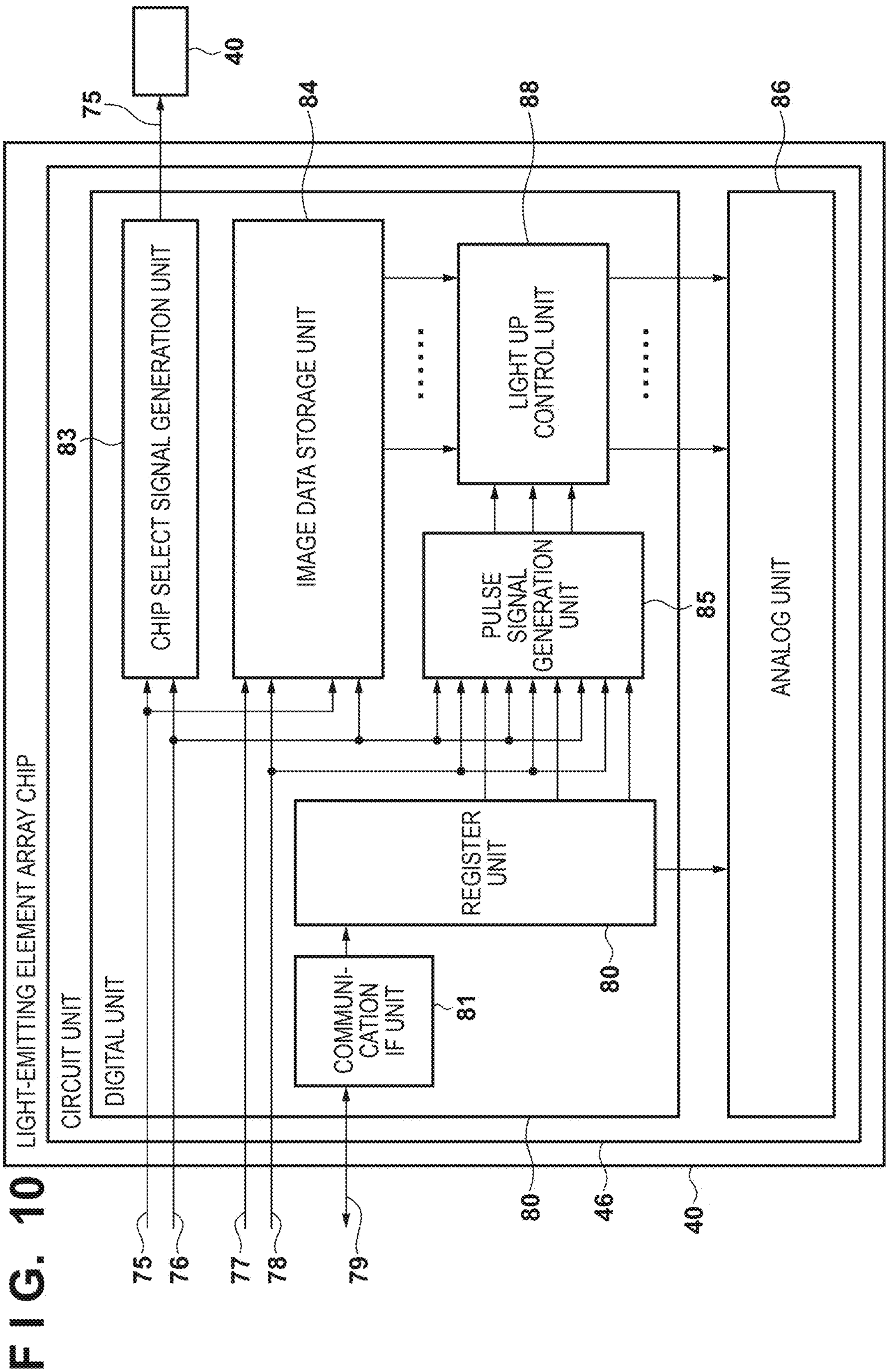
FIG. 10 is a block diagram illustrating the system configuration of the light-emitting element array chip.

FIG. 10 is a block diagram illustrating the system configuration of the light-emitting element array chip 40. As illustrated in FIG. 10, the circuit unit 46 of the light-emitting element array chip 40 is configured from a digital unit 80 and an analog unit 86. The analog unit 86, as described below, generates a signal for driving the light-emitting units 50 on the basis of a pulse signal generated at the digital unit 80.

The digital unit 80 includes a communication IF unit 81, a register unit 82, a chip select signal generation unit 83, an image data storage unit 84, and a pulse signal generation unit 85. Via these units, the digital unit 80 generates a pulse signal for causing the light-emitting units 50 to emit light that is transmitted to the analog unit 86 on the basis of a setting value preset by a communication signal in sync with the clock signal, a chip select signal, an image data signal, and a line synchronization signal.

The communication IF unit 81 controls the writing and the reading of the setting value for the register unit 82 on the basis of the communication signal input from the CPU 73. The register unit 82 stores the setting value required for operation. The setting value includes width information of the pulse signal generated at the pulse signal generation unit 85, cycle information of the line synchronization signal, setting information of the drive current set at the analog unit 86, and information of the rotational speed for the normal mode and the low-speed mode of the photosensitive drum 1.

The chip select signal generation unit 83 delays the input chip select signal and generates a chip select signal to be used at the other light-emitting element array chips 40 connected via the chip select signal line 75. The image data storage unit 84 holds the image data signal while the input chip select signal is valid and outputs the image data signal to a light up control unit 88 in sync with the line synchronization signal.

The pulse signal generation unit 85 generates a pulse signal for controlling the light-emission timing of the light-emitting units 50 that is output to the light up control unit 88 on the basis of the width information of the pulse signal stored in the register unit 82 and the line synchronization signal cycle. The light up control unit 88, on the basis of the image data signal output from the image data storage unit 84, selects whether or not to output the pulse signal generated at the pulse signal generation unit 85 to the analog unit 86 for each light-emitting unit 50 and outputs the pulse signal to the analog unit 86.

Image Data Storage Unit

Next, the configuration of the image data storage unit 84 will be described.

Figure 11A:
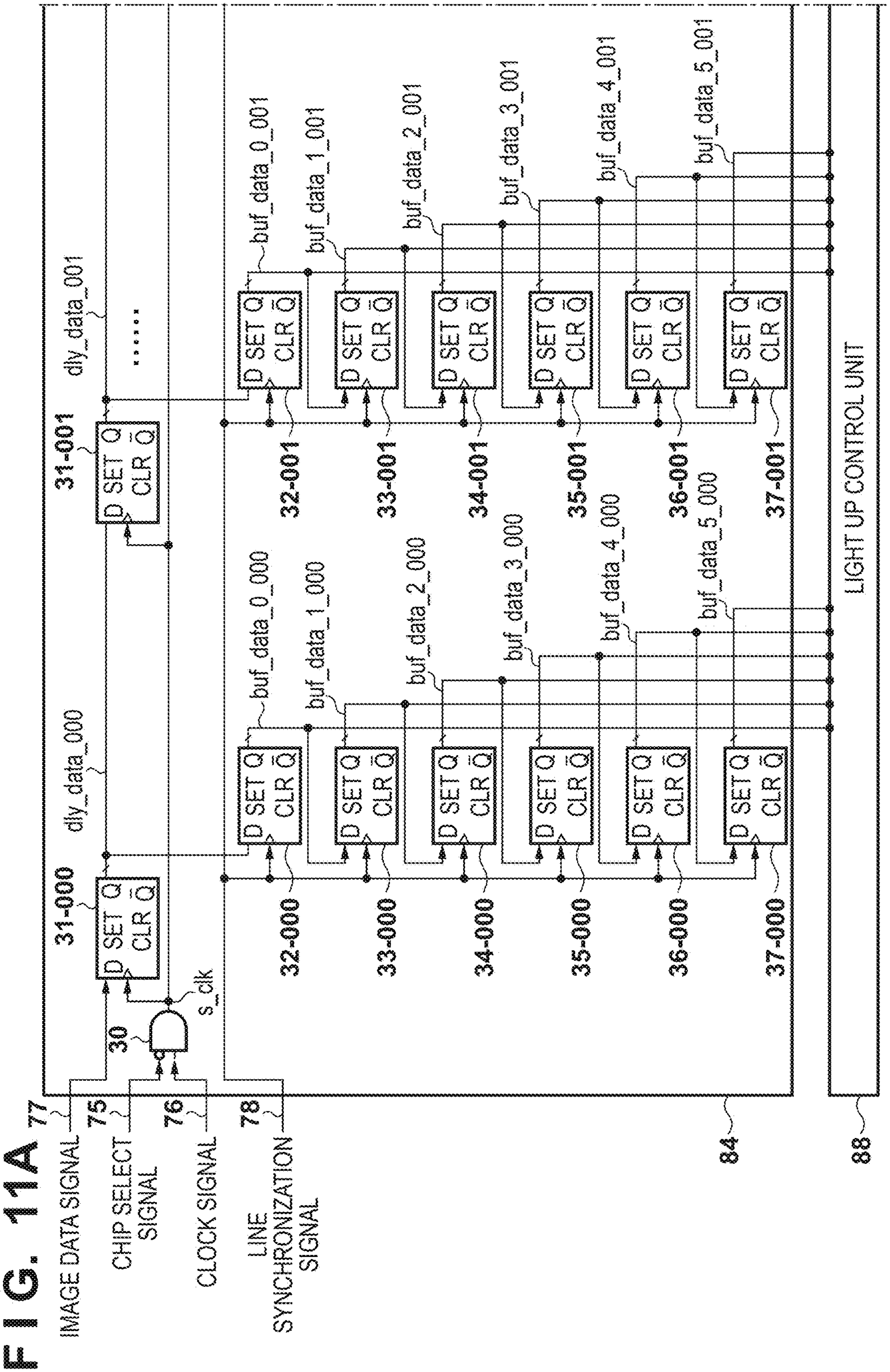
FIG. 11A is a circuit configuration diagram of an image data storage unit.
Figure 11B:
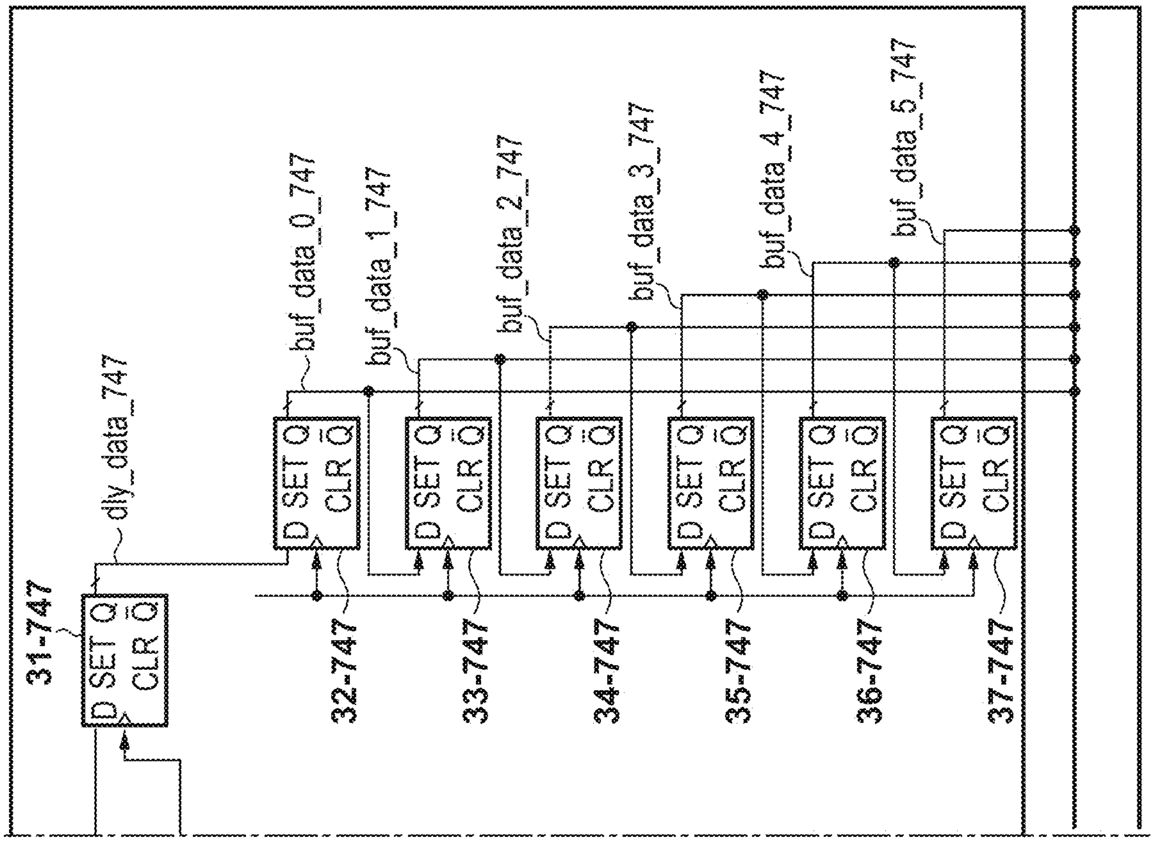
FIG. 11B is a circuit configuration diagram of an image data storage unit.

FIGS. 11A and 11B are a circuit configuration diagram of the image data storage unit 84. Note that in FIGS. 11A and 11B, the image data signal may also be denoted as "data". Also, though the chip select signal and the line synchronization signal are negative logic signals, these may be positive logic signals.

As illustrated in FIGS. 11A and 11B, the image data storage unit 84 includes a clock gate circuit 30 and flip-flop circuits 31 to 37. The flip-flop circuit 31 (31-000 to 31-747) receives, as the original input, the image data signal input to the image data storage unit 84 and includes 748 flip-flop circuits, the same number of light-emitting units 50, connected in series in the arrow X direction of the light-emitting element array chip 40.

This also applies to the flip-flop circuits 32 to 37, and the same number as the number of light-emitting units 50 are provided in the arrow X direction of the light-emitting element array chip 40 (32-000 to 32-747, 33-000 to 33-747, 34-000 to 34-747, 35-000 to 35-747, 36-000 to 36-747, and 37-000 to 37-747).

The clock gate circuit 30 outputs the logical product of the inverted signal of the chip select signal and the clock signal and outputs the clock signal to the flip-flop circuit 31 only when the chip select signal is valid. The flip-flop circuit 31 operates using the clock signal transmitted from the clock gate circuit 30 and outputs the image data signal (dly_data_000).

The flip-flop circuit 32-000 receives the output of the flip-flop circuit 31-000 as an input and operates using the line synchronization signal. The output (buf_data_0_000) of the flip-flop circuit 32-000 is input to the flip-flop circuit 33-000 and the light up control unit 88.

The flip-flop circuit 33-000 receives the output of the flip-flop circuit 32-000 as an input and operates using the line synchronization signal. The output (buf_data_1_000) of the flip-flop circuit 33-000 is input to the flip-flop circuit 34-000 and the light up control unit 88.

The flip-flop circuit 34-000 receives the output of the flip-flop circuit 33-000 as an input and operates using the line synchronization signal. The output (buf_data_2_000) of the flip-flop circuit 34-000 is input to the flip-flop circuit 35-000 and the light up control unit 88.

The flip-flop circuit 35-000 receives the output of the flip-flop circuit 34-000 as an input and operates using the line synchronization signal. The output (buf_data_3_000) of the flip-flop circuit 35-000 is input to the flip-flop circuit 36-000 and the light up control unit 88.

The flip-flop circuit 36-000 receives the output of the flip-flop circuit 35-000 as an input and operates using the line synchronization signal. The output (buf_data_4_000) of the flip-flop circuit 36-000 is input to the flip-flop circuit 37-000 and the light up control unit 88.

The flip-flop circuit 37-000 receives the output of the flip-flop circuit 36-000 as an input and operates using the line synchronization signal. The output (buf_data_5_000) of the flip-flop circuit 37-000 is input to the light up control unit 88.

Note that the flip-flop circuits 32-001 to 32-747, 33-001 to 33-747, 34-001 to 34-747, 35-001 to 35-747, 36-001 to 36-747, and 37-001 to 37-747 operated similarly to the flip-flop circuits 32-000 to 37-000 described above.

Figure 12:
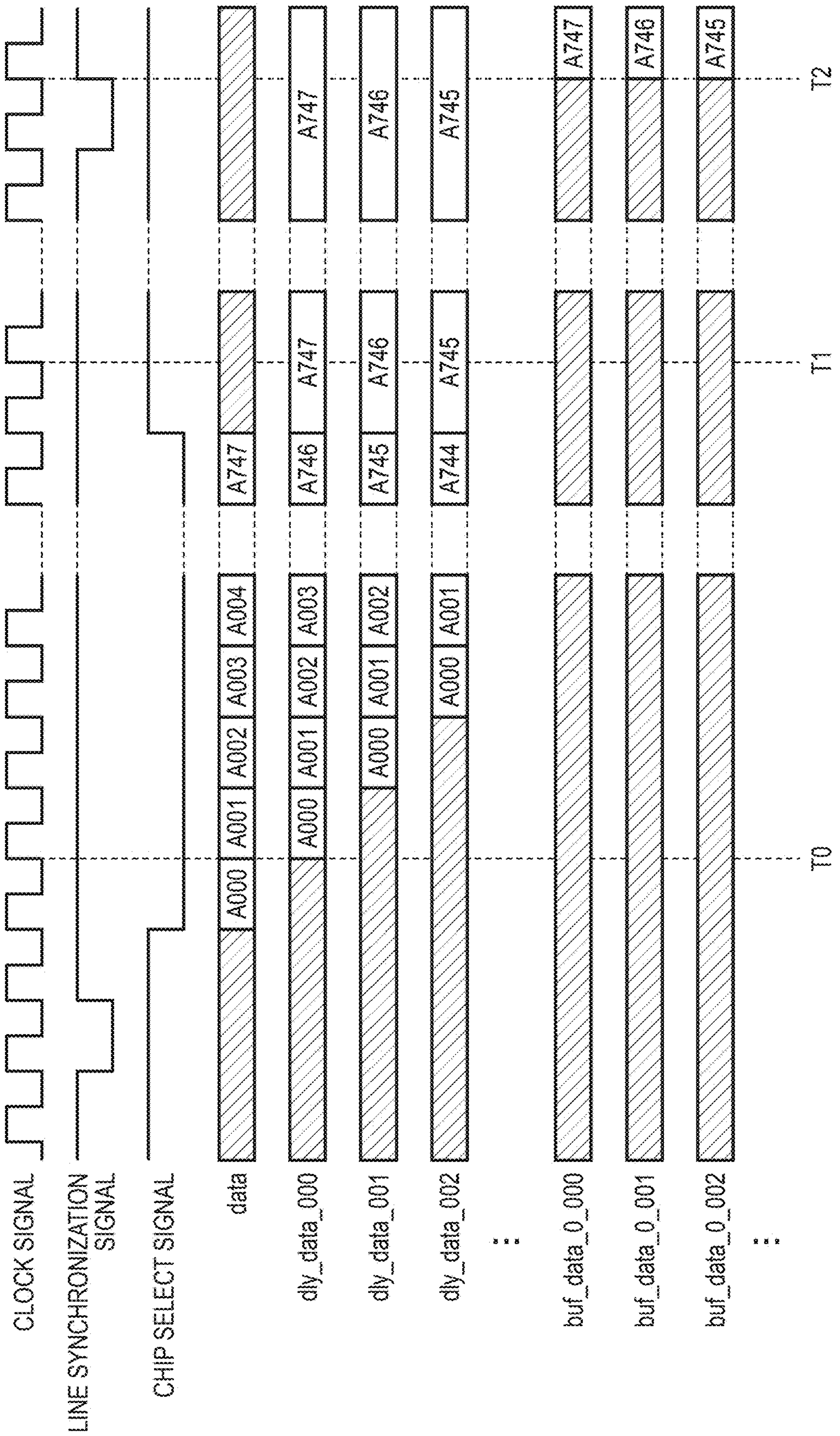
FIG. 12 is a timing chart illustrating the operations in the main scan direction in the image data storage unit.

FIG. 12 is a timing chart illustrating the operations in the main scan direction in the image data storage unit 84. The symbols illustrated in FIG. 12 mean the same as the symbols illustrated in FIGS. 11A and 11B. As illustrated in FIG. 12, from time T0 at which the low output of the chip select signal is at a rise in the clock signal to T1, the image data signal shifts in order from data→dly_data_000→dly_data_001. The low output of the chip select signal is input so as to cover 748 pulses in the clock signal identical in number to the light-emitting portions 50 in the main scanning direction. Thus, an image data signal for one line is held as dly_data_000 to dly_data_747.

After time T1, the chip select signal is high. Thus, this is held without a shift operation. At time T2 at which a low output of the line synchronization signal is at a rise in the clock signal, an image data signal for one line shifts all at once as buf_data_0_000 to buf_data_0_747 from dly_data_000→buf_data_0_000 and dly_data_001→buf_data_0_001 and is then output to the light up control unit 88.

Figure 13:
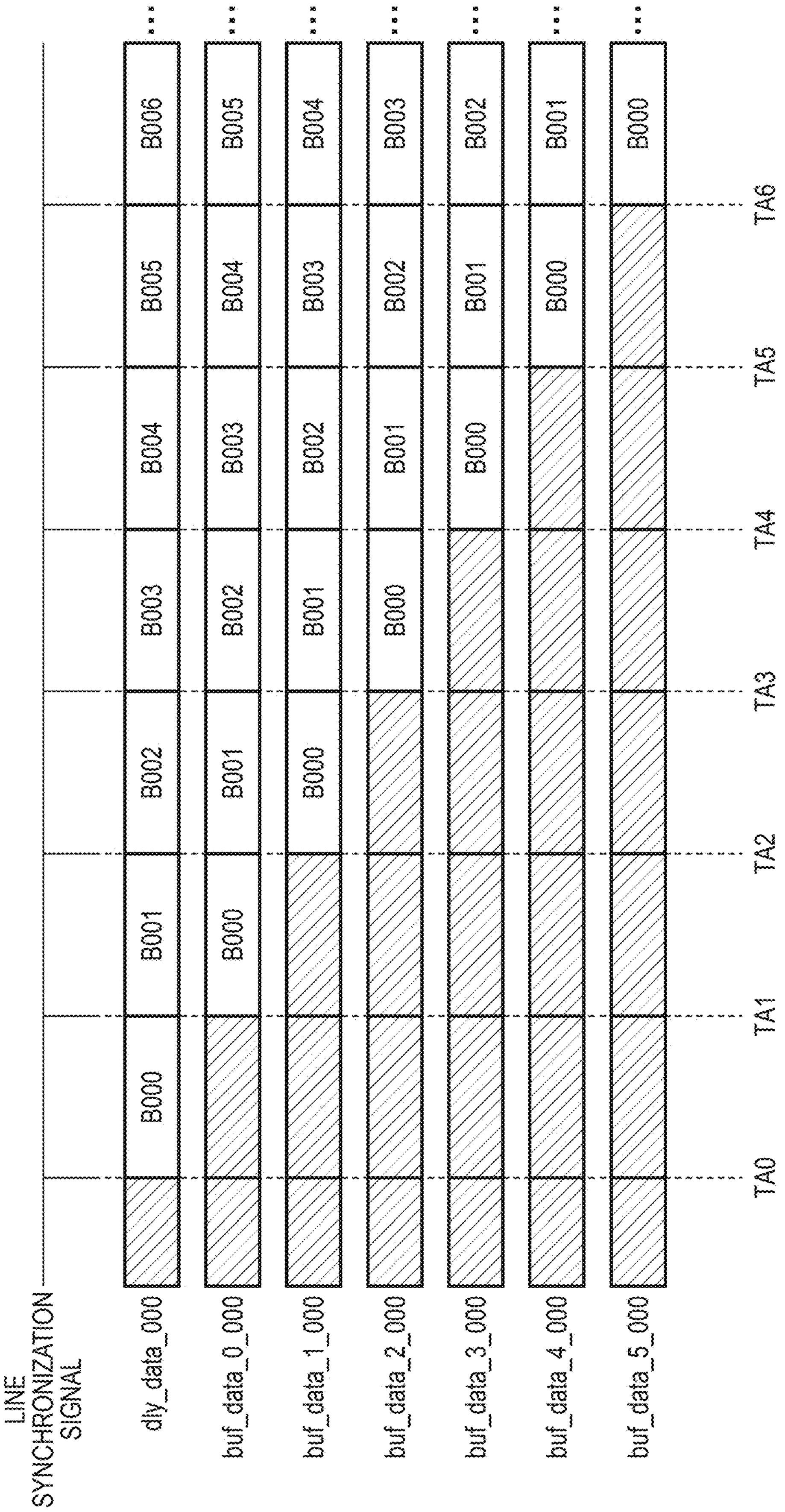
FIG. 13 is a timing chart illustrating the operations in the sub-scan direction when in the normal mode in the image data storage unit.

FIG. 13 is a timing chart illustrating the operations in the sub-scan direction when in the normal mode in the image data storage unit 84. The symbols illustrated in FIG. 13 mean the same as the symbols illustrated in FIGS. 11A and 11B. Hereinafter, the output buf_data_0_000, buf_data_1_000, buf_data_2_000, buf_data_3_000, buf_data_4_000, and buf_data_5_000 of the flip-flop circuits 32-000, 33-000, 34-000, 35-000, 36-000, and 37-000 illustrated in FIGS. 11A and 11B will be described. Though omitted from the description, the same applies to buf_data_0_001 to buf_data_0_747, buf_data_1_001 to buf_data_1_747, buf_data_2_001 to buf_data_2_747, buf_data_3_001 to buf_data_3_747, buf_data_4_001 to buf_data_4_747, and buf_data_5_001 to buf_data_5_747.

As illustrated in FIG. 13, each time the line synchronization signal rises from low to high, there is a shift of dly_data_000→buf_data_0_000 and buf_data_0_000→buf_data_1_000. Thus, the value of B000 of dly_data_000 at time TA0 is output as buf_data_0_000 at time TA1, buf_data_1_000 at time TA2, and buf_data_2_000 at time TA3 to the light up control unit 88.

In this manner, multiple exposure is realized by connecting buf_data_0_000, buf_data_1_000, buf_data_2_000, buf_data_3_000, buf_data_4_000, and buf_data_5_000 in order from the light-emitting unit 50 that is first exposed on the photosensitive drum 1.

Analog Unit

Next the configuration of the analog unit 86 will be described. Note that hereinafter, two drive units 61 that drive two light-emitting units 50 will be described, but all of the light-emitting units 50 are driven in a similar manner by similar drive units 61.

Figure 14:
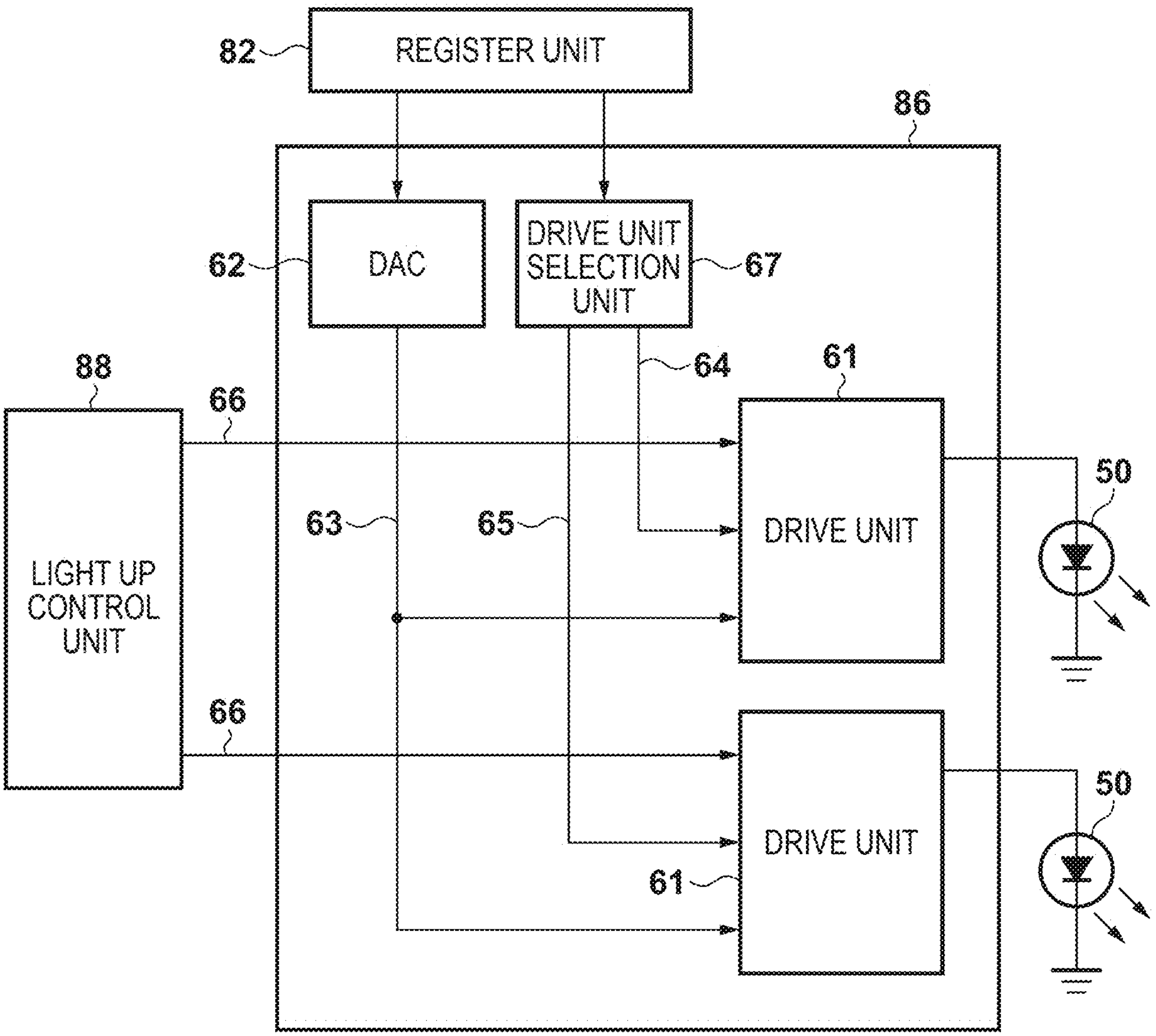
FIG. 14 is a block diagram illustrating the configuration of an analog unit.

FIG. 14 is a block diagram illustrating the configuration of the analog unit 86. As illustrated in FIG. 14, the analog unit 86 includes the drive unit 61 for driving the light-emitting units 50, a digital-to-analog converter or DAC 62, and a drive unit selection unit 67.

The DAC 62 supplies the drive unit 61 with an analog voltage for determining the drive current via a signal line 63 on the basis of the data set in the register unit 82. The pulse signal output from the light up control unit 88 is input to the drive unit 61 via a signal line 66. In this manner, an analog voltage for determining the drive current and a pulse signal are input to the drive unit 61. Then, the drive unit 61, on the basis of these signals, controls the drive circuit and light emission time of the light-emitting units 50 via a drive circuit described below.

The drive unit selection unit 67, on the basis of the data set in the register unit 82, supplies a drive unit select signal for selecting the drive unit 61 to two drive units 61 via signal lines 64 and 65. Here, a drive unit select signal is generated so that only a signal connected to the selected drive unit 61 becomes high. For example, in a case where the upper drive unit 61 illustrated in FIG. 14 is selected, a high signal is supplied only to the signal line 64 and a low signal is supplied to the signal line 65. The two drive units 61 are set with an analog voltage for determining the drive current by the DAC 62 at the timing when the drive unit select signal becomes high. In this manner, the CPU 73 successively selects the drive units 61 via the register unit 82 and sets the analog voltage of the selected drive unit 61 so that the analog voltage of all of the drive units 61 is set using a single DAC 62.

Drive Unit

Next, the configuration of the drive unit 61 will be described.

Figure 15:
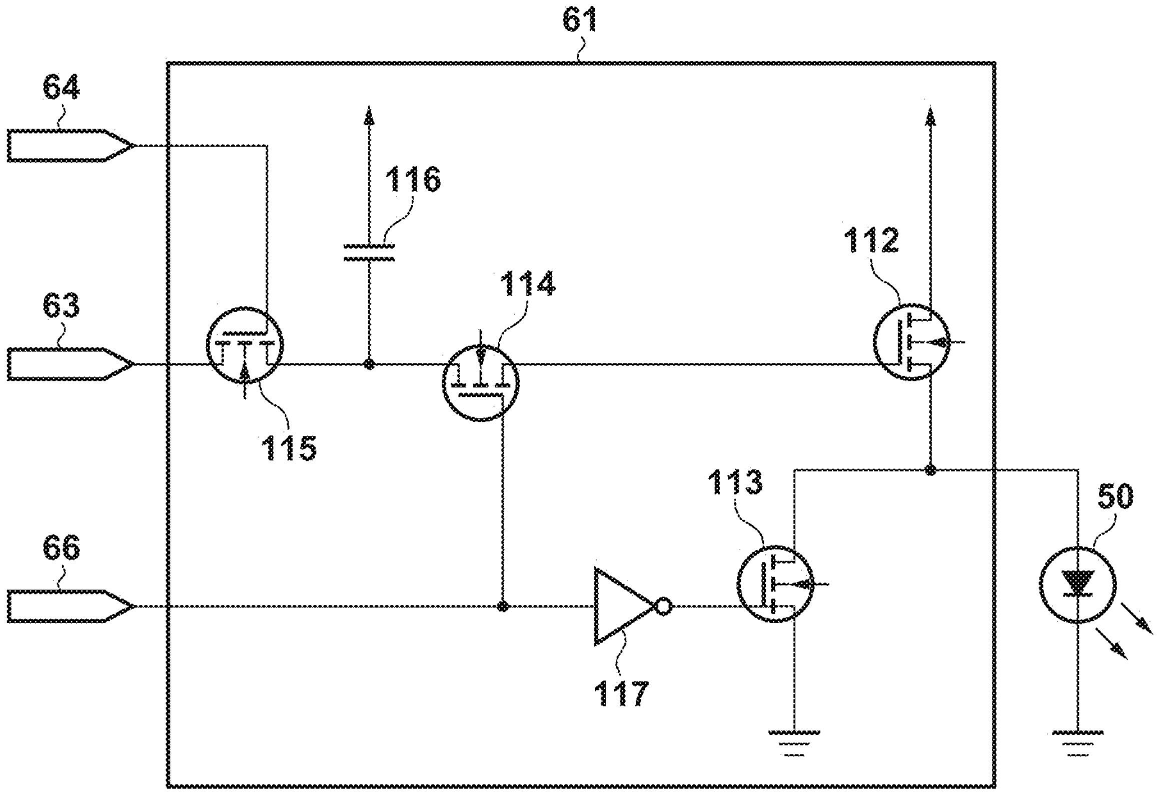
FIG. 15 is a circuit diagram of a drive unit.

FIG. 15 is a circuit diagram of the drive unit 61. As illustrated in FIG. 15, the drive unit 61 includes MOSFET 112 to 115, a capacitor 116, and an inverter 117.

The MOSFET 112 supplies the light-emitting unit 50 with a drive current according to the value of the gate voltage. In a case where the gate voltage is a low level, the MOSFET 112 controls the current so that the drive current is off (turned off). The signal line 63 is connected to the gate of the MOSFET 114. In a case where the pulse signal input via the signal line 66 is high, the MOSFET 114 passes the voltage charged at the capacitor 116 to the MOSFET 112.

The drive unit select signal transmitted from the drive unit selection unit 67 via the signal line 64 is connected to the gate of the MOSFET 115. The MOSFET 115 is on when the input drive unit select signal is high, and the capacitor 116 is charged with the analog voltage output from the DAC 62 and transmitted via the signal line 63. In the present embodiment, the DAC 62 sets the analog voltage at the capacitor 116 at a timing before image formation, and during image formation operations, keeps the MOSFET 115 off and holds the voltage level.

Via the operations described above, the MOSFET 112 supplies the light-emitting unit 50 with a drive current according to set analog voltage and the pulse signal. Also, in a case where the input capacity of the light-emitting unit 50 is large and the response rate when off is slow, the MOSFET 113 can speed up the response rate when off. A signal resulting from logic-inversion by the inverter 117 is input to the gate of the MOSFET 113. In a case where the pulse signal is low, the gate of the MOSFET 113 becomes high, and a charge changed at the input capacitance of the light-emitting unit 50 is forcibly discharged.

Issues when in Low-Speed Mode

Next, issues when in low-speed mode will be described. The CPU 73 can execute in the normal mode or the low-speed mode when performing image formation, and the rotational speed of the photosensitive drum 1 is changed when the modes are switched. Here, in a case where, in the low-speed mode, similarly to in the normal mode, the CPU 73 controls the synchronization signal generation unit 74 with the time during which the photosensitive drum 1 rotates corresponding to the pixel size corresponding to the resolution in the sub-scan direction, as the cycle of the line synchronization signal, the following issue occurs.

In other words, when the rotational speed of the photosensitive drum 1 decreases, the cycle of the line synchronization signal increases, causing the amount of light emitted at the region corresponding to one pixel on the photosensitive drum 1 to increase. For example, in a case where the rotational speed of the photosensitive drum 1 in the low-speed mode is half of that in the normal mode, the cycle of the line synchronization signal is double that of in the normal mode, and the amount of light emitted at the region corresponding to one pixel on the photosensitive drum 1 is double. In a case where the amount of light emitted at the region corresponding to one pixel on the photosensitive drum 1 increases, too much toner adheres to the photosensitive drum 1 when the electrostatic latent image is developed.

Method for Adjusting the Amount of Light via Light Up Decimation Control per Line in the Main Scan Direction Next, a method for adjusting the amount of light via light up decimation per line in the main scan direction will be described.

Figure 16:
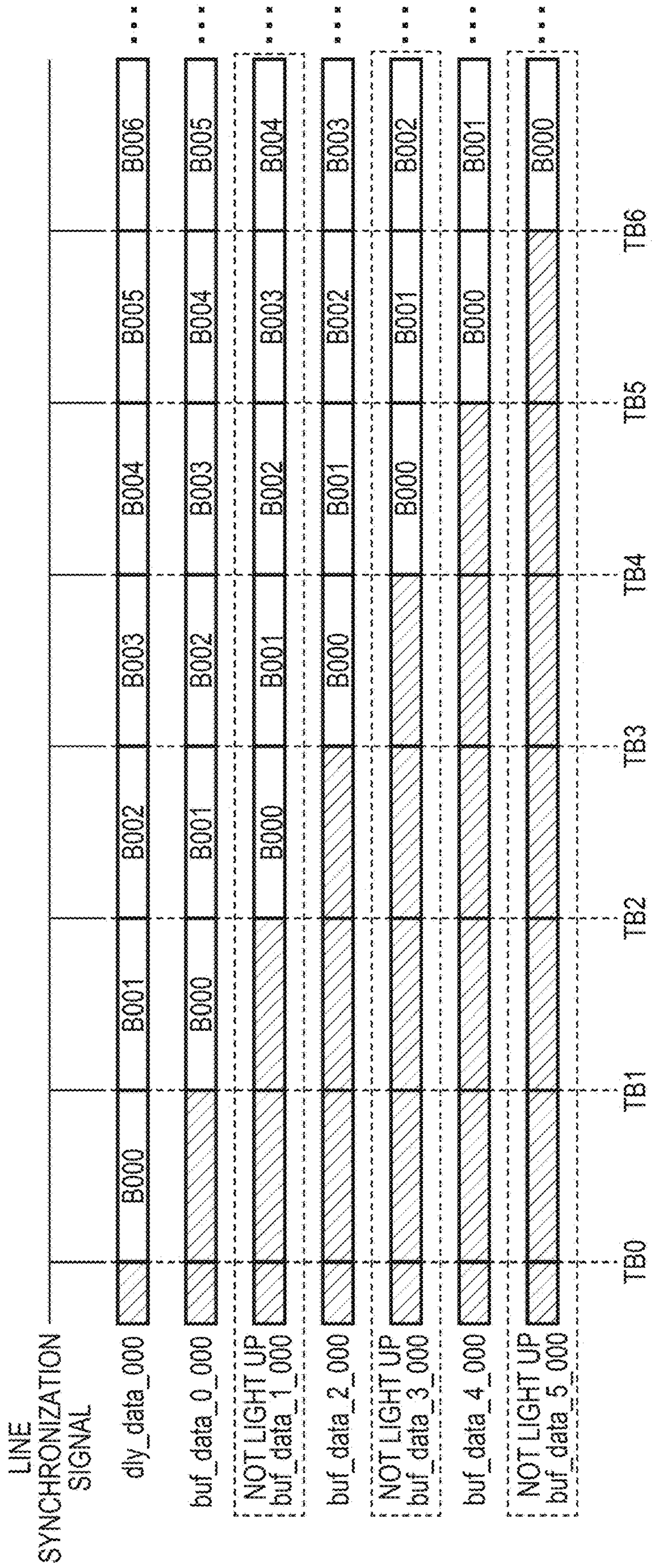
FIG. 16 is a timing chart illustrating adjustment of the amount of light via light up decimation control per line in the main scan direction.

FIG. 16 is a timing chart illustrating adjustment of the amount of light via light up decimation control per line in the main scan direction. FIG. 16 illustrates the operations in the sub-scan direction when in the low-speed mode in the image data storage unit 84. In the example described here, the rotational speed of the photosensitive drum 1 in the low-speed mode is ½ of the rotational speed of the photosensitive drum 1 in the normal mode. Note that the symbols illustrated in FIG. 16 mean the same as the symbols illustrated in FIGS. 11A and 11B. Also, the rotational speed of the photosensitive drum 1 in the low-speed mode is not limited to being ½ of the rotational speed of the photosensitive drum 1 in the normal mode, and a different speed difference may be used in the present embodiment.

The rotational speed of the photosensitive drum 1 in the low-speed mode is a speed corresponding to a/b times (a and b are integers) with respect to the rotational speed of the photosensitive drum 1 in the normal mode. Note that the rotational speed of the photosensitive drum 1 is slower in the low-speed mode, and thus a<b. The CPU 73 first obtains a value of b/a (multiplicative inverse of a/b) with respect to the cycle of the line synchronization signal of the normal mode. The CPU 73 instructs the synchronization signal generation unit 74 to set the obtained value as the cycle of the line synchronization signal of the low-speed mode. Note that the cycle of the line synchronization signal obtained here is the same as the amount of time it takes the photosensitive drum 1 in the low-speed mode to rotate a pixel size corresponding to the resolution in the sub-scan direction. In the example illustrated in FIG. 16, first, the CPU 73 instructs the synchronization signal generation unit 74 to set the cycle of the line synchronization signal in the low-speed mode to twice the cycle of the line synchronization signal in the normal mode. For example, the amount of time from time TB0 to TB1 illustrated in FIG. 16 is twice the amount of time from time TA0 to TA1 illustrated in FIG. 13.

Next, the CPU 73 instructs the light-emitting element array chip 40 to light up 6×a/b rows from among the six light-emitting rows used in the multiple exposure and not light up 6×(b−a)/b rows. Lighting up a portion of the rows of the six light-emitting rows used in the multiple exposure and not lighting up the remaining rows in this manner is referred to as light up decimation control per line in the main scan direction. The settings for lighting up and not lighting up the light-emitting rows that the CPU 73 transmits to the light-emitting element array chip 40 are stored in the register unit 82 via the communication IF unit 81. Also, on the basis of the settings for lighting up and not lighting up stored in the register unit 82, the light up control unit 88 controls lighting up and not lighting up the light-emitting rows by inputting a pulse signal to the drive unit 61 via the signal line 66. Note that, on the basis of the settings for lighting up and not lighting up stored in the register unit 82, the drive unit selection unit 67 may control lighting up and not lighting up the light-emitting rows by inputting a drive unit select signal to the drive unit 61 via the signal line 64. In the example illustrated in FIG. 16, the CPU 73 instructs the light-emitting element array chip 40 to light up, of the six light-emitting rows used in the multiple exposure, three rows (the light-emitting units that buf_data_0_000, buf_data_2_000, and buf_data_4_000 are connected to) and not light up three rows (the light-emitting units that buf_data_1_000, buf_data_3_000, and buf_data_5_000 are connected to). Note that the combination is not limited to the 3 rows on and 3 rows off combination described above, and any combination of the six light-emitting rows may be used.

Here, the amount of light emitted at the region corresponding to one pixel on the photosensitive drum 1 in the normal mode and in the low-speed mode is compared. The cycle of the line synchronization signal in the low-speed mode is changed to b/a times that of the normal mode, and thus the amount of light is changed to b/a times. Also, the number of light-emitting rows that light up in the low-speed mode is changed to a/b times that of the normal mode, and thus the amount of light is changed to a/b times. Accordingly, since the light amount ratio of the low-speed mode to the normal mode as illustrated in the following Formula 3 is equal, in the normal mode and the low-speed mode, the amount of light emitted at the region corresponding to one pixel on the photosensitive drum 1 can be made equal.

(change in amount of light due to change of cycle of line synchronization signal: *b/a* times)×(change in amount of light due to change in light-emitting rows that light up: *a/b* times)=(light amount ratio of low-speed mode to normal mode:equal) (Formula 3)

To summarize, in a case where the low-speed mode is performed to rotate the photosensitive drum 1 at a speed that is slower than the rotational speed of the normal mode and that is a/b times the rotational speed of the normal mode, the CPU 73 performs the following control. In other words, the CPU 73, in the low-speed mode, controls the synchronization signal generation unit 74 to generate a line synchronization signal at a cycle of b/a times of the cycle of the line synchronization signal generated in the normal mode. Also, the CPU 73 controls the light-emitting element array chip 40 to light up 6×a/b rows from among the six light-emitting rows used in the multiple exposure and not light up 6×(b−a)/b rows. Accordingly, the amount of light emitted at the region corresponding to one pixel on the photosensitive drum 1 in the normal mode and in the low-speed mode can be made equal. This can suppress too much toner adhering on the photosensitive drum 1 in the low-speed mode.

Method for Adjusting the Amount of Light Via Drive Current Control of the Light-Emitting Unit Next, a method for adjusting the amount of light via drive current control of the light-emitting unit will be described.

Since the drive current flowing through the light-emitting units 50 and the amount of light have a substantially proportional relationship, the amount of light of the light-emitting units 50 can be adjusted to match a target value by controlling the drive current flowing through the light-emitting units 50. In the head information storage unit 171 of the exposure head 6, a table specifying the relationship between the drive current flowing through the light-emitting units 50 and the amount of light is stored. First, the CPU 73 reads the table of the drive current and the amount of light from the head information storage unit 171 and calculates the value of the drive current required to make the amount of light of the light-emitting units 50 match the target value. Next, the CPU 73 instructs the light-emitting element array chip 40 of the settings for the drive current flowing through the light-emitting units 50. The settings for the drive current flowing through the light-emitting units 50 that the CPU 73 transmits to the light-emitting element array chip 40 are stored in the register unit 82 via the communication IF unit 81. Then, the DAC 62 of the analog unit 86 supplies the drive unit 61 with an analog voltage for determining the drive current via the signal line 63 on the basis of the settings for the drive current flowing through the light-emitting units 50 stored in the register unit 82. In this manner, the drive current flows through the light-emitting units 50 as set, and the amount of light of the light-emitting units 50 is adjusted to match the target value.

In the low-speed mode, the amount of light can be adjusted by drive current control of the light-emitting units as described above. In other words, the CPU 73 sets the drive current flowing through the light-emitting units 50 in the normal mode to a value that is not the maximum value or the minimum value in a range between the maximum value and the minimum value. In this manner, in the present embodiment, room is left for changing the drive current in the low-speed mode. Then, in the present embodiment, in the low-speed mode, the amount of light can be decreased by decreasing the drive current flowing through the light-emitting units 50, and the amount of light can be increased by increasing the drive current flowing through the light-emitting units 50. Accordingly, in the present embodiment, the amount of light emitted at the region corresponding to one pixel on the photosensitive drum 1 in the normal mode and in the low-speed mode can be made equal. According to the present embodiment, this can suppress too much toner adhering on the photosensitive drum 1 in the low-speed mode.

Control of Light-Emitting Units in the Low-Speed Mode According to the First Embodiment Next, the control of the light-emitting units in the low-speed mode according to the first embodiment will be described. In the first embodiment, the light-emitting units are controlled using a method for adjusting the amount of light via light up decimation control per line in the main scan direction and a method for adjusting the amount of light via drive current control of the light-emitting units.

First, the advantages and restrictions of a method for adjusting the amount of light via light up decimation per line in the main scan direction will be described. An advantage of this method includes, since a plurality of rows of the light-emitting rows used in the multiple exposure are not lit up, the amount of light adjustment range can be increased and the amount of light can be greatly increased or decreased. On the other hand, a restriction on this method includes, when the rotational speed of the photosensitive drum 1 in the low-speed mode is set to a speed that is a/b times the speed of the rotational speed of the photosensitive drum 1 in the normal mode, the number of light-emitting rows that light up (total number of light-emitting rows×a/b times) must be an integer. For example, when the rotational speed of the photosensitive drum 1 in the low-speed mode is set to a speed that is ¼ times the speed of the rotational speed of the photosensitive drum 1 in the normal mode, the number of light-emitting rows that light up (total number of light-emitting rows 6×¼ times) is not an integer. In this case, using the method for adjusting the amount of light via light up decimation control per one line in the main scan direction cannot be used to make the amount of light emitted at the region corresponding to one pixel on the photosensitive drum 1 in the normal mode and in the low-speed mode equal.

Next, the advantages and restrictions of a method for adjusting the amount of light via drive current control of the light-emitting unit will be described. An advantage of this method includes, since the amount of light can be linearly changed with respect to the drive current flowing through the light-emitting units 50, the amount of light can be increased or decreased by a small scale. A restriction of this method includes, since the minimum value and the maximum value of the drive current that can flow through due to the characteristics of the light-emitting units 50 are determined, compared to a method for adjusting the amount of light via light up decimation control per one line in the main scan direction and a method for adjusting the amount of light via light up control using a cycle-divided line synchronization signal described below in the third embodiment, the range for adjusting the amount of light is small.

As described above, since the method for adjusting the amount of light via light up decimation control per one line in the main scan direction and the method for adjusting the amount of light via drive current control of the light-emitting units both have restrictions, there are cases where adjusting the amount of light so that the amount of light emitted at the region corresponding to one pixel on the photosensitive drum 1 in the normal mode and the low-speed mode are equal cannot be performed. Even in such cases, by performing control of the light-emitting units in the low-speed mode according to the first embodiment, appropriate adjustment of the amount of light can be performed. Next, the control of the light-emitting units in the low-speed mode according to the first embodiment will be described using FIG. 17.

Figure 17:
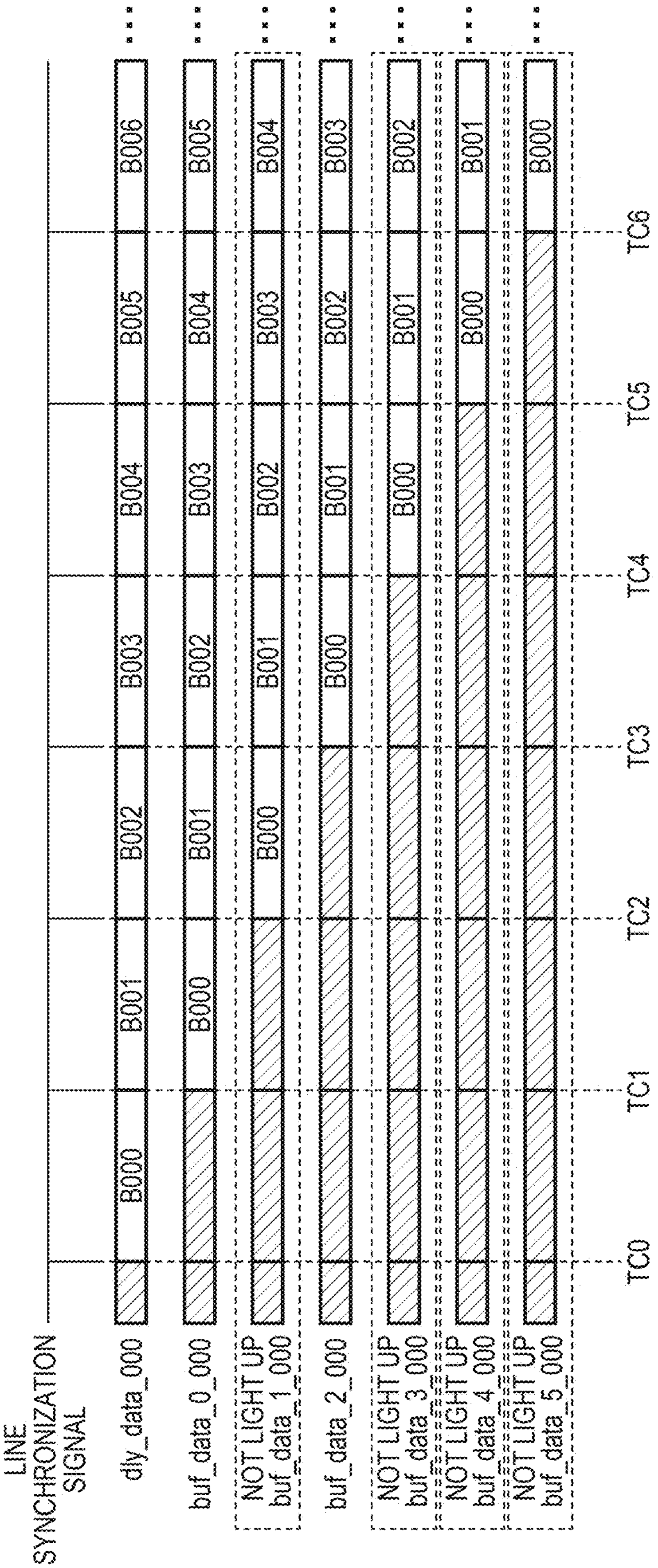
FIG. 17 is a timing chart illustrating the operations in the sub-scan direction when in the low-speed mode in the image data storage unit according to a first embodiment.

FIG. 17 is a timing chart illustrating the operations in the sub-scan direction when in the low-speed mode in the image data storage unit 84 according to the first embodiment. In the example described here, the rotational speed of the photosensitive drum 1 in the low-speed mode is ¼ of the rotational speed of the photosensitive drum 1 in the normal mode. Note that the symbols illustrated in FIG. 17 mean the same as the symbols illustrated in FIGS. 11A and 11B. Also, the rotational speed of the photosensitive drum 1 in the low-speed mode is not limited to being ¼ of the rotational speed of the photosensitive drum 1 in the normal mode, and a different speed difference may be used in the present embodiment.

In a case where the rotational speed of the photosensitive drum 1 in the low-speed mode is a speed corresponding to a/b times with respect to the rotational speed of the photosensitive drum 1 in the normal mode, the CPU 73 first obtains the value of b/a times with respect to the cycle of the line synchronization signal in the normal mode. The CPU 73 instructs the synchronization signal generation unit 74 to set the obtained value as the cycle of the line synchronization signal of the low-speed mode. Note that the cycle of the line synchronization signal obtained here is the same as the amount of time it takes the photosensitive drum 1 in the low-speed mode to rotate a pixel size corresponding to the resolution in the sub-scan direction. In the example illustrated in FIG. 17, first, the CPU 73 instructs the synchronization signal generation unit 74 to set the cycle of the line synchronization signal in the low-speed mode to four times the cycle of the line synchronization signal in the normal mode. For example, the amount of time from time TC0 to TC1 illustrated in FIG. 17 is four times the amount of time from time TA0 to TA1 illustrated in FIG. 13.

Next, the CPU 73 selects, from among the multiplying factor candidates to make the number of the light-emitting rows to light up into an integer, a multiplying factor c/d (c and d are integers and c<d) closest to and equal to or greater than a/b times. Then, the CPU 73 instructs the light-emitting element array chip 40 to light up 6×c/d rows from among the six light-emitting rows used in the multiple exposure and not light up 6×(d−c)/d rows. In the example illustrated in FIG. 17, the value of the total number of the light-emitting rows 6×¼ times is not an integer. Thus, the CPU 73 selects, from among multiplying factor candidates ⅙, 2/6, 3/6, 4/6, and ⅚ to make the number of the light-emitting rows to light up into an integer, 2/6 as it is the closest and equal to or greater than ¼ times. The CPU 73 instructs the light-emitting element array chip 40 to light up two rows (=6×2/6) from among the six light-emitting rows used in the multiple exposure and not light up four rows (6×(6−2)/6. In FIG. 17, the 2 rows to light up are the light-emitting units the buf_data_0_000 and buf_data_2_000 are connected to. Also, the 4 rows to not light up are the light-emitting units the buf_data_1_000, buf_data_3_000, buf_data_4_000, and buf_data_5_000 are connected to. Note that the combination is not limited to the 2 rows on and 4 rows off combination described above, and any combination of the six light-emitting rows may be used.

Next, the CPU 73 reads the table of the drive current and the amount of light from the head information storage unit 171 and calculates the value of the drive current required to make the amount of light of the light-emitting units 50 match the target value ((a×d)/(b×c) times of the amount of light in the normal mode). Then, the CPU 73 instructs the light-emitting element array chip 40 of the settings for the drive current flowing through the light-emitting units 50. In this manner, the drive current flows through the light-emitting units 50 as set, and the amount of light of the light-emitting units 50 is adjusted to match the target value ((a×d)/(b×c) times of the amount of light in the normal mode). In the example illustrated in FIG. 17, the target value is ¾ times.

Here, the amount of light emitted at the region corresponding to one pixel on the photosensitive drum 1 in the normal mode and in the low-speed mode is compared. The cycle of the line synchronization signal in the low-speed mode is changed to b/a times that of the normal mode, and thus the amount of light is changed to b/a times. Also, the number of light-emitting rows that light up in the low-speed mode is changed to c/d times that of the normal mode, and thus the amount of light is changed to c/d times. The amount of light of the light-emitting units in the low-speed mode is changed to (a×d)/(b×c) times that of the normal mode, and thus the amount of light is changed to (a×d)/(b×c) times. Accordingly, since the light amount ratio of the low-speed mode to the normal mode as illustrated in the following Formula 4 is equal, in the normal mode and the low-speed mode, the amount of light emitted at the region corresponding to one pixel on the photosensitive drum 1 can be made equal.

(change in amount of light due to change of cycle of line synchronization signal: *b/a* times)×(change in amount of light due to change in light-emitting rows to light up: *c/d* times)×(change in amount of light due to drive current control: (*a*×*d*)/(*b*×*c*)times)=(light amount ratio of low-speed mode to normal mode:equal) (Formula 4)

To summarize, according to the first embodiment, the number and the amount of light of the light-emitting units that light up due to light up decimation control per one line in the main scan direction are adjusted to not be excessive, and adjustment is further performed to decrease the drive current via the drive current control of the light-emitting units and decrease the excessive amount of light. In other words, in a case where the low-speed mode is performed to rotate the photosensitive drum 1 at a speed (second rotational speed) that is slower than the rotational speed (first rotational speed) of the normal mode and that is a/b times the rotational speed of the normal mode, the CPU 73 performs the following control. The CPU 73, in the low-speed mode, controls the synchronization signal generation unit 74 to generate a line synchronization signal at a cycle of b/a times of the cycle of the line synchronization signal generated in the normal mode. The CPU 73 selects, from among the multiplying factor candidates to make the number of the light-emitting rows to light up into an integer, a multiplying factor c/d closest to and equal to or greater than a/b times. Then, the CPU 73 controls the light-emitting element array chip 40 to light up 6×c/d rows from among the six light-emitting rows used in the multiple exposure and not light up 6×(d−c)/d rows. Next, the CPU 73 instructs the light-emitting element array chip 40 of the settings for the drive current flowing through the light-emitting units 50 so that the amount of light of the light-emitting units 50 matches the target value ((a×d)/(b×c) times of the amount of light in the normal mode). With this control, the amount of light emitted at the region corresponding to one pixel on the photosensitive drum 1 in the normal mode and in the low-speed mode can be made equal. This can suppress too much toner adhering on the photosensitive drum 1 in the low-speed mode and allows the toner on the photosensitive drum 1 to be appropriate adjusted.

Also, according to the first embodiment, when using the method for adjusting the amount of light via light up decimation control per one line in the main scan direction, there may be cases where the number (total number of light-emitting rows× a/b times) of the light-emitting rows that light up cannot be made an integer and the amount of light cannot be appropriately adjusted. In such cases, by controlling the light-emitting units in the low-speed mode according to the first embodiment, the amount of light emitted at the region corresponding to one pixel on the photosensitive drum 1 in the normal mode and the low-speed mode can be made equal.

Also, according to the first embodiment, when using the method for adjusting the amount of light via drive current control of the light-emitting units, there are cases where the amount of light cannot be appropriately adjusted due to the amount of light adjustment range being small. In such cases, by controlling the light-emitting units in the low-speed mode according to the first embodiment, the amount of light adjustment range can be increased, and the amount of light emitted at the region corresponding to one pixel on the photosensitive drum 1 in the normal mode and the low-speed mode can be made equal.

According to the first embodiment, control is performed to decrease the amount of light of the light-emitting units in the low-speed mode compared to when in the normal mode. Thus, wear of the light-emitting units can be reduced.

Second Embodiment

An image forming apparatus according to the second embodiment has a similar configuration to the first embodiment. Thus, the configuration of the image forming apparatus according to the second embodiment will not be described. The control of the light-emitting units in the low-speed mode according to the second embodiment is different to the control in the first embodiment. Thus, the control of the light-emitting units in the low-speed mode according to the second embodiment will be described.

Control of Light-Emitting Units in the Low-Speed Mode According to the Second Embodiment The control of the light-emitting units in the low-speed mode according to the second embodiment will be described. As in the first embodiment, in the second embodiment, the light-emitting units are controlled using a method for adjusting the amount of light via light up decimation control per line in the main scan direction and a method for adjusting the amount of light via drive current control of the light-emitting units. The difference between the second embodiment and the first embodiment is in the processing to select a light-emitting row to light up and a light-emitting row to not light up.

Figure 18:
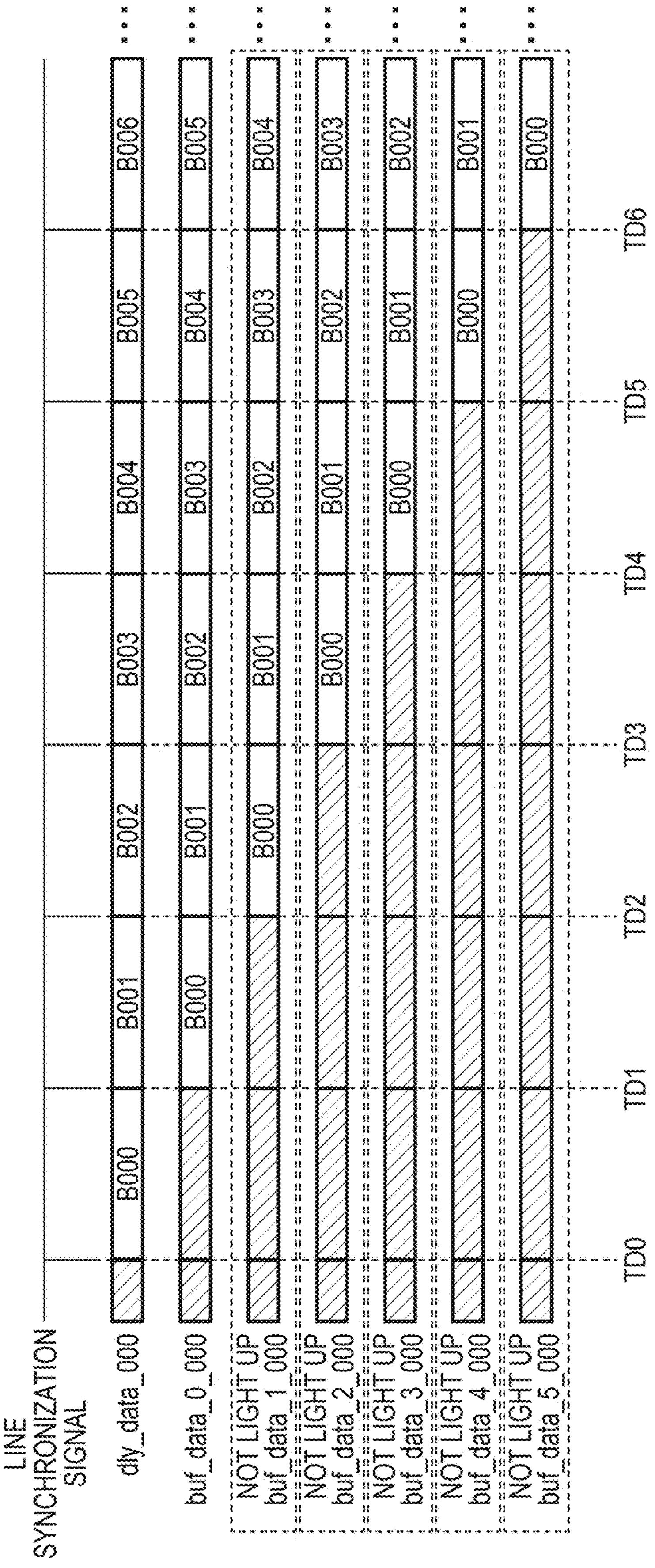
FIG. 18 is a timing chart illustrating the operations in the sub-scan direction when in the low-speed mode in the image data storage unit according to a second embodiment.

FIG. 18 is a timing chart illustrating the operations in the sub-scan direction when in the low-speed mode in the image data storage unit 84 according to the second embodiment. In the example described here, the rotational speed of the photosensitive drum 1 in the low-speed mode is ⅕ of the rotational speed of the photosensitive drum 1 in the normal mode. Note that the symbols illustrated in FIG. 18 mean the same as the symbols illustrated in FIGS. 11A and 11B. Also, the rotational speed of the photosensitive drum 1 in the low-speed mode is not limited to being ⅕ of the rotational speed of the photosensitive drum 1 in the normal mode, and a different speed difference may be used in the present embodiment.

First, the cycle of the line synchronization signal of the low-speed mode is set via processing similar to that in the first embodiment. In the example illustrated in FIG. 18, the CPU 73 instructs the synchronization signal generation unit 74 to set the cycle of the line synchronization signal in the low-speed mode to five times the cycle of the line synchronization signal in the normal mode. For example, the amount of time from time TD0 to TD1 illustrated in FIG. 18 is five times the amount of time from time TA0 to TA1 illustrated in FIG. 13.

Next, in the second embodiment, processing different from that in the first embodiment is executed relating to processing to select a light-emitting row to light up and a light-emitting row to not light. The CPU 73 selects, from among the multiplying factor candidates to make the number of the light-emitting rows to light up into an integer, a multiplying factor c/d (c and d are integers and c<d) closest to and equal to or less than a/b times. Then, the CPU 73 instructs the light-emitting element array chip 40 to light up 6×c/d rows from among the six light-emitting rows used in the multiple exposure and not light up 6×(d−c)/d rows. In the example illustrated in FIG. 18, the value of the total number of the light-emitting rows 6×⅕ times is not an integer. Thus, the CPU 73 selects, from among multiplying factor candidates ⅙, 2/6, 3/6, 4/6, and ⅚ to make the number of the light-emitting rows to light up into an integer, ⅙ as it is the closest and less than ⅕ times. The CPU 73 instructs the light-emitting element array chip 40 to light up one row (=6×⅙) from among the six light-emitting rows used in the multiple exposure and not light up five rows (6×(6−1)/6. In FIG. 18, the 1 row to light up is the light-emitting unit the buf_data_0_000 is connected to. Also, the 5 rows to not light up are the light-emitting units the buf_data_1_000, buf_data_2_000, buf_data_3_000, buf_data_4_000, and buf_data_5_000 are connected to. Note that the combination is not limited to the 1 rows on and 5 rows off combination described above, and any combination of the six light-emitting rows may be used.

Next, the drive current flowing through the light-emitting units 50 in the low-speed mode is set via processing similar to that in the first embodiment. The CPU 73 reads the table of the drive current and the amount of light from the head information storage unit 171 and calculates the value of the drive current required to make the amount of light of the light-emitting units 50 match the target value ((a×d)/(b×c) times of the amount of light in the normal mode). Then, the CPU 73 instructs the light-emitting element array chip 40 of the settings for the drive current flowing through the light-emitting units 50. In the example illustrated in FIG. 18, the target value is 6/5 times.

Here, the result of comparing the amount of light emitted at the region corresponding to one pixel on the photosensitive drum 1 in the normal mode and in the low-speed mode corresponds to the same formula as Formula 4 in the first embodiment. In other words, since the light amount ratio of the low-speed mode to the normal mode is equal, in the normal mode and the low-speed mode, the amount of light emitted at the region corresponding to one pixel on the photosensitive drum 1 can be made equal.

To summarize, according to the second embodiment, the number and the amount of light of the light-emitting units that light up due to light up decimation control per one line in the main scan direction are adjusted to not be insufficient, and adjustment is further performed to increase the drive current via the drive current control of the light-emitting units and make up for the insufficient amount of light. In other words, in a case where the low-speed mode is performed to rotate the photosensitive drum 1 at a speed (second rotational speed) that is slower than the rotational speed (first rotational speed) of the normal mode and that is a/b times the rotational speed of the normal mode, the CPU 73 performs the following control. The CPU 73, in the low-speed mode, controls the synchronization signal generation unit 74 to generate a line synchronization signal at a cycle of b/a times of the cycle of the line synchronization signal generated in the normal mode. The CPU 73 selects, from among the multiplying factor candidates to make the number of the light-emitting rows to light up into an integer, a multiplying factor c/d closest to and equal to or less than a/b times. Then, the CPU 73 controls the light-emitting element array chip 40 to light up 6×c/d rows from among the six light-emitting rows used in the multiple exposure and not light up 6×(d−c)/d rows. Next, the CPU 73 instructs the light-emitting element array chip 40 of the settings for the drive current flowing through the light-emitting units 50 so that the amount of light of the light-emitting units 50 matches the target value ((a×d)/(b×c) times of the amount of light in the normal mode). With this control, the amount of light emitted at the region corresponding to one pixel on the photosensitive drum 1 in the normal mode and in the low-speed mode can be made equal. This can suppress too much toner adhering on the photosensitive drum 1 in the low-speed mode and allows the toner on the photosensitive drum 1 to be appropriate adjusted.

Note that in the first embodiment, from among the multiplying factor candidates to make the number of the light-emitting rows to light up into an integer, a multiplying factor c/d closest to and equal to or greater than a/b times is selected. However, in the second embodiment, from among the multiplying factor candidates to make the number of the light-emitting rows to light up into an integer, a multiplying factor c/d closest to and equal to or less than a/b times is selected. In another configuration, from among the multiplying factor candidates to make the number of the light-emitting rows to light up into an integer, a multiplying factor c/d closest to a/b times may be selected. With such a configuration, a change in the amount of light due to the drive current control can be kept to a minimum, and even in a case where the range of the drive current that can flow due to the characteristics of the light-emitting units 50 is small, the present embodiment can be applied and the amount of light can be adjusted.

Third Embodiment

An image forming apparatus according to the third embodiment has a similar configuration to the first embodiment. Thus, the configuration of the image forming apparatus according to the third embodiment will not be described. The control of the light-emitting units in the low-speed mode according to the third embodiment is different to the control in the first embodiment. Thus, the control of the light-emitting units in the low-speed mode according to the third embodiment will be described. In the third embodiment, the light-emitting units are controlled using a method for adjusting the amount of light via light up control using a cycle-divided line synchronization signal and a method for adjusting the amount of light via drive current control of the light-emitting units.

Method for Adjusting the Amount of Light Via Light Up Control Using a Cycle-Divided Line Synchronization Signal First, the method for adjusting the amount of light via light up control using a cycle-divided line synchronization signal will be described.

Figure 19:
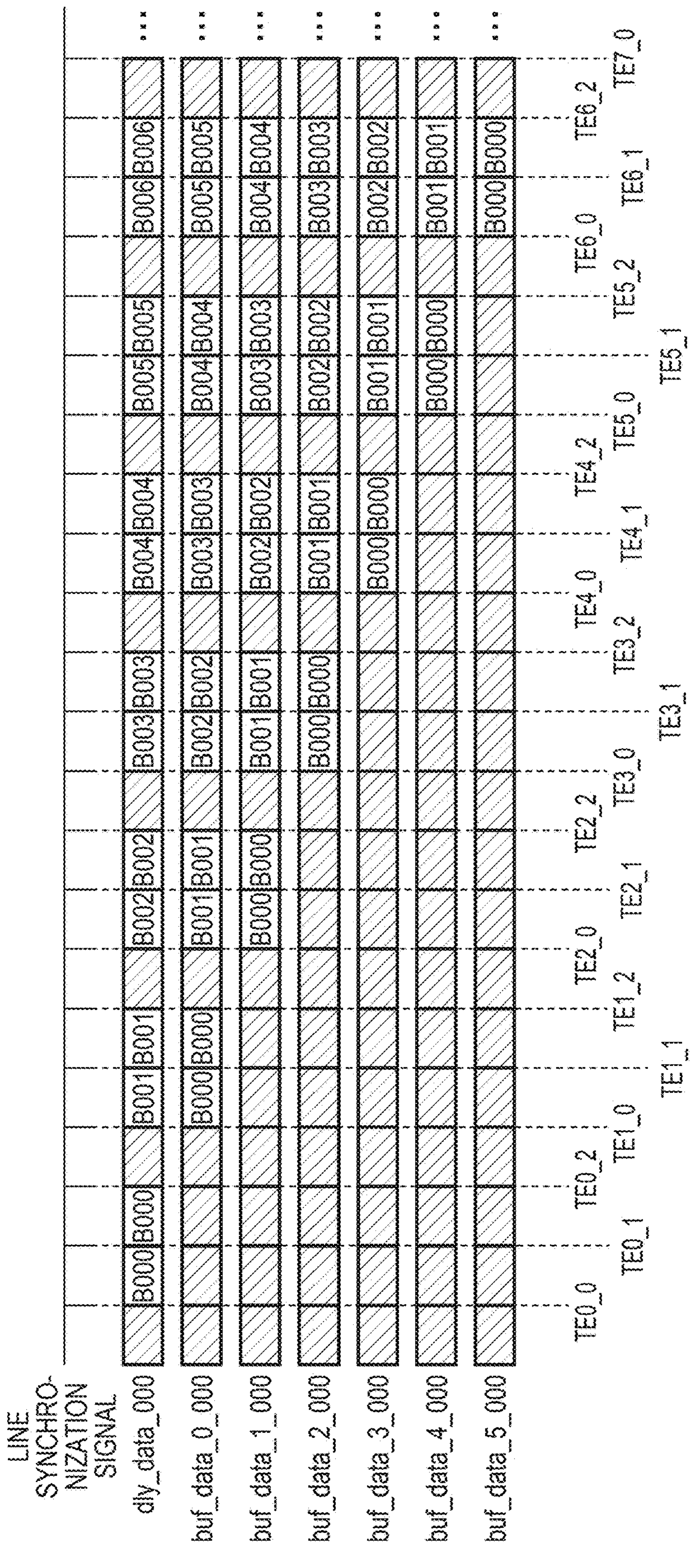
FIG. 19 is a timing chart illustrating adjusting the amount of light via the light up control using a cycle-divided line synchronization signal according to a third embodiment.

FIG. 19 is a timing chart illustrating adjusting the amount of light via the light up control using a cycle-divided line synchronization signal. FIG. 19 illustrates the operations in the sub-scan direction when in the low-speed mode in the image data storage unit 84. In the example described here, the rotational speed of the photosensitive drum 1 in the low-speed mode is ⅔ of the rotational speed of the photosensitive drum 1 in the normal mode. Note that the symbols illustrated in FIG. 19 mean the same as the symbols illustrated in FIGS. 11A and 11B. Also, the rotational speed of the photosensitive drum 1 in the low-speed mode is not limited to being ⅔ of the rotational speed of the photosensitive drum 1 in the normal mode, and a different speed difference may be used in the present embodiment.

In a case where the rotational speed of the photosensitive drum 1 in the low-speed mode is a speed corresponding to a/b times with respect to the rotational speed of the photosensitive drum 1 in the normal mode, the CPU 73 first obtains the value of 1/a times with respect to the cycle of the line synchronization signal in the normal mode. The CPU 73 instructs the synchronization signal generation unit 74 to set the obtained value as the cycle of the line synchronization signal of the low-speed mode. Note that the value of b/a times of the cycle of the line synchronization signal in the normal mode corresponds to the amount of time it takes the photosensitive drum 1 in the low-speed mode to rotate a pixel size corresponding to the resolution in the sub-scan direction. Accordingly, the value of 1/a times of the cycle of the line synchronization signal in the normal mode corresponds to the amount of time it takes the photosensitive drum 1 in the low-speed mode to rotate a pixel size corresponding to the resolution in the sub-scan direction divided by b. In the example illustrated in FIG. 19, first, the CPU 73 instructs the synchronization signal generation unit 74 to set the cycle of the line synchronization signal in the low-speed mode to ½ the cycle of the line synchronization signal in the normal mode. For example, the amount of time from time TE0_0 to TE0_1 illustrated in FIG. 19 is ½ the amount of time from time TA0 to TA1 illustrated in FIG. 13.

In the amount of time it takes the photosensitive drum 1 in the low-speed mode to rotate a pixel size corresponding to the resolution in the sub-scan direction, the synchronization signal generation unit 74 generates the line synchronization signal b times. The CPU 73 controls the buffer loading control unit 17 so that the same image data signal of one line for causing the light-emitting units 50 to emit light is transmitted a times in sync with the b times of the line synchronization signal and so that an image data signal that does not cause the light-emitting units 50 to emit light (not light up) is transmitted b−a times. In the example illustrated in FIG. 19, in the amount of time it takes the photosensitive drum 1 in the low-speed mode to rotate a pixel size corresponding to the resolution in the sub-scan direction, the synchronization signal generation unit 74 generates the line synchronization signal 3 times. The CPU 73 controls the buffer loading control unit 17 so that the same image data signal of one line is transmitted 2 times in sync with the 3 times of the line synchronization signal and so that an image data signal that causes the light-emitting units 50 to not emit light (not light up) is transmitted 1 time. The buffer loading control unit 17 having received an instruction from the CPU 73, in sync with the first line synchronization signal generated at time TE0_0 and the second line synchronization signal generated at time TE0_1, reads the same image data signal of one line from the line buffer 15 and transmits this to the light-emitting element array chip 40. Furthermore, the buffer loading control unit 17, in sync with the third line synchronization signal generated at time TE0_2, transmits an image data signal that causes the light-emitting units 50 to not emit light (not light up) to the light-emitting element array chip 40. The CPU 73 repeats this control after time TE1_0. Note that as long as the same image data signal of one line is transmitted a times and an image data signal that causes the light-emitting units 50 to not emit light (not light up) is transmitted b−a times in sync with the b times of the line synchronization signal, any order of transmission may be used. In the example illustrated in FIG. 19, the CPU 73 may transmit an image data signal that causes the light-emitting units 50 to not emit light (not light up) in sync with the first line synchronization signal, and may transmit the same image data signal of one line in sync with the second and third line synchronization signals.

Here, the amount of light emitted at the region corresponding to one pixel on the photosensitive drum 1 in the normal mode and in the low-speed mode is compared. The cycle of the line synchronization signal in the low-speed mode is changed to 1/a times that of the normal mode, and thus the amount of light is changed to 1/a times. Also, in the amount of time it takes the photosensitive drum 1 in the low-speed mode to rotate a pixel size corresponding to the resolution in the sub-scan direction, in sync with each generated b times of line synchronization signals, the same image data signal of one line is transmitted a times and an image data signal that causes the light-emitting units 50 to not emit light (not light up) is transmitted b−a times. Accordingly, since the light amount ratio of the low-speed mode to the normal mode as illustrated in the following Formula 5 is equal, in the normal mode and the low-speed mode, the amount of light emitted at the region corresponding to one pixel on the photosensitive drum 1 can be made equal.

(change in amount of light due to change of cycle of line synchronization signal: $1/a$ times)×(number of times to light up $a$ due to the same image data of one line)=(light amount ratio of low-speed mode to normal mode:equal) (Formula 5)

To summarize, in a case where the low-speed mode is performed to rotate the photosensitive drum 1 at a speed that is slower than the rotational speed of the normal mode and that is a/b times the rotational speed of the normal mode, the CPU 73 performs the following control. In other words, the CPU 73, in the low-speed mode, controls the synchronization signal generation unit 74 to generate a line synchronization signal at a cycle of 1/a times of the cycle of the line synchronization signal generated in the normal mode. Also, the CPU 73 controls the buffer loading control unit 17 so that, in the amount of time it takes the photosensitive drum 1 in the low-speed mode to rotate a pixel size corresponding to the resolution in the sub-scan direction, in sync with each b times of line synchronization signals generated by the synchronization signal generation unit 74, the same image data signal of one line is transmitted a times and an image data signal that causes the light-emitting units 50 to not emit light (not light up) is transmitted b−a times. Accordingly, the amount of light emitted at the region corresponding to one pixel on the photosensitive drum 1 in the normal mode and in the low-speed mode can be made equal. This can suppress too much toner adhering on the photosensitive drum 1 in the low-speed mode.

Control of Light-Emitting Units in the Low-Speed Mode According to the Third Embodiment Next, the control of the light-emitting units in the low-speed mode according to the third embodiment will be described. In the third embodiment, the light-emitting units are controlled using a method for adjusting the amount of light via light up control using a cycle-divided line synchronization signal and a method for adjusting the amount of light via drive current control of the light-emitting units.

First, the advantages and restrictions of a method for adjusting the amount of light via light up control using a cycle-divided line synchronization signal will be described. An advantage of this method includes, since the cycle of the line synchronization signal is divided and the ratio of the number of times to light up and the number of times to not light up is adjusted, the amount of light adjustment range can be increased and the amount of light can be greatly increased or decreased. A restriction of this method includes transmission of the image data signal of one line not making it in time due to the cycle of the line synchronization signal in the low-speed mode being too short. As illustrated in FIG. 12, the time of the end of transmission of the image data signal for one line to the light-emitting element array chip 40 by the chip data conversion unit 72 is T1. Time T1 is determined by the number of pixels of one line and the clock signal cycle. Also, at time T2, in sync with the line synchronization signal, the image data signal of one line is incorporated all at once into buf_data_0_000 to buf_data_0_747. Time T2 is determined by the cycle of the line synchronization signal. In a case where the cycle of the line synchronization signal in the low-speed mode is set to 1/a times of the cycle of the line synchronization signal in the normal mode, the value of the denominator a in increased, making the cycle of the line synchronization signal in the low-speed mode too short. Thus, transmission of the image data signal of one line may not make it in time due to time T2 coming earlier than time T1.

Next, the advantages and restrictions of a method for adjusting the amount of light via drive current control of the light-emitting unit are as described in the control of the light-emitting units in the low-speed mode according to the first embodiment.

As described above, since the method for adjusting the amount of light via light up control using a cycle-divided line synchronization signal and the method for adjusting the amount of light via drive current control of the light-emitting units both have restrictions, there are cases where adjusting the amount of light so that the amount of light emitted at the region corresponding to one pixel on the photosensitive drum 1 in the normal mode and the low-speed mode are equal cannot be performed. Even in such cases, by performing control of the light-emitting units in the low-speed mode according to the third embodiment, appropriate adjustment of the amount of light can be performed. Next, the control of the light-emitting units in the low-speed mode according to the third embodiment will be described using FIGS. 20A and 20B.

Figure 20A:
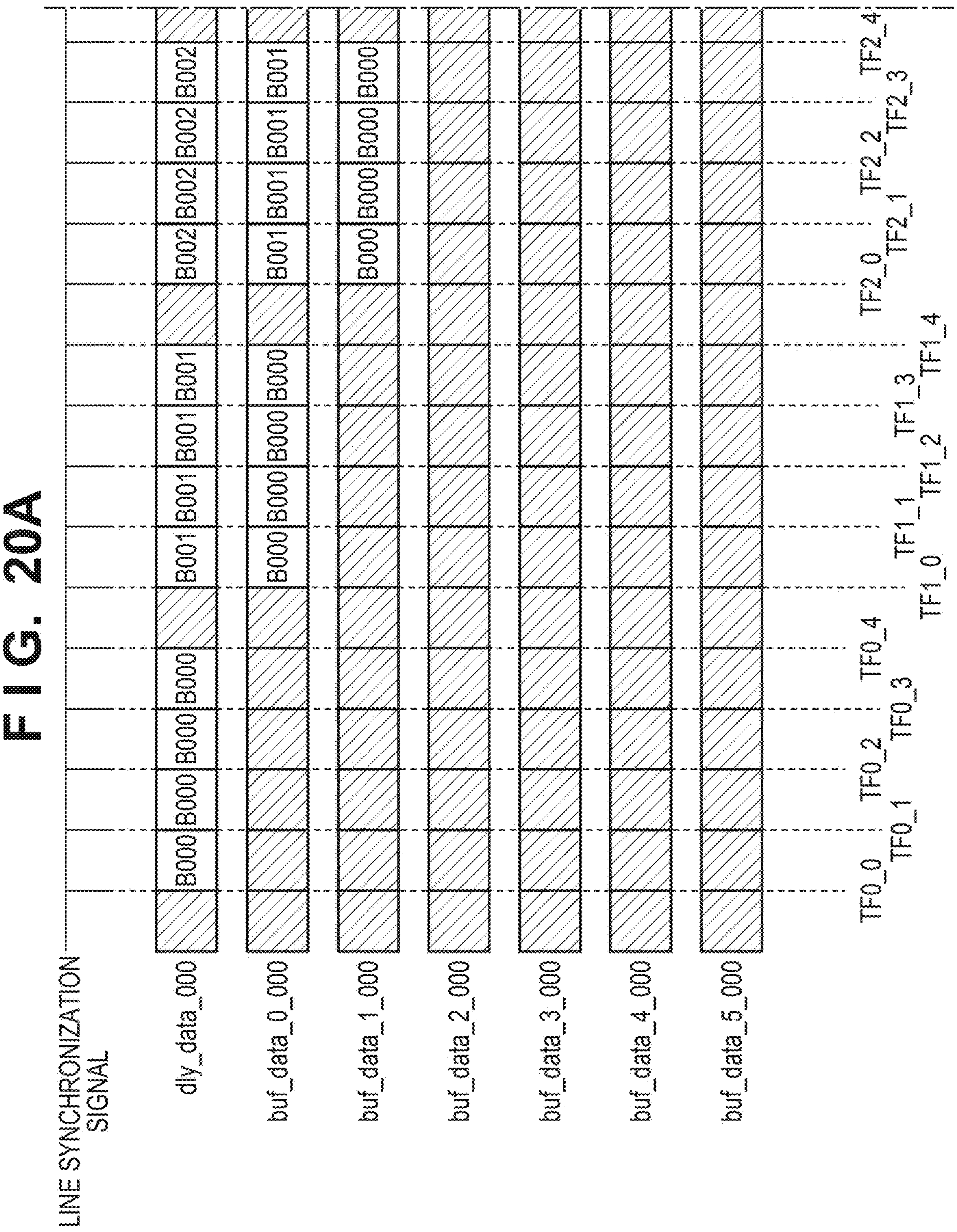
FIG. 20A is a timing chart illustrating the operations in the sub-scan direction when in the low-speed mode in the image data storage unit according to the third embodiment.
Figure 20B:
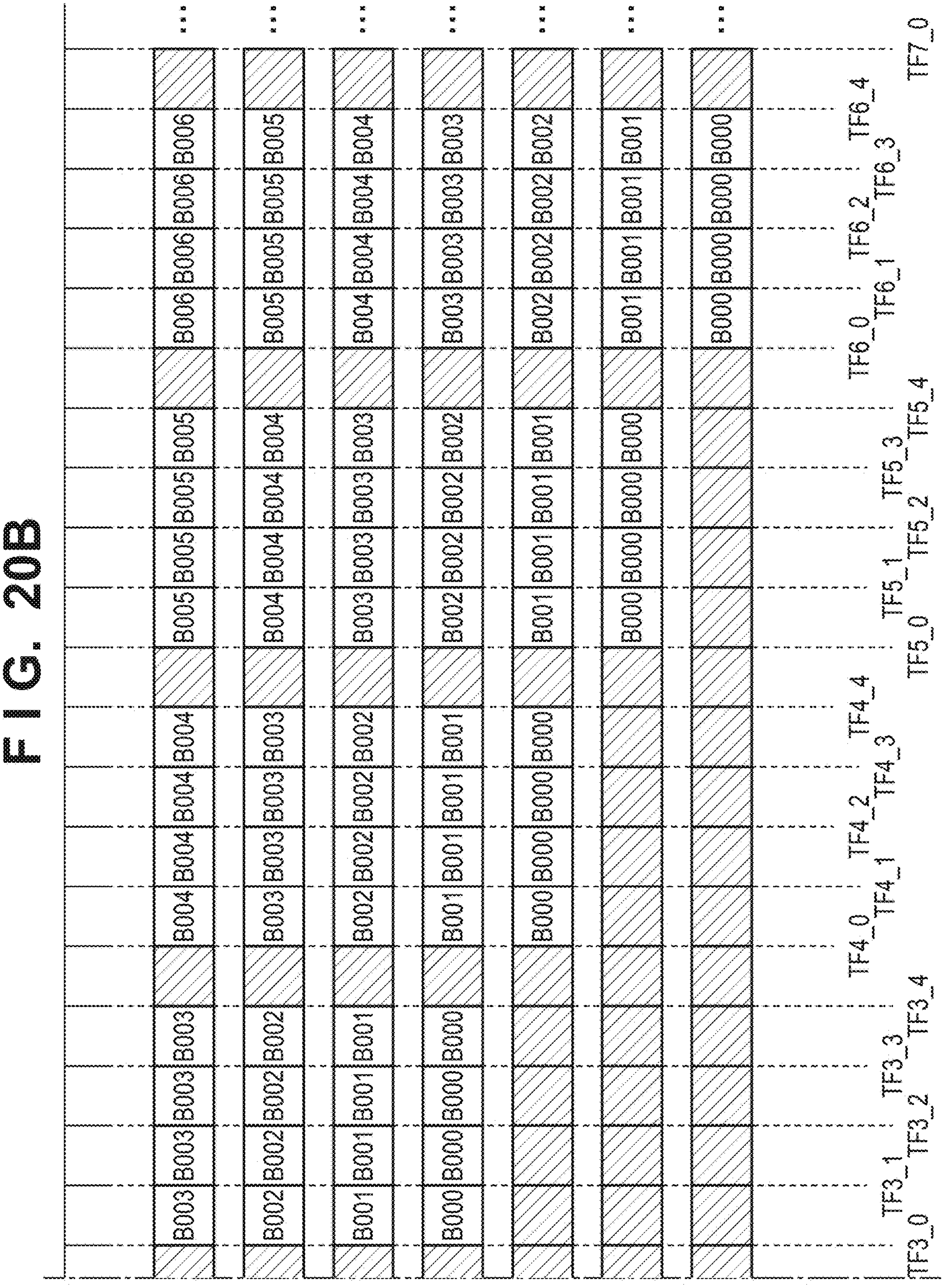
FIG. 20B is a timing chart illustrating the operations in the sub-scan direction when in the low-speed mode in the image data storage unit according to the third embodiment.

FIGS. 20A and 20B are a timing chart illustrating the operations in the sub-scan direction when in the low-speed mode in the image data storage unit 84 according to the third embodiment. In the example described here, the rotational speed of the photosensitive drum 1 in the low-speed mode is 5/7 of the rotational speed of the photosensitive drum 1 in the normal mode. Note that the symbols illustrated in FIGS. 20A and 20B mean the same as the symbols illustrated in FIGS. 11A and 11B. Also, the rotational speed of the photosensitive drum 1 in the low-speed mode is not limited to being 5/7 of the rotational speed of the photosensitive drum 1 in the normal mode, and a different speed difference may be used in the present embodiment.

In a case where the rotational speed of the photosensitive drum 1 in the low-speed mode is a speed corresponding to a/b times with respect to the rotational speed of the photosensitive drum 1 in the normal mode, the CPU 73 first obtains the value of b/(a×e) times (e is an integer) with respect to the cycle of the line synchronization signal in the normal mode. The CPU 73 instructs the synchronization signal generation unit 74 to set the obtained value as the cycle of the line synchronization signal of the low-speed mode. Note that the value of b/a times of the cycle of the line synchronization signal in the normal mode corresponds to the amount of time it takes the photosensitive drum 1 in the low-speed mode to rotate a pixel size corresponding to the resolution in the sub-scan direction. Accordingly, the value of b/(a×e) times of the cycle of the line synchronization signal in the normal mode corresponds to the amount of time it takes the photosensitive drum 1 in the low-speed mode to rotate a pixel size corresponding to the resolution in the sub-scan direction divided by e. Here, the method for calculating a division coefficient e will be described. The minimum value of the multiplying factor of the cycle of the line synchronization signal in the low-speed mode to the cycle of the line synchronization signal in the normal mode is Tmin. CPU 73 calculates Tmin from the number of pixels of one line and the cycle of the clock signal. In a case where the transmission of the image data signal of one line is guaranteed to make it in time, the multiplying factor b/(a×e) of the cycle of the line synchronization signal in the low-speed mode must be equal to or greater than the minimum value Tmin, and thus Formula 6 is established. Formula 7 is Formula 6 changed to solve for the division coefficient e. The CPU 73 obtains the value of b/(a×Tmin) and selects the integer closest to and equal to or less than the value of b/(a×Tmin) as the division coefficient e.

$$b/(a\times e)\geq T\min \quad \text{(Formula 6)}$$

$$b/(a\times T\min)\geq e \quad \text{(Formula 7)}$$

In the example illustrated in FIGS. 20A and 20B, Tmin equals 1/4. The CPU 73 calculates Formula 7 and selects 5 as the division coefficient e so that 28/5≥e is satisfied. The CPU 73 instructs the synchronization signal generation unit 74 to set the cycle of the line synchronization signal in the low-speed mode to 7/25 times the cycle of the line synchronization signal in the normal mode. For example, the amount of time from time TF0_0 to TF0_1 illustrated in FIGS. 20A and 20B is 7/25 times the amount of time from time TA0 to TA1 illustrated in FIG. 13.

In the amount of time it takes the photosensitive drum 1 in the low-speed mode to rotate a pixel size corresponding to the resolution in the sub-scan direction, the synchronization signal generation unit 74 generates the line synchronization signal e times and transmits it. The CPU 73 controls the buffer loading control unit 17 so that the same image data signal of one line for causing the light-emitting units 50 to emit light is transmitted f times (f is an integer) and light is emitted f times in sync with the b times of the line synchronization signal and so that an image data signal that does not cause the light-emitting units 50 to emit light (not light up) is transmitted e–f times and light is not emitted e–f times. Here, the method for calculating the number of times to light up f due to the same image data of one line will be described. The CPU 73 obtains the value of (a×e)/b and selects the integer closest to the value of (a×e)/b and equal to or greater than the value of (a×e)/b as the number of times to light up f due to the same image data of one line. In the example illustrated in FIGS. 20A and 20B, the CPU 73 obtains (a×e)/b=25/7 and selects 4 as the integer closest to and equal to or greater than 25/7 as the number of times to light up f due to the same image data of one line. Then, in the amount of time it takes the photosensitive drum 1 in the low-speed mode to rotate a pixel size corresponding to the resolution in the sub-scan direction, the synchronization signal generation unit 74 generates the line synchronization signal 5 times.

The CPU 73 controls the buffer loading control unit 17 so that the same image data signal of one line is transmitted 4 times in sync with the 5 times of the line synchronization signal and so that an image data signal that causes the light-emitting units 50 to not emit light (not light up) is transmitted 1 time. The buffer loading control unit 17 having received an instruction from the CPU 73, in sync with the first, second, third, and fourth line synchronization signal generated at time TF0_0, TF0_1, TF0_2, and TF0_3 respectively, reads the same image data signal of one line from the line buffer 15 and transmits this to the light-emitting element array chip 40. Furthermore, the buffer loading control unit 17, in sync with the fifth line synchronization signal generated at time TF0_4, transmits an image data signal that causes the light-emitting units 50 to not emit light (not light up) to the light-emitting element array chip 40. The CPU 73 repeats this control after time TF1_0. Note that as long as the CPU 73 transmits the same image data signal of one line f times to cause the light-emitting units 50 to emit light and an image data signal that causes the light-emitting units 50 to not emit light (not light up) e–f times in sync with the e times of the line synchronization signal, any order of transmission may be used. In the example illustrated in FIGS. 20A and 20B, the CPU 73 may transmit an image data signal that causes the light-emitting units 50 to not emit light (not light up) in sync with the first line synchronization signal, and may transmit the same image data signal of one line in sync with the second, third, fourth, and fifth line synchronization signals.

Next, the CPU 73 reads the table of the drive current and the amount of light from the head information storage unit 171 and calculates the value of the drive current required to make the amount of light of the light-emitting units 50 match the target value ((a×e)/(b×f) times of the amount of light in the normal mode). Then, the CPU 73 instructs the light-emitting element array chip 40 of the settings for the drive current flowing through the light-emitting units 50. In this manner, the drive current flows through the light-emitting units 50 as set, and the amount of light of the light-emitting units 50 is adjusted to match the target value ((a×e)/(b×f) times of the amount of light in the normal mode). In the example illustrated in FIGS. 20A and 20B, the target value is 25/28 times.

Here, the amount of light emitted at the region corresponding to one pixel on the photosensitive drum 1 in the normal mode and in the low-speed mode is compared. The cycle of the line synchronization signal in the low-speed mode is changed to b/(a×e) times that of the normal mode, and thus the amount of light is changed to b/(a×e) times. Also, in the amount of time it takes the photosensitive drum 1 in the low-speed mode to rotate a pixel size corresponding to the resolution in the sub-scan direction, in sync with each generated e times of line synchronization signals, the same image data signal of one line is transmitted f times and an image data signal that causes the light-emitting units 50 to not emit light (not light up) is transmitted e−f times. Furthermore, the amount of light of the light-emitting units in the low-speed mode is changed to (a×e)/(b×f) times that of the normal mode. Accordingly, since the light amount ratio of the low-speed mode to the normal mode as illustrated in the following Formula 8 is equal, in the normal mode and the low-speed mode, the amount of light emitted at the region corresponding to one pixel on the photosensitive drum 1 can be made equal.

(change in amount of light due to change of cycle of line synchronization signal: $b/(a\times e)$times)×(number of times to light up $f$ due to the same image data of one line)×(change in amount of light due to drive current control: $(a\times e)/(b\times f)$ times)=(light amount ratio of low-speed mode to normal mode:equal) (Formula 8)

To summarize, according to the third embodiment, the CPU 73 performs adjustment so that the cycle of the line synchronization signal is increased due to light up control using a cycle-divided line synchronization signal making the amount of light excessive and then performs adjustment so that the drive current is decreased due to the drive current control of the light-emitting units reducing the excessive portion of the amount of light. In other words, in a case where the low-speed mode is performed to rotate the photosensitive drum 1 at a speed (second rotational speed) that is slower than the rotational speed (first rotational speed) of the normal mode and that is a/b times the rotational speed of the normal mode, the CPU 73 performs the following control. The CPU 73, in the low-speed mode, controls the synchronization signal generation unit 74 to generate a line synchronization signal at a cycle of b/(a×e) times of the cycle of the line synchronization signal generated in the normal mode. Also, the CPU 73 controls the buffer loading control unit 17 so that, in the amount of time it takes the photosensitive drum 1 in the low-speed mode to rotate a pixel size corresponding to the resolution in the sub-scan direction, in sync with each e times of line synchronization signals generated by the synchronization signal generation unit 74, the same image data signal of one line is transmitted f times and an image data signal that causes the light-emitting units 50 to not emit light (not light up) is transmitted e−f times. The CPU 73 selects the integer closest to the value of (a×e)/b and equal to or greater than the value of (a×e)/b as the number of times to light up f due to the same image data of one line. Next, the CPU 73 instructs the light-emitting element array chip 40 of the settings for the drive current flowing through the light-emitting units 50 so that the amount of light of the light-emitting units 50 matches the target value ((a×e)/(b×f) times of the amount of light in the normal mode). With this control, the amount of light emitted at the region corresponding to one pixel on the photosensitive drum 1 in the normal mode and in the low-speed mode can be made equal. This can suppress too much toner adhering on the photosensitive drum 1 in the low-speed mode and allows the toner on the photosensitive drum 1 to be appropriate adjusted.

Also, according to the third embodiment, with the method for adjusting the amount of light via light up control using a cycle-divided line synchronization signal, when the cycle of the line synchronization signal in the low-speed mode is too short, transmission of the image data signal of one line may not make it in time. In such cases, by controlling the light-emitting units in the low-speed mode according to the third embodiment, the amount of light emitted at the region corresponding to one pixel on the photosensitive drum 1 in the normal mode and the low-speed mode can be made equal.

Also, according to the third embodiment, when using the method for adjusting the amount of light via drive current control of the light-emitting units, there are cases where the amount of light cannot be appropriately adjusted due to the amount of light adjustment range being small. In such cases, by controlling the light-emitting units in the low-speed mode according to the third embodiment, the amount of light adjustment range can be increased, and the amount of light emitted at the region corresponding to one pixel on the photosensitive drum 1 in the normal mode and the low-speed mode can be made equal.

According to the third embodiment, control is performed to decrease the amount of light of the light-emitting units in the low-speed mode compared to when in the normal mode. Thus, wear of the light-emitting units can be reduced.

Fourth Embodiment

An image forming apparatus according to the fourth embodiment has a similar configuration to the first embodiment. Thus, the configuration of the image forming apparatus according to the fourth embodiment will not be described. The control of the light-emitting units in the low-speed mode according to the fourth embodiment is different to the control in the first embodiment. Thus, the control of the light-emitting units in the low-speed mode according to the fourth embodiment will be described.

Control of Light-Emitting Units in the Low-Speed Mode According to the Fourth Embodiment The control of the light-emitting units in the low-speed mode according to the fourth embodiment will be described. As in the third embodiment, in the fourth embodiment, the light-emitting units are controlled using a method for adjusting the amount of light via light up control using a cycle-divided line synchronization signal and a method for adjusting the amount of light via drive current control of the light-emitting units. The difference between the fourth embodiment and the third embodiment is in the processing to calculate the number of times to light up f due to the same image data of one line.

Figure 21A:
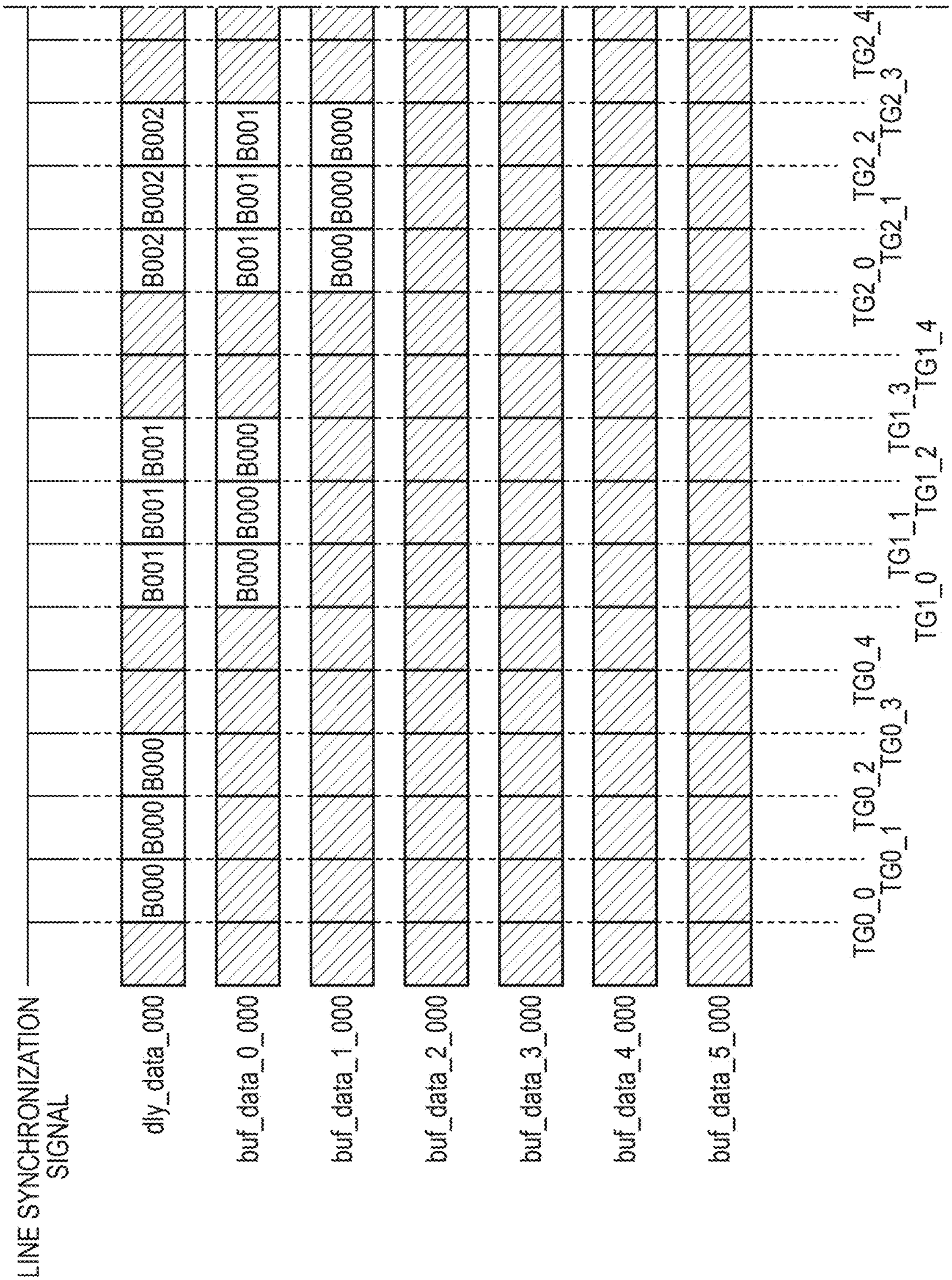
FIG. 21A is a timing chart illustrating the operations in the sub-scan direction when in the low-speed mode in the image data storage unit according to a fourth embodiment.
Figure 21B:
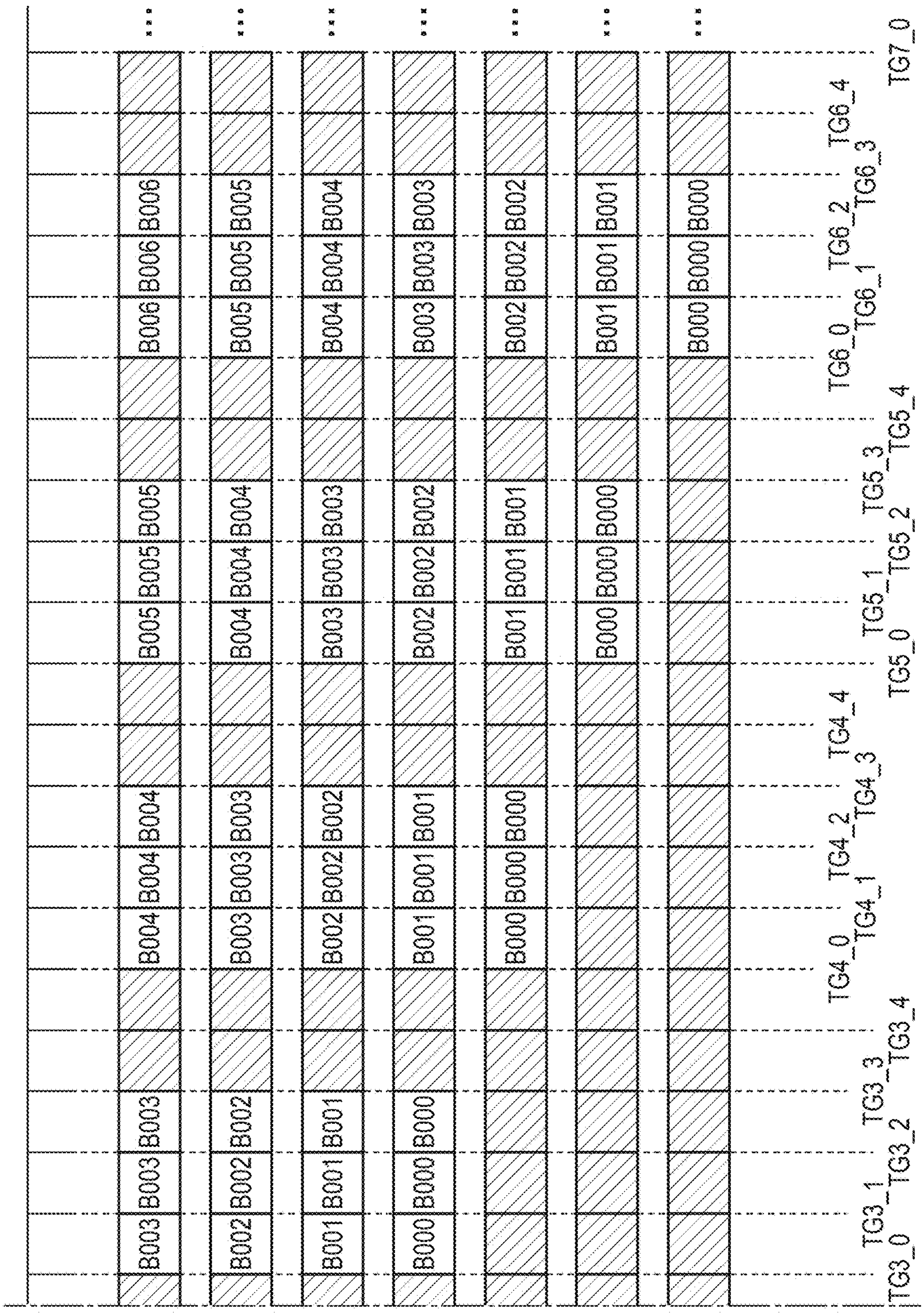
FIG. 21B is a timing chart illustrating the operations in the sub-scan direction when in the low-speed mode in the image data storage unit according to a fourth embodiment.

FIGS. 21A and 21B are a timing chart illustrating the operations in the sub-scan direction when in the low-speed mode in the image data storage unit 84 according to the fourth embodiment. In the example described here, the rotational speed of the photosensitive drum 1 in the low-speed mode is 5/7 of the rotational speed of the photosensitive drum 1 in the normal mode. Note that the symbols illustrated in FIGS. 21A and 21B mean the same as the symbols illustrated in FIGS. 11A and 11B. Also, the rotational speed of the photosensitive drum 1 in the low-speed mode is not limited to being 5/7 of the rotational speed of the photosensitive drum 1 in the normal mode, and a different speed difference may be used in the present embodiment.

First, the cycle of the line synchronization signal of the low-speed mode is set via processing similar to that in the third embodiment. In the example illustrated in FIGS. 21A and 21B, Tmin equals 1/4. The CPU 73 calculates Formula 7 and selects 5 as the division coefficient e so that 28/5≥e is satisfied. The CPU 73 instructs the synchronization signal generation unit 74 to set the cycle of the line synchronization signal in the low-speed mode to 7/25 times the cycle of the line synchronization signal in the normal mode. For example, the amount of time from time TG0_0 to TG0_1 illustrated in FIGS. 21A and 21B is 7/25 times the amount of time from time TA0 to TA1 illustrated in FIG. 13.

Next, relating to the calculation of the number of times to light up f due to the same image data of one line, processing according to the fourth embodiment different from that of the third embodiment is executed. In the amount of time it takes the photosensitive drum 1 in the low-speed mode to rotate a pixel size corresponding to the resolution in the sub-scan direction, the synchronization signal generation unit 74 generates the line synchronization signal e times. The CPU 73 controls the buffer loading control unit 17 so that the same image data signal of one line for causing the light-emitting units 50 to emit light is transmitted f times (f is an integer) in sync with the e times of the line synchronization signal and so that an image data signal that does not cause the light-emitting units 50 to emit light (not light up) is transmitted e−f times. Here, the method for calculating the number of times to light up f due to the same image data of one line will be described. The CPU 73 obtains the value of (a×e)/b and selects the integer closest to the value of (a×e)/b and equal to or less than the value of (a×e)/b as the number of times to light up f due to the same image data of one line. In the example illustrated in FIGS. 21A and 21B, the CPU 73 obtains (a×e)/b=25/7 and selects 3 as the integer closest to and equal to or less than 25/7 as the number of times to light up f due to the same image data of one line.

Then, in the amount of time it takes the photosensitive drum 1 in the low-speed mode to rotate a pixel size corresponding to the resolution in the sub-scan direction, the synchronization signal generation unit 74 generates the line synchronization signal 5 times. The CPU 73 controls the buffer loading control unit 17 so that the same image data signal of one line is transmitted 3 times in sync with the 5 times of the line synchronization signal and so that an image data signal that causes the light-emitting units 50 to not emit light (not light up) is transmitted 2 times. The buffer loading control unit 17 having received an instruction from the CPU 73, in sync with the first, second, and third line synchronization signal generated at time TG0_0, TG0_1, and TG0_2 respectively, reads the same image data signal of one line from the line buffer 15 and transmits this to the light-emitting element array chip 40. Furthermore, the buffer loading control unit 17, in sync with the fourth and fifth line synchronization signal generated at time TG0_3 and TG0_4, transmits an image data signal that causes the light-emitting units 50 to not emit light (not light up) to the light-emitting element array chip 40. The CPU 73 repeats this control after time TG1_0. Note that as long as the same image data signal of one line is transmitted f times and an image data signal that causes the light-emitting units 50 to not emit light (not light up) is transmitted e−f times in sync with the e times of the line synchronization signal, any order of transmission may be used. In the example illustrated in FIGS. 21A and 21B, the CPU 73 may transmit an image data signal that causes the light-emitting units 50 to not emit light (not light up) in sync with the first and second line synchronization signal, and may transmit the same image data signal of one line in sync with the third, fourth, and fifth line synchronization signals.

Next, the drive current flowing through the light-emitting units 50 in the low-speed mode is set via processing similar to that in the third embodiment. The CPU 73 reads the table of the drive current and the amount of light from the head information storage unit 171 and calculates the value of the drive current required to make the amount of light of the light-emitting units 50 match the target value ((a×e)/(b×f) times of the amount of light in the normal mode). Then, the CPU 73 instructs the light-emitting element array chip 40 of the settings for the drive current flowing through the light-emitting units 50. In the example illustrated in FIGS. 21A and 21B, the target value is 25/21 times.

Here, the result of comparing the amount of light emitted at the region corresponding to one pixel on the photosensitive drum 1 in the normal mode and in the low-speed mode corresponds to the same formula as Formula 8 in the third embodiment. In other words, since the light amount ratio of the low-speed mode to the normal mode is equal, in the normal mode and the low-speed mode, the amount of light emitted at the region corresponding to one pixel on the photosensitive drum 1 can be made equal.

To summarize, according to the fourth embodiment, the CPU 73 performs adjustment so that the cycle of the line synchronization signal is decreased due to light up control using a cycle-divided line synchronization signal making the amount of light insufficient and then performs adjustment so that the drive current is increased due to the drive current control of the light-emitting units making up for the insufficient portion of the amount of light. In other words, in a case where the low-speed mode is performed to rotate the photosensitive drum 1 at a speed (second rotational speed) that is slower than the rotational speed (first rotational speed) of the normal mode and that is a/b times the rotational speed of the normal mode, the CPU 73 performs the following control. The CPU 73, in the low-speed mode, controls the synchronization signal generation unit 74 to generate a line synchronization signal at a cycle of b/(a×e) times of the cycle of the line synchronization signal generated in the normal mode. Also, the CPU 73 controls the buffer loading control unit 17 so that, in the amount of time it takes the photosensitive drum 1 in the low-speed mode to rotate a pixel size corresponding to the resolution in the sub-scan direction, in sync with each e times of line synchronization signals generated by the synchronization signal generation unit 74, the same image data signal of one line is transmitted f times and an image data signal that causes the light-emitting units 50 to not emit light (not light up) is transmitted e−f times. The CPU 73 selects the integer closest to the value of (a×e)/b and equal to or less than the value of (a×e)/b as the number of times to light up f due to the same image data of one line. Next, the CPU 73 instructs the light-emitting element array chip 40 of the settings for the drive current flowing through the light-emitting units 50 so that the amount of light of the light-emitting units 50 matches the target value ((a×e)/(b×f) times of the amount of light in the normal mode). With this control, the amount of light emitted at the region corresponding to one pixel on the photosensitive drum 1 in the normal mode and in the low-speed mode can be made equal. This can suppress too much toner adhering on the photosensitive drum 1 in the low-speed mode and allows the toner on the photosensitive drum 1 to be appropriate adjusted.

Note that in the third embodiment, the integer closest to and equal to or greater than the value of (a×e)/b is selected as the number of times to light up f due to the same image data of one line. However, in the fourth embodiment, the integer closest to and equal to or less than the value of (a×e)/b is selected as the number of times to light up f due to the same image data of one line. In another configuration, the CPU 73 selects the integer closest to the value of (a×e)/b as the number of times to light up f due to the same image data of one line. With such a configuration, a change in the amount of light due to the drive current control can be kept to a minimum, and even in a case where the range of the drive current that can flow due to the characteristics of the light-emitting units 50 is small, the present embodiment can be applied and the amount of light can be adjusted.

Fifth Embodiment

An image forming apparatus according to the fifth embodiment has a similar configuration to the first embodiment. Thus, the configuration of the image forming apparatus according to the fifth embodiment will not be described. The control of the light-emitting units in the low-speed mode according to the fifth embodiment is different to the control in the first embodiment. Thus, the control of the light-emitting units in the low-speed mode according to the fifth embodiment will be described. In the fifth embodiment, the light-emitting units are controlled using a method for adjusting the amount of light via light up control using a cycle-divided line synchronization signal, a method for adjusting the amount of light via light up decimation control per one line in the main scan direction, and a method for adjusting the amount of light via drive current control of the light-emitting units.

Control of Light-Emitting Units in the Low-Speed Mode According to the Fifth Embodiment The control of the light-emitting units in the low-speed mode according to the fifth embodiment will be described.

Figure 22A:
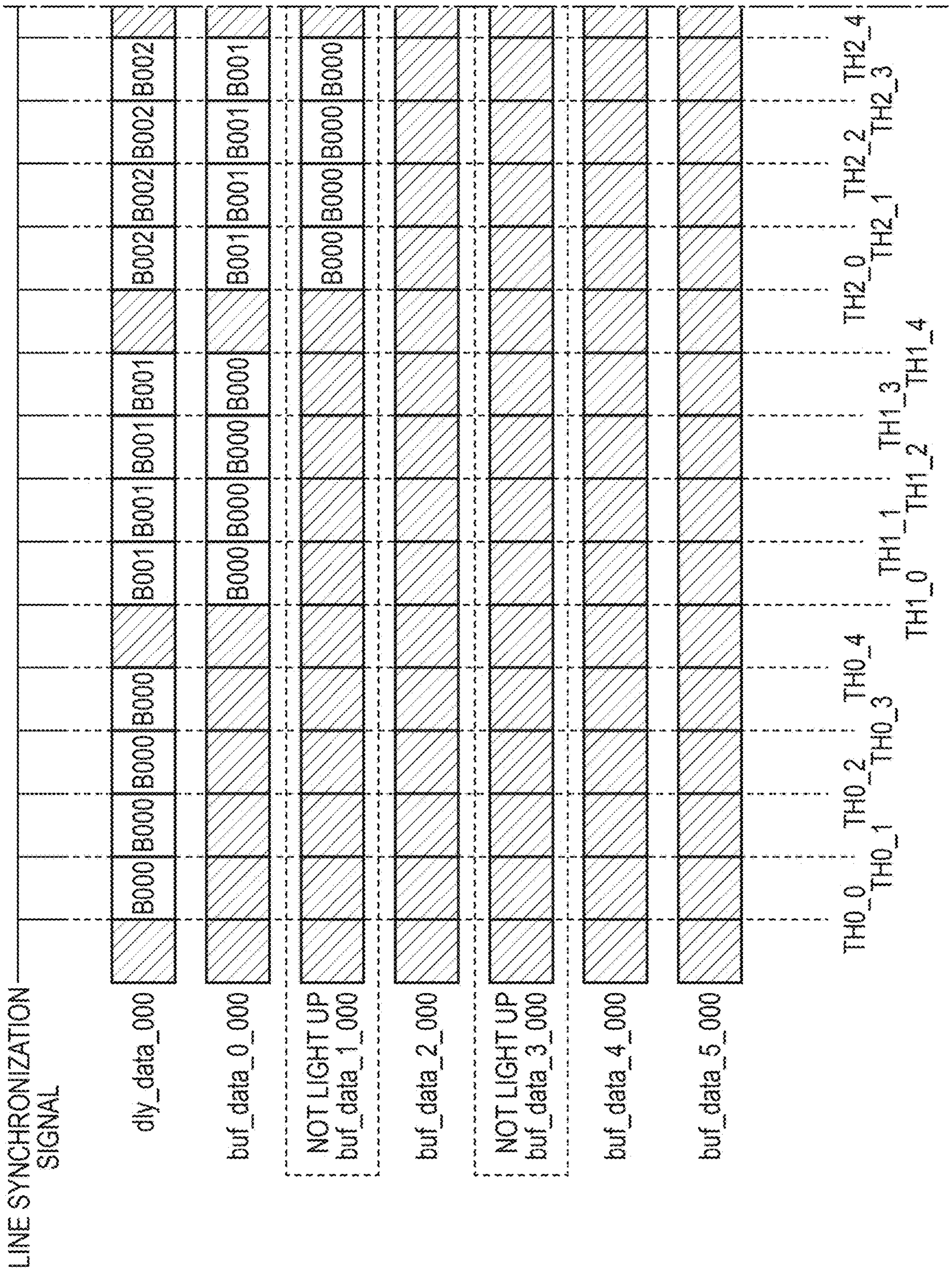
FIG. 22A is a timing chart illustrating the operations in the sub-scan direction when in the low-speed mode in the image data storage unit according to a fifth embodiment.
Figure 22B:
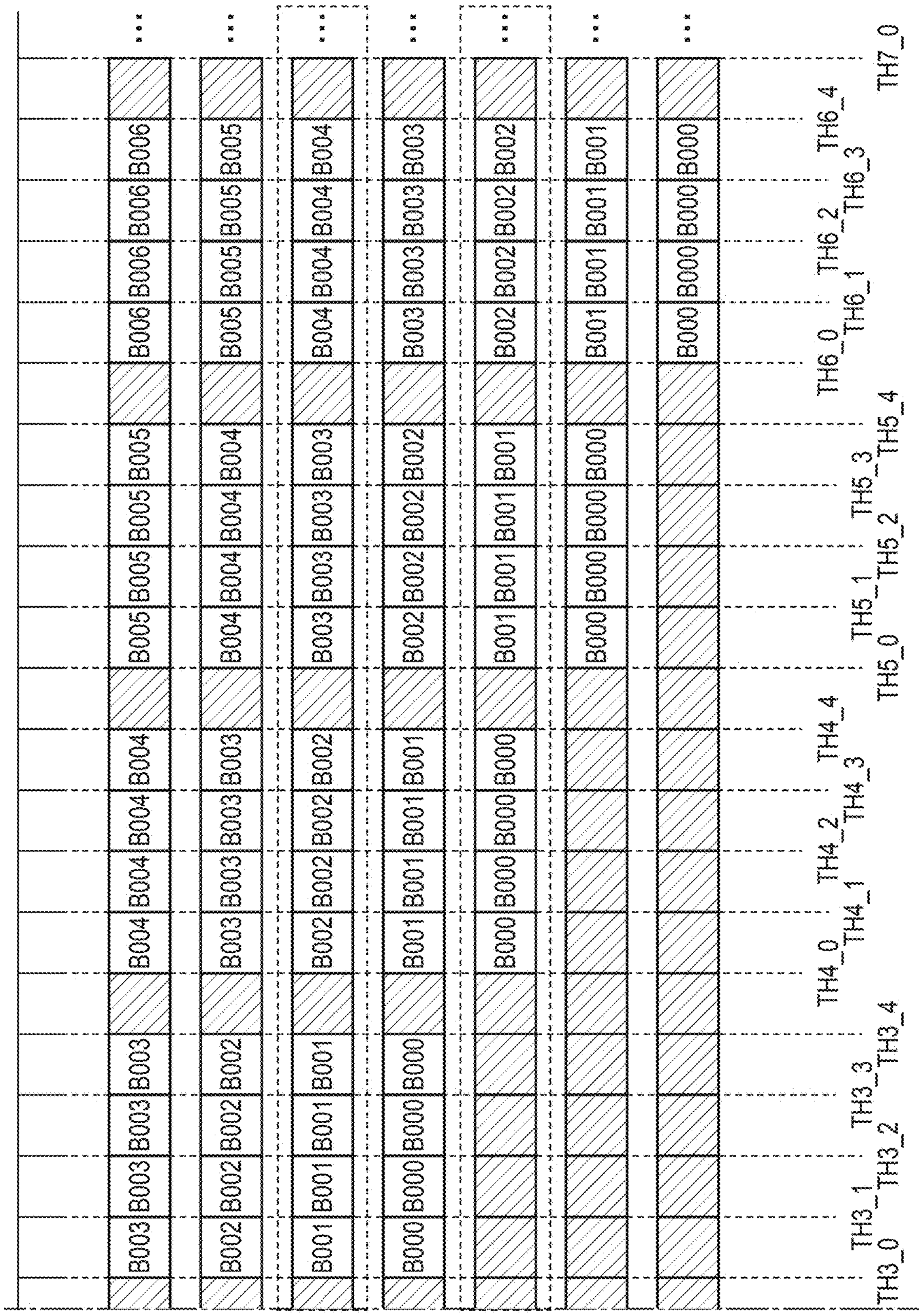
FIG. 22B is a timing chart illustrating the operations in the sub-scan direction when in the low-speed mode in the image data storage unit according to a fifth embodiment.

FIGS. 22A and 22B are a timing chart illustrating the operations in the sub-scan direction when in the low-speed mode in the image data storage unit 84 according to the fifth embodiment. In the example described here, the rotational speed of the photosensitive drum 1 in the low-speed mode is $\frac{5}{6}$ of the rotational speed of the photosensitive drum 1 in the normal mode. Note that the symbols illustrated in FIGS. 22A and 22B mean the same as the symbols illustrated in FIGS. 11A and 11B. Also, the rotational speed of the photosensitive drum 1 in the low-speed mode is not limited to being $\frac{5}{6}$ of the rotational speed of the photosensitive drum 1 in the normal mode, and a different speed difference may be used in the present embodiment.

In a case where the rotational speed of the photosensitive drum 1 in the low-speed mode is a speed corresponding to a/b times with respect to the rotational speed of the photosensitive drum 1 in the normal mode, the CPU 73 first obtains the value of b/(a×e) times with respect to the cycle of the line synchronization signal in the normal mode. The CPU 73 instructs the synchronization signal generation unit 74 to set the obtained value as the cycle of the line synchronization signal of the low-speed mode. Relating to the calculation of the division coefficient e, processing according to the fifth embodiment different from that of the third and fourth embodiment is executed. To guarantee that the transmission of the image data signal of one line makes it in time, the division coefficient e is selected so that Formula 7 is satisfied. The CPU 73 obtains the value of b/(a×Tmin) and selects the division coefficient e on the basis of a predetermined selection criteria from among integers that are equal to or less than the value of b/(a×Tmin). Here, various selection criteria may be used as the predetermined selection criteria as long as no inconsistency is produced with the condition that the integer is equal to or less than the value of b/(a×Tmin). For example, the CPU 73 may reference information of a prohibited frequency band of the line synchronization signal in the low-speed mode prepared in advance and select the division coefficient e so that the prohibited frequency band is avoided. This configuration can reduce switching noise, power source noise, and emission noise in sync with the line synchronization signal in the prohibited frequency band. Also, as in the third embodiment and the fourth embodiment, the CPU 73 may set the integer closest to and equal to or less than the value of b/(a×Tmin) as the division coefficient e. This configuration can reduce the computation amount and the computation time relating to calculation of the division coefficient e. In the example illustrated in FIGS. 22A and 22B, Tmin equals $\frac{1}{4}$. The predetermined selection criteria is set to avoid the prohibited frequency band on the basis of the information of the prohibited frequency band of the line synchronization signal in the low-speed mode prepared in advance. The CPU 73 calculates Formula 7 and selects 5 as the division coefficient e so that 36/5≥e and the predetermined selection criteria are satisfied. The CPU 73 instructs the synchronization signal generation unit 74 to set the cycle of the line synchronization signal in the low-speed mode to $\frac{9}{25}$ times the cycle of the line synchronization signal in the normal mode. For example, the amount of time from time TH0_0 to TH0_1 illustrated in FIGS. 22A and 22B is $\frac{9}{25}$ times the amount of time from time TA0 to TA1 illustrated in FIG. 13.

Next, the CPU 73 controls the buffer loading control unit 17 so that, in the amount of time it takes the photosensitive drum 1 in the low-speed mode to rotate a pixel size corresponding to the resolution in the sub-scan direction, in sync with each e times of line synchronization signals generated by the synchronization signal generation unit 74, the same image data signal of one line is transmitted f times to cause the light-emitting units 50 to emit light and an image data signal that causes the light-emitting units 50 to not emit light (not light up) is transmitted e−f times. Also, the CPU 73 instructs the light-emitting element array chip 40 to light up 6×g rows from among the six light-emitting rows used in the multiple exposure and not light up 6×(1−g) rows. Here, the method for calculating a multiplying factor g of the number of light-emitting rows to light up and the number of times to light up f due to the same image data of one line will be described.

The CPU 73 calculate a combination of g and f to satisfy the following three selection criteria. The first selection criteria is g≤1 (in other words, g is equal to or less than 1) and the number of light-emitting rows to light up 6×g is an integer. The second selection criteria is satisfying f≤e. The third selection criteria is selecting a combination of g and f so that the value of (b×f×g)/(a×e) is the closest to 1. By providing the third selection criteria, in adjusting the amount of light via drive current control of the light-emitting units described below, the amount of change in the drive current can be kept to a minimum. Note that the third selection criteria is not limited to the criteria described above and various other selection criteria can be applied in a manner that does not produce an inconsistency with the first selection criteria and the second selection criteria. For example, in another configuration, after the multiplying factor g of the number of light-emitting rows to light up is set to a fixed value, f is selected so that the value of (b×f×g)/(a×e) is the closest to 1.

This configuration can reduce the computation amount and the computation time relating to calculation of the number of times to light up f using the multiplying factor g of the number of light-emitting rows to light up and the same image data of one line. In the example illustrated in FIGS. 22A and 22B, the CPU 73, on the basis of the first, second, and third selection criteria, calculates g and f, selects $\frac{4}{6}$ as the multiplying factor g of the number of light-emitting rows to light up, and selects 4 as the number of times to light up f due to the same image data of one line. Also, the CPU 73 controls the buffer loading control unit 17 so that, in the amount of time it takes the photosensitive drum 1 in the low-speed mode to rotate a pixel size corresponding to the resolution in the sub-scan direction, in sync with each 5 times of line synchronization signals generated by the synchronization signal generation unit 74, the same image data signal of one line is transmitted 4 times and an image data signal that causes the light-emitting units 50 to not emit light (not light up) is transmitted 1 time. The buffer loading control unit 17 having received an instruction from the CPU 73, in sync with the first, second, third, and fourth line synchronization signal generated at time TH0_0, TH0_1, TG0_2, and TH0_3 respectively, reads the same image data signal of one line from the line buffer 15 and transmits this to the light-emitting element array chip 40. Furthermore, the buffer loading control unit 17, in sync with the fifth line synchronization signal generated at time TH0_4, transmits an image data signal that causes the light-emitting units 50 to not emit light (not light up) to the light-emitting element array chip 40. The CPU 73 repeats this control after time TH1_0. Note that as long as the same image data signal of one line is transmitted 4 times and an image data signal that causes the light-emitting units 50 to not emit light (not light up) is transmitted 1 time in sync with the 5 times of the line synchronization signal, any order of transmission may be used. In the example illustrated in FIGS. 22A and 22B, the CPU 73 may transmit an image data signal that causes the light-emitting units 50 to not emit light (not light up) in sync with the first line synchronization signal, and may transmit the same image data signal of one line in sync with the second, third, fourth, and fifth line synchronization signals. Also, the CPU 73 instructs the light-emitting element array chip 40 to light up 4 rows from among the six light-emitting rows used in the multiple exposure and not light up 2 rows. In FIGS. 22A and 22B, the 4 rows to light up are the light-emitting units the buf_data_0_000, buf_data_2_000, buf_data_4_000, and buf_data_5_000 are connected to. Also, the 2 rows to not light up are the light-emitting units the buf_data_1_000 and buf_data_3_000 are connected to. Note that the combination is not limited to the 4 rows on and 2 rows off combination described above, and any combination of the six light-emitting rows may be used.

Next, the CPU 73 reads the table of the drive current and the amount of light from the head information storage unit 171 and calculates the value of the drive current required to make the amount of light of the light-emitting units 50 match the target value ((a×e)/(b×f×g) times of the amount of light in the normal mode). Then, the CPU 73 instructs the light-emitting element array chip 40 of the settings for the drive current flowing through the light-emitting units 50. In this manner, the drive current flows through the light-emitting units 50 as set, and the amount of light of the light-emitting units 50 is adjusted to match the target value ((a×e)/(b×f×g) times of the amount of light in the normal mode). In the example illustrated in FIGS. 22A and 22B, the target value is 25/24 times.

Here, the amount of light emitted at the region corresponding to one pixel on the photosensitive drum 1 in the normal mode and in the low-speed mode is compared. The cycle of the line synchronization signal in the low-speed mode is changed to b/(a×e) times that of the normal mode, and thus the amount of light is changed to b/(a×e) times. Also, in the amount of time it takes the photosensitive drum 1 in the low-speed mode to rotate a pixel size corresponding to the resolution in the sub-scan direction, in sync with each generated e times of line synchronization signals, the same image data signal of one line is transmitted f times and an image data signal that causes the light-emitting units 50 to not emit light (not light up) is transmitted e−f times. Also, the number of light-emitting rows that light up in the low-speed mode is changed to g times that of the normal mode, and thus the amount of light is changed to g times. Furthermore, the amount of light of the light-emitting units in the low-speed mode is changed to (a×e)/(b×f×g) times that of the normal mode, and thus the amount of light is changed to (a×e)/(b×f×g) times. Accordingly, since the light amount ratio of the low-speed mode to the normal mode as illustrated in the following Formula 9 is equal, in the normal mode and the low-speed mode, the amount of light emitted at the region corresponding to one pixel on the photosensitive drum 1 can be made equal.

(change in amount of light due to change of cycle of line synchronization signal: $b/(a\times e)$times)×(number of times to light up $f$ due to the same image data of one line)×(change in amount of light due to change in light-emitting rows to light up)×(change in amount of light due to drive current control: $(a\times e)/(b\times f\times g)$times)=(light amount ratio of low-speed mode to normal mode:equal) (Formula 9)

To summarize, according to the fifth embodiment, the CPU 73 controls the light-emitting units using a method for adjusting the amount of light via light up control using a cycle-divided line synchronization signal, a method for adjusting the amount of light via light up decimation control per one line in the main scan direction, and a method for adjusting the amount of light via drive current control of the light-emitting units. In other words, in a case where the low-speed mode is performed to rotate the photosensitive drum 1 at a speed (second rotational speed) that is slower than the rotational speed (first rotational speed) of the normal mode and that is a/b times the rotational speed of the normal mode, the CPU 73 performs the following control. The CPU 73, in the low-speed mode, controls the synchronization signal generation unit 74 to generate a line synchronization signal at a cycle of b/(a×e) times of the cycle of the line synchronization signal generated in the normal mode. Also, the CPU 73 controls the buffer loading control unit 17 so that, in the amount of time it takes the photosensitive drum 1 in the low-speed mode to rotate a pixel size corresponding to the resolution in the sub-scan direction, in sync with each e times of line synchronization signals generated by the synchronization signal generation unit 74, the same image data signal of one line is transmitted f times and an image data signal that causes the light-emitting units 50 to not emit light (not light up) is transmitted e−f times. Also, the CPU 73 instructs the light-emitting element array chip 40 to light up 6×g rows from among the six light-emitting rows used in the multiple exposure and not light up 6×(1−g) rows. Next, the CPU 73 instructs the light-emitting element array chip 40 of the settings for the drive current flowing through the light-emitting units 50 so that the amount of light of the light-emitting units 50 matches the target value ((a×e)/(b×f×g) times of the amount of light in the normal mode). With this control, the amount of light emitted at the region corresponding to one pixel on the photosensitive drum 1 in the normal mode and in the low-speed mode can be made equal. This can suppress too much toner adhering on the photosensitive drum 1 in the low-speed mode and allows the toner on the photosensitive drum 1 to be appropriate adjusted.

Also, according to the fifth embodiment, the CPU 73 can perform control that is optimal for the purpose by selecting a combination of the division coefficient e, the multiplying factor g of the number of light-emitting rows to light up, and the number of times to light up f due to the same image data of one line from a plurality of options on the basis of various selection criteria. For example, as described above, the CPU 73 can reference information of a prohibited frequency band of the line synchronization signal in the low-speed mode prepared in advance and select the division coefficient e so that the prohibited frequency band is avoided to reduce switching noise, power source noise, and emission noise in sync with the line synchronization signal in the prohibited frequency band. Also, the CPU 73 can select the integer closest to and equal to or less than the value of b/(a× Tmin) as the division coefficient e to reduce the computation amount and the computation time relating to calculation of the division coefficient e. Also, by the CPU 73 selecting a combination of g and f so that the value of (b×f×g)/(a×e) is the closest to 1, in adjusting the amount of light via drive current control of the light-emitting units described below, the amount of change in the drive current can be kept to a minimum. Furthermore, the CPU 73 selects f so that the value of (b×f×g)/(a×e) is the closest to 1 after the multiplying factor g of the number of light-emitting rows to light up is set to a fixed value. This can reduce the computation amount and the computation time relating to calculation of the number of times to light up f using the multiplying factor g of the number of light-emitting rows to light up and the same image data of one line.

Figure 23:
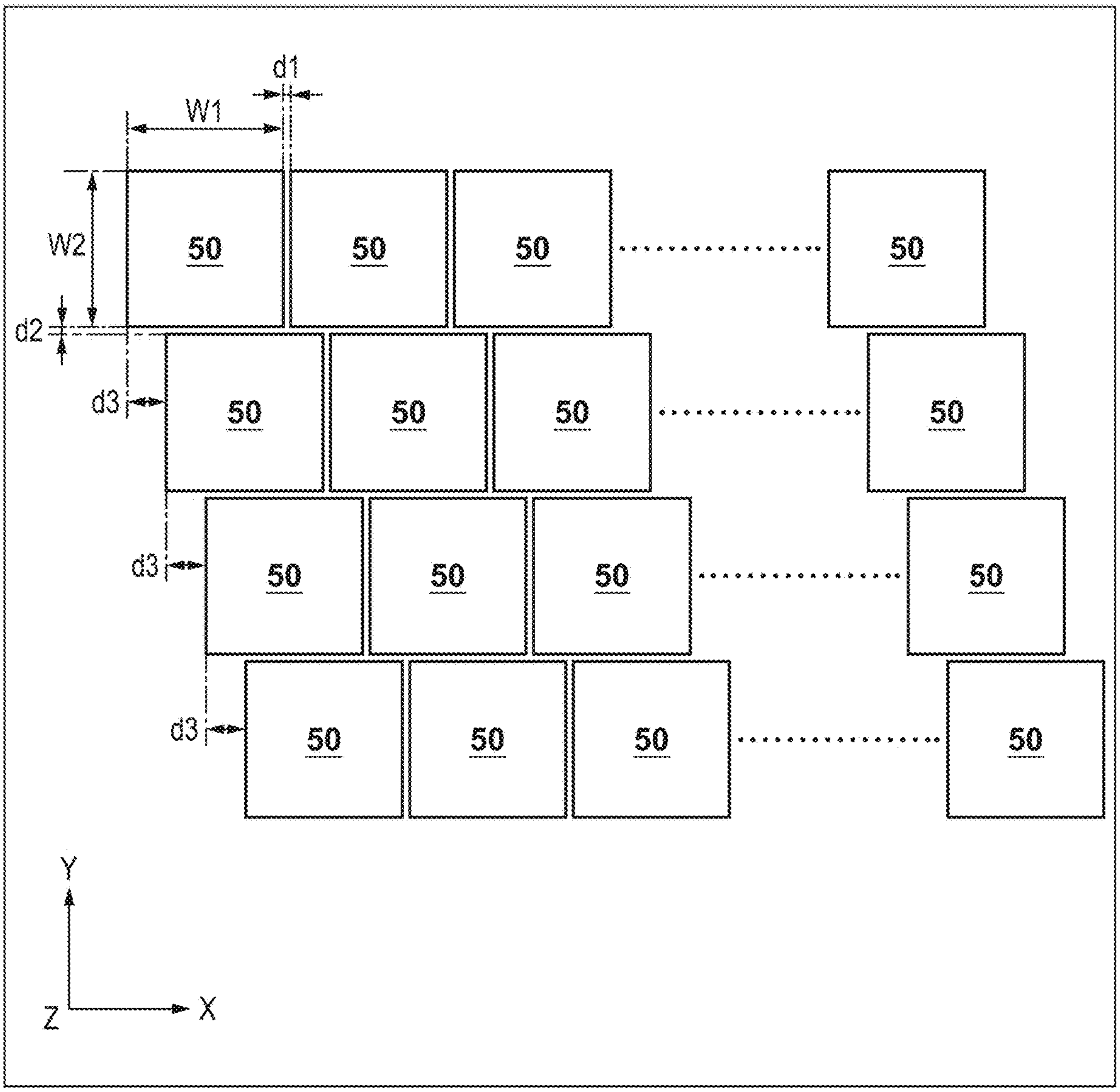
FIG. 23 is a schematic view for describing the arrangement of the light-emitting units in another embodiment.

Note that in the present embodiment, as illustrated in FIG. 6, the plurality of light-emitting units 50 used in the multiple exposure are arranged in straight lines with respect to the sub-scan direction (arrow Y direction). However, the present embodiment is not limited to this configuration. In other words, the present embodiment can be applied to configurations in which the plurality of light-emitting units 50 are arranged in the sub-scan direction (arrow Y direction) while offset in the main scan direction (arrow X direction). FIG. 23 is a schematic view for describing the arrangement of the light-emitting units in another embodiment. In the example illustrated in FIG. 23, four light-emitting units 50 are arranged in the sub-scan direction (arrow Y direction) with an offset d3 in the main scan direction (arrow X direction). The width W1 and the width W2 of the light-emitting units 50 is 20.90 μm, and the gap d1 and the gap d2 between adjacent light-emitting units 50 is 0.26 μm. In other words, the light-emitting units 50 are arranged in the arrow X direction and the arrow Y direction at a pitch of 21.16 μm (1200 dpi). The offset d3 of the four light-emitting units 50 in the main scan direction (arrow X direction is 5.29 μm (4800 dpi).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-028928, filed Feb. 28, 2024, which is hereby incorporated by reference herein in its entirety.

What is claimed is:

1. An image forming apparatus comprising:

a photosensitive drum that rotates about a rotation axis direction;

an exposure head including a plurality of light-emitting units that emit light on a basis of an image data signal for exposure of the photosensitive drum and are arranged in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, controls a cycle of a light emission timing of the light-emitting units at a cycle of b/a times of a cycle of the first mode, sets c/d (c and d are integers) so that n×(c/d) is an integer and controls the light-emitting units to cause, from among the number of rows n, the light-emitting units of a number of rows (n×(c/d)) to emit light and to cause the light-emitting units of a number of rows (n×((d−c)/d)) to not emit light, and sets a drive current of the light-emitting units so that an amount of light of the plurality of light-emitting units matches (a×d)/(b×c) times of an amount of light in the first mode.

2. The image forming apparatus according to claim 1, wherein the control unit sets c/d to a value closest to a/b and equal to or greater than a/b times from among values that make n×(c/d) an integer.

3. The image forming apparatus according to claim 1, wherein the control unit sets c/d to a value closest to a/b and equal to or less than a/b times from among values that make n×(c/d) an integer.

4. The image forming apparatus according to claim 1, wherein the control unit sets c/d to a value closest to a/b from among values that make n×(c/d) an integer.

5. The image forming apparatus according to claim 1, wherein the control unit sets a drive current of the plurality of light-emitting units in the first mode to a value that is not a maximum value or a minimum value in a range between the maximum value and the minimum value, and sets the drive current in the second mode in a range between the maximum value and the minimum value.

6. An image forming apparatus comprising:

a photosensitive drum that rotates about a rotation axis direction;

an exposure head including a plurality of light-emitting units that emit light on a basis of an image data signal for exposure of the photosensitive drum and are arranged in the rotation axis direction and in a plurality of rows in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies b/(a×e) ≥Tmin and controls a cycle of light emission timing of the light-emitting units at a cycle of b/(a×e) times of a cycle in the first mode, controls the plurality of light-emitting units so that, of e times an image data signal of one line is being transmitted, the plurality of light-emitting units are caused to emit light f times and the plurality of light-emitting units are caused to not emit light (e−f) times, and sets a drive current of the light-emitting units so that an amount of light of the plurality of light-emitting units matches (a×e)/(b×f) times of an amount of light in the first mode.

7. The image forming apparatus according to claim 6, wherein the control unit sets the f to an integer closest to a value of (a×e)/b and equal to or greater than a value of (a×e)/b.

8. The image forming apparatus according to claim 6, wherein the control unit sets the f to an integer closest to a value of (a×e)/b and equal to or less than a value of (a×e)/b.

9. The image forming apparatus according to claim 6, wherein the control unit sets the f to an integer closest to a value of (a×e)/b.

10. The image forming apparatus according to claim 6, wherein the control unit sets a drive current of the plurality of light-emitting units in the first mode to a value that is not a maximum value or a minimum value in a range between the maximum value and the minimum value, and sets the drive current in the second mode in a range between the maximum value and the minimum value.

11. An image forming apparatus comprising:

a photosensitive drum that rotates about a rotation axis direction;

an exposure head including a plurality of light-emitting units that emit light on a basis of an image data signal for exposure of the photosensitive drum and are arranged in the rotation axis direction and in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies b/(a×e) ≥Tmin and controls a cycle of light emission timing of the light-emitting units at a cycle of b/(a×e) times of a cycle in the first mode, controls the plurality of light-emitting units so that, of e times an image data signal of one line is being transmitted, the plurality of light-emitting units are caused to emit light f times and the plurality of light-emitting units are caused to not emit light (e−f) times, sets a multiplying factor g equal to or less than 1 so that n×g is an integer and controls the light-emitting units to cause, from among the number of rows n, the light-emitting units of a number of rows (n×g) to emit light and to cause the light-emitting units of a number of rows (n×(1−g)) to not emit light, and sets a drive current of the light-emitting units so that an amount of light of the plurality of light-emitting units matches (a×e)/(b×f×g) times of an amount of light in the first mode.

12. The image forming apparatus according to claim 11, wherein the control unit sets the division coefficient e so that a light emission frequency of the light-emitting units in the second mode is different from a prohibited frequency band prepared in advance.

13. The image forming apparatus according to claim 11, wherein the control unit sets a combination of the g and the f so that a value of (b×f×g)/(a×e) is closest to 1.

14. The image forming apparatus according to claim 11, wherein the control unit sets a drive current of the plurality of light-emitting units in the first mode to a value that is not a maximum value or a minimum value in a range between the maximum value and the minimum value, and sets the drive current in the second mode in a range between the maximum value and the minimum value.

15. An image forming method using an image forming apparatus provided with:

a photosensitive drum that rotates about a rotation axis direction;

an exposure head including a plurality of light-emitting units that emit light on a basis of an image data signal for exposure of the photosensitive drum and are arranged in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, controls a cycle of a light emission timing of the light-emitting units at a cycle of b/a times of a cycle of the first mode, sets c/d (c and d are integers) so that $n\times(c/d)$ is an integer and controls the light-emitting units to cause, from among the number of rows n, the light-emitting units of a number of rows $(n\times(c/d))$ to emit light and to cause the light-emitting units of a number of rows $(n\times((d-c)/d))$ to not emit light, and sets a drive current of the light-emitting units so that an amount of light of the plurality of light-emitting units matches $(a\times d)/(b\times c)$ of an amount of light in the first mode.

16. An image forming method using an image forming apparatus provided with:

a photosensitive drum that rotates about a rotation axis direction;

an exposure head including a plurality of light-emitting units that emit light on a basis of an image data signal for exposure of the photosensitive drum and are arranged in the rotation axis direction and in a plurality of rows in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies $b/(a\times e)\geq$Tmin and controls a cycle of light emission timing of the light-emitting units at a cycle of $b/(a\times e)$ times of a cycle in the first mode, controls the plurality of light-emitting units so that, of e times an image data signal of one line is being transmitted, the plurality of light-emitting units are caused to emit light f times and the plurality of light-emitting units are caused to not emit light $(e-f)$ times, and sets a drive current of the light-emitting units so that an amount of light of the plurality of light-emitting units matches $(a\times e)/(b\times f)$ times of an amount of light in the first mode.

17. An image forming method using an image forming apparatus provided with:

a photosensitive drum that rotates about a rotation axis direction;

an exposure head including a plurality of light-emitting units that emit light on a basis of an image data signal for exposure of the photosensitive drum and are arranged in the rotation axis direction and in a number of rows n in a direction that intersects the rotation axis direction; and a control unit that controls a rotational speed of the photosensitive drum and light emission of the light-emitting units, wherein the control unit can execute a first mode in which the photosensitive drum is rotated at a first rotational speed and a second mode in which the photosensitive drum is rotated at a second rotational speed that is slower than the first rotational speed and that is a/b times (a and b are integers) of the first rotational speed, and in order to perform exposure for forming an image of one line along the rotation axis direction on a sheet in the second mode, in a case where a minimum value of an amount of time for enabling transmission of an image data signal of one line is Tmin, calculates a division coefficient e corresponding to an integer that satisfies $b/(a\times e)\geq$Tmin and controls a cycle of light emission timing of the light-emitting units at a cycle of $b/(a\times e)$ times of a cycle in the first mode, controls the plurality of light-emitting units so that, e times of an image data signal of one line is being transmitted, the plurality of light-emitting units are caused to emit light f times and the plurality of light-emitting units are caused to not emit light $(e-f)$ times, sets a multiplying factor g equal to or less than 1 so that $n\times g$ is an integer and controls the light-emitting units to cause, from among the number of rows n, the light-emitting units of a number of rows $(n\times g)$ to emit light and to cause the light-emitting units of a number of rows $(n\times(1-g))$ to not emit light, and sets a drive current of the light-emitting units so that an amount of light of the plurality of light-emitting units matches $(a\times e)/(b\times f\times g)$ times of an amount of light in the first mode.

* * * * *